(12) United States Patent
Sasabe et al.

(10) Patent No.: US 6,750,263 B2
(45) Date of Patent: Jun. 15, 2004

(54) METHOD FOR PRODUCTION OF POROUS CROSS-LINKED POLYMER

(75) Inventors: Masazumi Sasabe, Kakogawa (JP); Katsuhiko Sakamoto, Izumisano (JP); Kozo Nogi, Kakogawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 8 days.

(21) Appl. No.: 10/148,308

(22) PCT Filed: Dec. 12, 2000

(86) PCT No.: PCT/JP00/08763

§ 371 (c)(1),
(2), (4) Date: May 29, 2002

(87) PCT Pub. No.: WO01/41992

PCT Pub. Date: Jun. 14, 2001

(65) Prior Publication Data

US 2002/0193455 A1 Dec. 19, 2002

(30) Foreign Application Priority Data

Dec. 13, 1999 (JP) ............................................. 11-353529
Dec. 13, 1999 (JP) ............................................. 11-353530
Dec. 13, 1999 (JP) ............................................. 11-353531

(51) Int. Cl.$^7$ .................................................. C08J 9/28
(52) U.S. Cl. ....................................................... 521/64
(58) Field of Search ........................................... 521/64

(56) References Cited

U.S. PATENT DOCUMENTS

| 3,362,919 A | 1/1968 | Rood ........................ 260/2.5 |
| 3,872,197 A | 3/1975 | Kato et al. ................... 264/40 |
| 3,988,098 A | 10/1976 | Kato et al. .................. 425/224 |
| 4,019,811 A | 4/1977 | Lorah et al. ................ 350/274 |
| 4,108,585 A | 8/1978 | Proksa et al. ................. 425/89 |
| 4,530,807 A | 7/1985 | Vreenegoor ................... 264/51 |
| 5,798,064 A | 8/1998 | Peterson ..................... 264/46.3 |

FOREIGN PATENT DOCUMENTS

| DE | 198 57 026 A1 | 6/1999 | ............ C09K/3/10 |
| GB | 1 224 028 | 3/1971 | ............ B32B/5/20 |
| GB | 1 392 859 | 4/1975 | ............ B29D/27/04 |
| JP | 60-31643 | 7/1985 | ............ B29C/39/16 |
| JP | 03-068605 | 3/1991 | ............ C08F/20/14 |
| JP | 05-253951 | 5/1993 | ............ B29C/39/22 |
| JP | 5-329847 | 12/1993 | ............ B29C/39/02 |
| WO | WO 97/27240 | 7/1997 | ............. C08J/9/28 |
| WO | WO 97/37745 | 10/1997 | ............ B01D/39/08 |
| WO | WO 99/39891 | 8/1999 | ............ B29C/44/30 |

Primary Examiner—Morton Foelak
(74) Attorney, Agent, or Firm—Fish & Richardson P.C.

(57) ABSTRACT

This invention provides a method of producing a porous cross-linked polymer by horizontal continuous polymerization of a water-in-oil higher internal phase emulsion (HIPE), which includes using a weir at the opposite end parts in the width direction of an emulsion supporting member for use in the polymerization.

This invention also provides a method of producing a porous cross-linked polymer by horizontal continuous polymerization of an HIPE, which includes using a supporting member of the lower side of the emulsion and a sheet material on the upper side of the emulsion, and performing the polymerization by exerting a tensile force in the width direction and/or the travel direction of the sheet material.

This invention further provides a method of producing a porous cross-linked polymer by horizontal continuous polymerization of an HIPE, which includes regulating the thickness of the HIPE by passing the HIPE between a movable supporting member and an object disposed so as to retain a prescribed gap from the movable supporting member.

31 Claims, 29 Drawing Sheets

FIG. 1
(A)
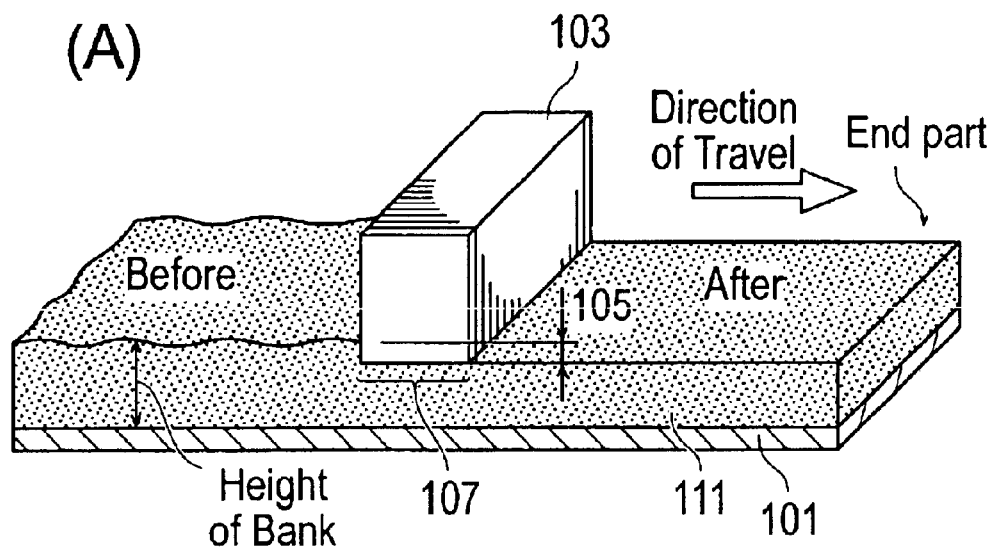
(B)
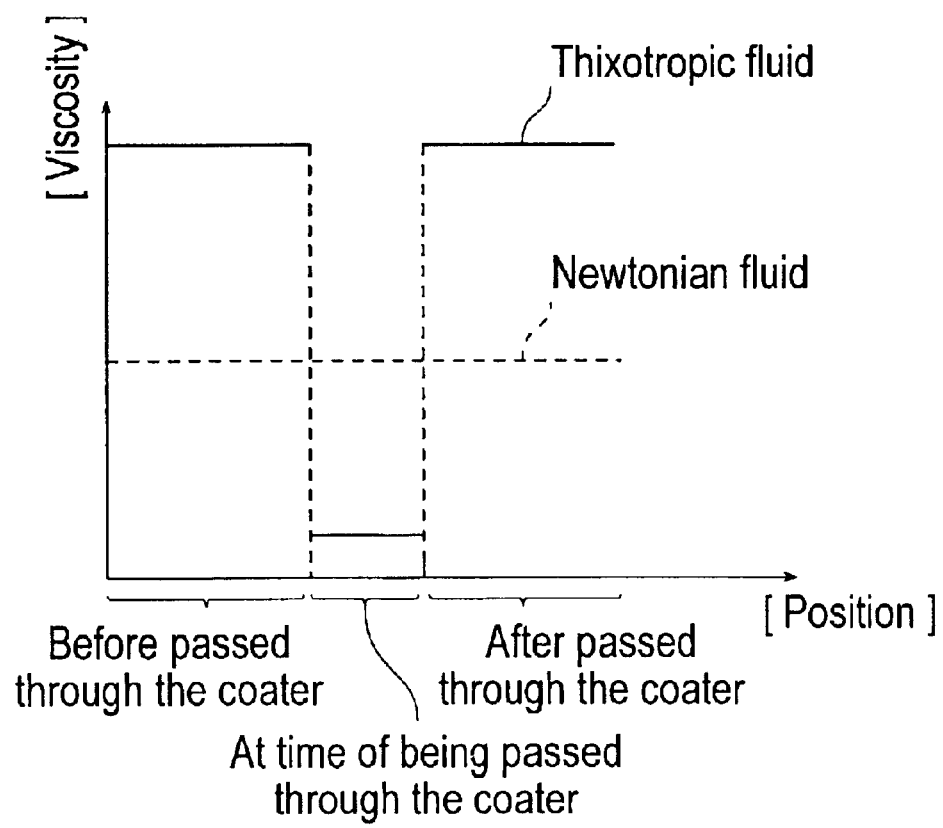

Film

Film

Part which touches a coater is subjected to regulation of thickness.

Part which cloes not touches a coater is not subjected to regulation of thickness.

Part which touch a coater is further subjected to regulation of thickness

Part which cloes not touches a coater is not subjected to regulation of thickness

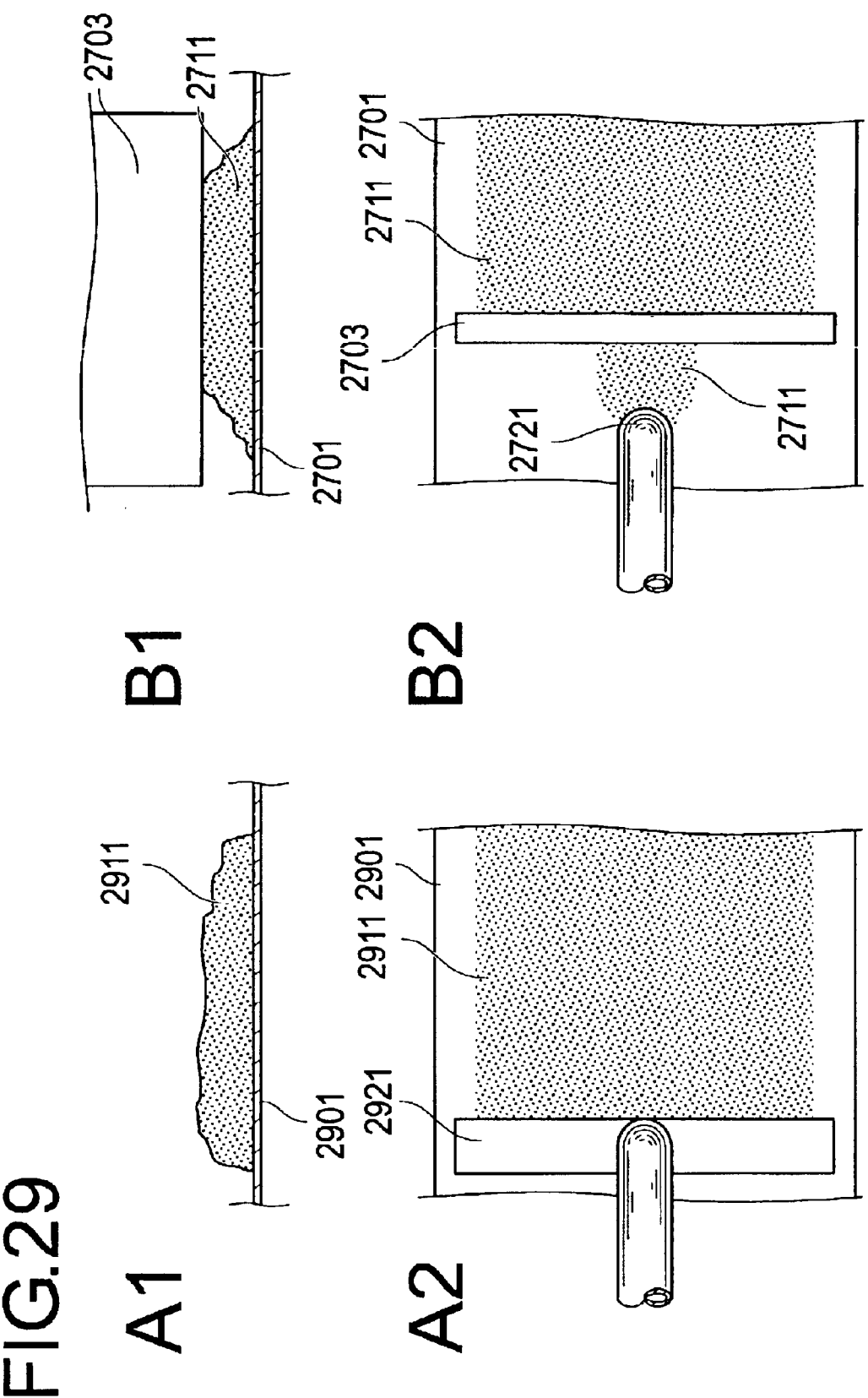

METHOD FOR PRODUCTION OF POROUS CROSS-LINKED POLYMER

TECHNICAL FIELD

This invention relates, in the production of a porous cross-linked polymer, preferably a porous cross-linked polymer having open cells formed continuously both on the surface and through the interior thereof, by the horizontal continuous polymerization of a water in oil type high internal phase emulsion (hereinafter occasionally abbreviated briefly as "HIPE"), to a technique concerning the mode, shape and structure, and material of a weir utilizing non-Newtonian and thixotropic viscosity of the HIPE for the sake of preventing the HIPE from leaking, enabling the formed polymer to acquire and retain a necessary thickness throughout to the opposite end parts, preventing the polymer from failing to cure owing to the decrease in an oxygen supply, and permitting the formed polymer to retain a superposed sheet such as an upper film.

This invention also relates to a novel method for the production of a porous cross-linked polymer, preferably a porous cross-linked polymer having open cells formed continuously both on the surface and through the interior thereof, by the horizontal continuous polymerization and curing in a polymerizing furnace of an HIPE using a supporting member on the lower side and a sheet material on the upper side and also to a technique for obtaining a porous cross-linked polymer as a cured product enjoying improved surface smoothness and excelling in accuracy of thickness.

Further, this invention relates to a technique for supplying an HIPE to an apparatus for the horizontal continuous polymerization, shaping the HIPE, and controlling the thickness of the formed HIPE for the sake of effecting the horizontal continuous polymerization of the HIPE with satisfactory accuracy of thickness and also to a novel method for producing by this technique a porous cross-linked polymer, preferably a porous cross-linked polymer having open cells formed continuously both on the surface and through the interior thereof.

The term "shaping" as used in the specification refers to an action of converting a shapeless mass into a mass of a prescribed shape; the term "controlling the thickness" refers to an action of converting a shapeless mass into a mass of a prescribed shape (i.e., shaping) and imparting a prescribed thickness to the mass of the prescribed shape; and the term "accuracy of thickness" refers to the deviation and error concerning the prescribed thickness.

BACKGROUND ART

Concerning the gasket for the production of a methyl methacrylate (occasionally referred to briefly as "MMA") resin plate by the continuous cast polymerization of a polymerizing syrup centering on MMA, a Newtonian fluid having a low viscosity, U.S. Pat. No. 3,872,197, U.S. Pat. No. 3,988,098, JP-B-60-31,643, etc. have disclosed methods which, by means of gaskets adapted to be used as compressed, produce a plate having a thickness in the approximate range of 25 to 50% of the outer diameter of the relevant tube of the gasket. These methods, however, entail problems of failing to impart a desired thickness to the produced resin plate because the gasket in use is formed of a soft resin and is consequently susceptible of deformation caused by the clamping force or heat and a problem of increasing dispersion of the plate thickness. Concerning the gasket fit for the cast polymerization that involves the cell cast polymerization and the continuous cast polymerization, JP-A-5-253,951, JP-A-5-329,847, etc., while proposing the improvements in shape, structure, and material for the gasket of the kind as mentioned above, have disclosed methods for using gaskets similarly adapted to be used as compressed and producing a plate having a thickness in the approximate range of 30 to 90% of the outer diameter of the relevant tube of gasket. Incidentally, the cast polymerization has not been proposed for the use in the polymerization of an HIPE, a non-Newtonian, thixotropic and viscous fluid. Naturally, no proposal has ever been made as to the weir that includes a gasket for the use in the cast polymerization.

The methods for producing a porous cross-linked polymer by the polymerization of an HIPE have been disclosed, for example, in WO 97/27240, WO 97/37745, etc.

WO 97/27240 discloses as a method for the production of a porous cross-linked polymer by the polymerization of an HIPE using a film, a method for the combined continuous and batch polymerization which comprises continuously packing a vertical band-shaped zippered bag made of a resin film with an HIPE, reeling the packed bag, and then polymerizing the HIPE in the bag batchwise. Further, WO 97/37745 discloses a method for the production of a porous cross-linked polymer which comprises coating an HIPE on a porous substrate (such as a felt), causing at least part of the HIPE to impregnate the porous substrate, and polymerizing the HIPE deposited on the substrate.

The method for polymerizing an HIPE as disclosed in WO 97/27240, however, entails the problem of failing to make the most of the advantage of the continuous packing step because the operation from packing through polymerization of the HIPE cannot be carried out continuously and consequently because the transitional stage between the step for continuous packing of HIPE and the step for batch polymerization constitutes itself a rate-determining process. Further, since the operation from packing through polymerization of the HIPE is not carried out continuously, the film selected for the use in this method leaves out of consideration about durability at elevated temperatures and capability of recyclic use as well. This method also entails the problem of imposing limits on height (width) and thickness of the bag, encountering difficulty in retaining uniformity of thickness and performance quality of the bag, and failing to control the width and the thickness freely, because the lower part of the bag tends to gain in thickness under the weight of the HIPE and, to make the matter worse, because the oil phase and the liquid phase of the HIPE tend to deflect and separate vertically from each other, despite the belief that the lower part of the bag begins to thicken as compared with that at the time of packing the HIPE and the uniformity of thickness of the bag is exalted slightly in consequence of the reeling operation. This method, owing to the use of the bag made of film, further entails the problem of failing to obtain a porous cross-linked polymer which is possessed of varied properties on the opposite surfaces, though it barely obtains a porous cross-linked polymer possessed of identical properties both on the surfaces.

WO 97/37745 states that the polymerization may be performed batchwise or continuously, whichever may suit the occasion better. It has absolutely no typical proposal regarding a process for the continuous production of an HIPE using a porous substrate and a polar material in combination.

The films disclosed in the conventional techniques have respectively definite qualities as described above. No typical proposal of any sort has ever been made concerning the selection of a film which is excellent in durability (resistance to heat, resistance to the action of monomer, resistance to hydrolysis, and capability of recycling) fit for the polymerization at elevated temperatures and capable of controlling the surface properties of a porous cross-linked polymer (such as smoothness, ability to form open cell structure, and resistance to occurrence of pinholes and voids).

(1) Technique Concerning Coating

The coating technique exists which continuously applies a liquid substance on a supporting member being advanced as retained horizontally (such as a belt conveyor and a film advanced through a horizontally set path).

The term "coating" used herein is defined as "applying on a substrate a layer intended for coating, finishing, or protecting either or both of the opposite surfaces of the substrate" (Coating & Laminating: published by Kako Gijutsu Kenkyusho).

The industrial coating technique has been aimed mainly at forming a thin film on a substrate. The coating materials generally adopted for this technique are an emulsion, a liquid resin, a polymer melt, etc.

The conditions which are generally applied to the coating are shown below (Reference: "Coating Methods" published by Maki Shoten).

Coating speed: up to 1000 m/min

Coating mass: up to 200 g/m$^2$ (based on specific gravity as 1, applied in a thickness of 200 $\mu$m at a coating rate of 200 g/m$^2$)

Viscosity of coating: 0.01 to 100 Pa.s (usually a Newtonian fluid)

Method for coating: Various coaters are used often

Leveling property: Automatically leveled by gravity to form a flat surface owing to the Newtonian property.

(2) Technique Concerning Acrylic Casting

The continuous forming of an acrylic cast plate is available as a technique for continuously spraying a compound on a supporting member adapted to be advanced as horizontally retained, for example, a steel belt.

This technique forms a coat of a larger thickness (approximately up to 15 mm) as compared with the technique of coating.

The resin component is an acrylic syrup which is a Newtonian fluid.

Typically, U.S. Pat. No. 4,019,811 discloses a method for regulating a thickness of a coat by continuous forming of an acrylic cast sheet.

The method disclosed in this publication is claimed to effect the regulation of thickness by means of double steel belts, specifically by injecting resin melt between opposed rigid objects.

The method is claimed to deprive the upper belt of sag by applying hydraulic pressure to retain a prescribed distance between the opposed belts. This distance between the belts consequently corresponds to the thickness of the acrylic cast sheet.

The resin itself has no ability to retain the thickness of itself unless it is placed to fill the closed space (except after the solidification). By the regulation of thickness as mentioned above and the application of hydraulic pressure, the resin is enabled to retain its thickness.

The amount of the resin to be supplied is not controlled. The resin is eventually supplied in a prescribed amount.

As a means for the continuous formation of an acrylic cast sheet, JP-A-3-68,605 also discloses a method which comprises supplying a resin of high viscosity through an extruding device or a die (in spite of unusually high viscosity) meanwhile imparting shape thereto.

This publication has a remark, reading "the thickness of the polymer is usually decided at the point of departure from the die. It is only the amount of the resin to be supplied that is decided. The thickness and the shape of the sheet of resin, however, are decided by the distance between the opposed steel belts after all.

Despite a mention purporting unnecessities of providing the upper belt with a retaining device, the action of retaining the upper belt is actually implemented with a liquid, a semi-solid, or a solid. That is, the hydraulic pressure contemplated by the invention of U.S. Pat. No. 4,019,811 has given place to the viscosity of liquid, the rigidity of a semi-solid, or the rigidity of a solid.

Further, since the method of this publication mentioned above uses an extruding device, a die, or double steel belts, the apparatus for implementing the method has a huge and expensive construction.

The resin itself has no ability to retain the thickness and the shape of itself at the stage of departure in a hot molten state from the die. It is simply difficult to move (to be fluidized) because of its high viscosity.

The present inventors, therefore, have made a diligent study with a view to overcoming the problems to be encountered by the method for producing a porous cross-linked polymer by the polymerization of the HIPE identified above. They have consequently perfected a method for the production of a porous cross-linked polymer, which is capable of controlling the surface properties of the porous cross-linked polymer, permitting free control of the width and the depth of the polymer, and continuously carrying out the operation ranging from supplying through polymerizing the HIPE. Specifically, they have found that in the method for the production of a porous cross-linked polymer by the polymerization of an HIPE, the problems mentioned above can be solved by causing the outer surface of the HIPE by a means for decreasing an oxygen content to assume an atmosphere or a state having a lower oxygen content than an ambient air and continuously performing steps from the supplying through the polymerization of the HIPE, preferably continuously performing the steps from the supplying through the polymerization of the HIPE in the horizontal method (namely by subjecting the HIPE to horizontal continuous polymerization).

Unlike the conventional method for the combined continuous and batch polymerization which comprises batchwisely polymerizing an HIPE and subsequently slicing the produced polymer in a fixed thickness, the method for the horizontal continuous polymerization of an HIPE mentioned above is targeted at generously curtailing the process of production by continuously carrying out a series of operations ranging from supplying through polymerization of an HIPE thereby effecting the impartation of a necessary thickness to the produced polymer. The novel method for the horizontal continuous polymerization of an HIPE which has been perfected by the present inventors has originated in the discovery that the success in securing at such a stage of manufacture a formed polymer in process having a thickness of unusually high accuracy constitutes an important and new technical task, i.e. a task peculiar to the method for the horizontal continuous polymerization.

Further, the present inventors, in appreciation of the fact that adoption of cast polymerization has not been proposed concerning the polymerization of a thixotropic and viscous HIPE which is a non-Newtonian fluid and that no suggestion has been made concerning the weir including a gasket for cast polymerization, have pursued a diligent study on the horizontal continuous polymerization of a non-Newtonian, thixotropic, and viscous HIPE, with a view to establishing a technique for producing an HIPE polymer while preventing the HIPE from leaking, enabling the formed polymer to acquire and retain a necessary thickness, preventing the HIPE from escaping polymerization owing to a decrease in oxygen supply, and enabling the formed polymer to retain a superposed sheet such as an upper film. As a result, they have acquired a knowledge that, in the method for producing a porous cross-linked polymer by the horizontal continuous polymerization of an HIPE, the object mentioned above can be attained by using a weir at each of the sides of the HIPE supporting member along the width direction.

They, however, have found that the process for the horizontal continuous polymerization of an HIPE mentioned above poses another technical task concerning the thickness of the sheet material along the width direction because ① the sheet material, after entering a furnace for the polymerization and curing, sags under its own weight and induces a change in thickness, ② the deflection of the sheet material under its own weight is constant and the deviation thereof, therefore, grows in proportion to the decrease in the thickness aimed at, and ③ the deflection mentioned grows in proportion as the width (forming width) for injecting an HIPE increases.

They further have found that the process for the horizontal continuous polymerization of an HIPE mentioned above poses such a new technical task concerning the travel direction (the direction of flow) of the polymerization line as that ① the tensile force in the direction of flow of the sheet material placed in the furnace is decided by the roll in the HIPE-injecting part and the roll mounted on the outlet side of the furnace for the polymerization and curing and this tensile force, when suffered to grow to an unduly large extent, gathers wrinkles in the sheet material and these longitudinal wrinkles deprive the HIPE surface of smoothness and impart an undulating state to the finished product and this phenomenon gains in conspicuousness because of the viscous quality (great thixotropy) of the HIPE and ② when two vertically opposed nip rolls which will be specifically described herein below are adopted in the resin-injecting part for the purpose of controlling thickness and combining sheet materials and when the feeding speed (rotation rate) of the nip rolls is larger than the speed of reeling the sheet materials, the insertion of the sheet materials proceeds excessively and invokes the surface of the porous cross-linked polymer as the polymerized product to gather lateral wrinkles.

It is, therefore, an object of this invention to provide for the production of a porous cross-linked polymer by the horizontal continuous polymerization of an HIPE which can improve the smoothness of flat surface and the accuracy of thickness of the produced polymer.

To be more specific, in a series of operations of imparting an HIPE with high accuracy to a supporting member being moved as retained horizontally (such as a belt conveyor or a sheet material moved as retained in a horizontal state), superposing a sheet material on the upper surface of the superposed HIPE layer, and curing the resultant HIPE in a polymer curing furnace, this invention is to provide a method for obtaining a porous cross-linked polymer as a polymerized and cured product while enabling the HIPE to retain an accurately formed cross-sectional shape (smooth flat surface and accurate thickness) even when it is held inside the curing furnace.

In addition to the objects described above, this invention has another object of providing a method for improving the HIPE's ability to intercept air at the opposite end parts thereof.

In the solution of such important and new technical tasks as pointed out above, it has been ascertained that the conventional coating techniques and acrylic casting techniques mentioned above differ in many points from the method for the horizontal continuous polymerization of an HIPE and, therefore, cannot be applied in their unmodified form to the method of interest.

That is, the method for horizontal continuous polymerization of an HIPE, though different from the conventional coating techniques in terms of the kind of object to be handled, constitutes itself a technique for applying an HIPE (non-Newtonian fluid) in an unusually large thickness (to a maximum of approximately 100 mm) under the following conditions.

Line speed: 0.1 to 100 m/min

Amount of supply: Maximum 100 kg/m$^2$ (in the case of the thickness of 100 mm)

Viscosity: Incapable of unique definition on account of thixotropy (non-Newtonian, function of shear rate)

Self-leveling: The self-leveling under gravity occurs only with difficulty or consumes time because the HIPE is an apparently solid or unusually viscous liquid at zero shear.

Thus, in the case of the HIPE, the accuracy of thickness is not easily secured because the formation of a flat surface by the self-leveling occurs only with difficulty. It has been ascertained consequently that the horizontal continuous polymerization must be performed by securing the accuracy of thickness at the stage for supply and impartation of shape.

Conversely, since the formed polymer has an ability to retain the imparted shape by itself, it is capable of retaining the thickness and the shape even after the polymerization. It has been consequently ascertained that the horizontal continuous polymerization has no need for such an expensive and massive device as double steel belts.

When the horizontal continuous polymerization of an HIPE is compared with the conventional coating and acrylic casting techniques in the light of the various points mentioned above, the following contrasts are revealed.

Coating mass: Horizontal continuous polymerization of HIPE, Acrylic cast sheet>>Coating Coating viscosity: Non-Newtonian vs. Newtonian Leveling property: Absence of leveling property vs. Self-leveling property Retention of thickness: Self-retaining property vs. No bearing on retention of thickness because of retention by external force or thinness of film The conventional coating technique and acrylic casting technique differ in many points from the method for horizontal continuous polymerization of an HIPE and, therefore, cannot be applied in their unmodified form to the method of interest. In a novel process for the horizontal continuous polymerization of an HIPE, this invention has yet another object of providing a novel method for obtaining a porous cross-linked polymer of a thickness of extremely high accuracy notwithstanding the HIPE (non-Newtonian fluid) is applied in a very large thickness (to a maximum of approximately 100 mm) at the stage of production which constitutes itself an important and new technical task.

More specifically, in a novel process for the horizontal continuous polymerization of an HIPE, this object of the present invention resides in providing a novel method for obtaining a porous cross-linked polymer of a thickness of high accuracy by supplying the HIPE to an apparatus for the horizontal continuous polymerization and performing impartation of shape and regulation of thickness on the HIPE thereby effecting the horizontal continuous polymerization of the HIPE in a thickness of satisfactory accuracy.

DISCLOSURE OF INVENTION

For the purpose of accomplishing the objects as mentioned above, the present inventors have pursued a series of studies diligently concerning the method for the polymerization of a thixotropic and viscous HIPE which is a non-Newtonian fluid. This invention has been perfected as a result.

Specifically, the objects of this invention can be accomplished by (1) a method for the production of a porous cross-linked polymer by the horizontal continuous polymerization of a water-in-oil high internal phase emulsion, which comprises using a weir one each at the opposite end parts in the width direction of an emulsion supporting member for the use in the horizontal continuous polymerization of the emulsion.

Further, the objects of this invention can be accomplished by (2) the method for production set forth in (1) above, wherein the height of the weir is in the range of 0.5 to 100 mm.

Further, the objects of this invention can be accomplished by (3) the method for the production of a porous cross-linked polymer set forth in (1) or (2) above, wherein a supporting member is used on the lower side of the emulsion and a sheet material on the upper side thereof for performing the horizontal continuous polymerization of the emulsion and a tensile force is exerted in the width direction and/or the travel direction of the sheet material.

Further, the objects of this invention can be accomplished by (4) the method set forth in (3) above, wherein the tensile force is exerted by a tension roller, a pin tenter, or a clip tenter in the width direction of the sheet material.

The other objects of this invention can be further accomplished by (5) the method for production set forth in (3) or (4) above, wherein either a thickness imparting roll or a reeling device provided with a nip roll comprising a driven roll and a drive roll vertically opposed across a space and further provided with a torque control mechanism in the reeling part on the outlet side of a polymerization furnace is disposed in the part for injecting the emulsion on the inlet side of the polymerization furnace relative to the travel direction of the sheet material for the purpose of adjusting the tensile force in the travel direction.

Further, the other objects of this invention can be accomplished by (6) the method for production set forth in any one of (1) to (5) above, wherein the thickness of the emulsion is regulated by passing the emulsion between a movable supporting member and an object disposed so as to retain a prescribed distance from the movable supporting member.

The objects of this invention can be also accomplished by (7) the method for production set forth in (6) above, wherein a plurality of such objects as mentioned above are arranged in the travel direction of the movable supporting member.

Further, the other objects of this invention can be accomplished by (8) the method for production set forth in any one of (1) to (5) above, wherein a die is used in the supply part for the emulsion as a means for spreading the emulsion in the width direction of the movable supporting member.

Furthermore, the objects of this invention can be accomplished by (9) a method for production of a porous cross-linked polymer, which comprises a method set forth in (6) or (7) above in combination with a method set forth in (8) above.

For the purpose of solving the new technical tasks mentioned above, the present inventors have pursued a series of studies diligently concerning the method for producing a porous cross-linked polymer by the horizontal continuous polymerization of an HIPE and have consequently perfected the following invention. They have further discovered that the combinations of this invention with the invention described above may be also useful.

Specifically, the objects of this invention can be accomplished by (10) a method for the production of a porous cross-linked polymer by the horizontal continuous polymerization of a water-in-oil high internal phase emulsion, which comprises using a supporting member on the lower side of the emulsion and a sheet material on the upper side thereof for performing the horizontal continuous polymerization of the emulsion and performing the polymerization by exerting a tensile force in the width direction and/or the travel direction of the sheet material.

The objects of this invention can be also accomplished by (11) the method for production set forth in (10) above, wherein the tensile force is exerted by a tension roller, a pin tenter, or a clip tenter in the width direction of the sheet material.

The other objects of this invention can be accomplished also by (12) the method for the production set forth in (10) or (11) above, wherein either a thickness imparting roll or a reeling device provided with a nip roll comprising a driven roll and a drive roll vertically opposed across a space and further provided with a torque control mechanism in the reeling part on the outlet side of a polymerization furnace is disposed in the part for injecting the emulsion on the inlet side of the polymerization furnace relative to the travel direction of the sheet material for the purpose of adjusting the tensile force in the travel direction.

The other objects of this invention can be further accomplished by (13) the method for production set forth in any one of (1) to (12) above, wherein the thickness of the emulsion is regulated by passing the emulsion between a movable supporting member and an object disposed so as to retain a prescribed distance from the movable supporting member.

The other objects of this invention can be also accomplished by (14) the method for production set forth in (13) above, wherein a plurality of such objects as mentioned above are arranged in the travel direction of the movable supporting member.

The other objects of this invention can be further accomplished by (15) the method for production set forth in any one of (10) to (12) above, wherein a die is used in the supply part for the emulsion as a means for spreading the emulsion in the width direction of the movable supporting member.

The other objects of this invention can be further accomplished by (16) a method for the production of a porous cross-linked polymer, which comprises a method set forth in (13) or (14) above in combination with a method set forth in (15) above.

For the purpose of accomplishing the objects as mentioned above, the present inventors have pursued a diligent study in search of a novel method for the horizontal continuous polymerization of an HIPE and have consequently acquired a knowledge that the thixotropic (non-Newtonian) qualities of the HIPE can be utilized advantageously and effectively for enabling the horizontal continuous polymerization of the HIPE with satisfactory accuracy of thickness. The present invention has been perfected based on this knowledge. They have further discovered that the combinations of this invention with the invention described above may be likewise useful.

Specifically, the objects of this invention can be accomplished by (17) a method for the production of a porous cross-linked polymer by the horizontal continuous polymerization of a water-in-oil high internal phase emulsion, which comprises effecting the regulation of thickness of the emulsion by passing the emulsion between a movable supporting member and an object disposed so as to retain a prescribed distance from the movable supporting member.

The objects of this invention can be also accomplished by (18) the method for production set forth in (17) above, wherein a plurality of such objects as mentioned above are arranged in the travel direction of the movable supporting member.

The other objects of this invention can be accomplished also by (19) a method for the production of a porous cross-linked polymer by the horizontal continuous polymerization of a water-in-oil high internal phase emulsion, which comprises using a die in the supply part for the emulsion as a means for spreading the emulsion in the width direction of the movable supporting member.

The other objects of this invention can be further accomplished by (20) a method for the production of a porous cross-linked polymer, which comprises a method set forth in (17) or (18) above in combination with a method set forth in (19) above.

BRIEF DESCRIPTION OF DRAWINGS

FIG. 1(A) is a typical schematic diagram for simply illustrating the theory for the ability of a coater to effect impartation of shape and regulation of thickness by virtue of the thixotropic (non-Newtonian) qualities of the HIPE in the method for production of this invention. FIG. 1(B) is a model diagram which, for simplifying the description of the theory depicted in FIG. 1(A), represents changes in the viscosity peculiar to a non-Newtonian fluid at positions before and after the coater.

FIG. 4 is a schematic diagram illustrating one embodiment of the shape of a tension roller.

FIG. 5 is a schematic diagram illustrating another embodiment of the shape of a tension roller.

FIG. 6 is a schematic diagram illustrating a typical embodiment of the method for disposing a tension roller.

FIG. 26 is a schematic diagram illustrating a polymerization apparatus used in Comparative Example 3, particularly the manner of performing operations from supply of an HIPE through impartation of shape thereof.

FIG. 27 is a schematic diagram illustrating a polymerization apparatus used in Example 12, particularly the manner of performing operations from supply of an HIPE through regulation of thickness by the use of one knife coater.

FIG. 28 is a schematic diagram illustrating a polymerization apparatus used in Example 13, particularly the manner of performing operations from supply of an HIPE through regulation of thickness by the use of a plurality of (2) knife coaters; FIG. 28(A) is across section subsequently to the regulation of thickness of the HIPE and FIG. 27(B) is a side view.

FIG. 29 is a schematic diagram illustrating a polymerization apparatus used in Example 14, particularly the manner of performing operations from supply of an HIPE through regulation of thickness by the use of a T die; FIG. 29(A1) is a cross section subsequently to the regulation of thickness of the HIPE and FIG. 29(A2) is a plan view of FIG. 29(A1). Incidentally, FIG. 29(B1) is a referential diagram, i.e., a cross section subsequently to the regulation of thickness of an HIPE in Example 12 and FIG. 29(B2) is a plan view of FIG. 29(B1).

FIG. 30 is a schematic diagram illustrating a polymerization apparatus used in Example 15, particularly the manner of performing operations from supply of an HIPE through regulation of thickness by the combined use of a T die and one knife cater.

FIG. 31 is a schematic diagram illustrating a polymerization apparatus used in Example 16, particularly the manner of performing operations from supply of an HIPE through regulation of thickness by the combined use of a T die and a plurality of (2) knife coaters.

FIG. 36 is a schematic diagram illustrating a polymerization apparatus used in Example 22, particularly the manner of effecting the regulation of thickness of an HIPE using weirs.

BEST MODE FOR CARRYING OUT THE INVENTION

Figure 2:
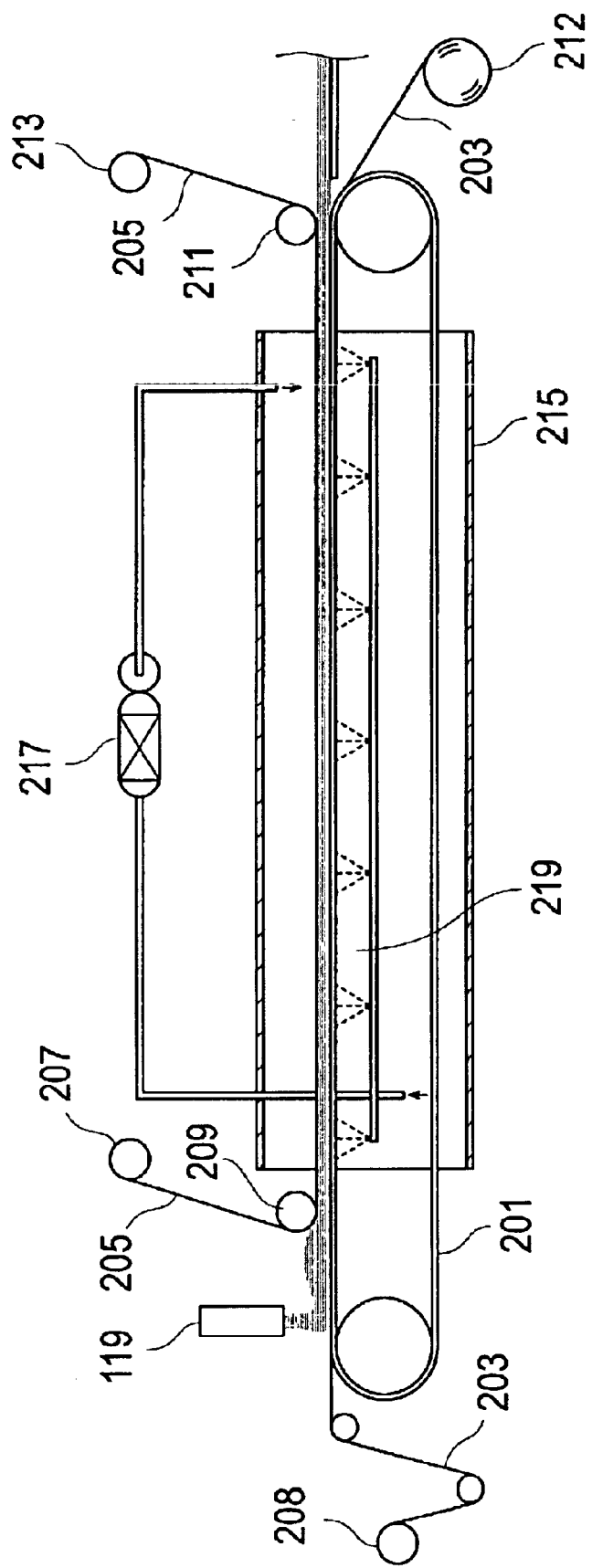
FIG. 2 is a schematic side view illustrating a typical embodiment of the polymerization apparatus including a sheet material (a movable supporting member) held in motion on an endless belt.

This invention relates to a method for the production of a porous cross-linked polymer by the horizontal continuous polymerization of an HIPE, which comprises using a weir one each at the opposite end parts in the width direction of an HIPE supporting member (hereinafter occasionally referred simply to as "supporting member") for the use in the horizontal continuous polymerization of the HIPE, preferably an HIPE movable supporting member (hereinafter occasionally referred simply to as "movable supporting member").

This invention relates to a method for the production of a porous cross-linked polymer by the horizontal continuous polymerization of a water-in-oil type high internal phase emulsion which comprises using a supporting member on the lower side of the HIPE and a sheet material on the upper side thereof, and performing the polymerization by exerting a tensile force in the width direction and/or the travel direction of the sheet material. By this method, the smoothness of flat surface and the accuracy of thickness of the produced polymer, particularly the accuracy of thickness in the width direction of the produced polymer, can be improved.

This invention concerns a method for the production of a porous cross-linked polymer by the horizontal continuous polymerization of an HIPE, which comprises passing the HIPE between a movable supporting member and an object disposed so as to retain a prescribed distance from said movable supporting member so as to regulate the thickness of the produced polymer.

The theory for the ability of a coater (a coating means), i.e., an object to be disposed so as to retain the HIPE at a prescribed distance relative to the upper side of a movable supporting member, to effect impartation of shape and regulation of thickness by virtue of thixotropic (non-Newtonian) qualities of the HIPE and owing to the passage of the HIPE between them will be briefly explained with reference to the diagrams.

FIG. 1 is a schematic diagram illustrating a model of change in viscosity of an HIPE, i.e., a thixotropic fluid, at the contacting part of the HIPE with a coater.

In the impartation of shape by a coater 101 (a knife coater, for example, in FIG. 1), a liquid component (HIPE) is caused to flow into the space between the coater 101 and a movable support in a member 13 by the motion of the supporting member 103 and a difference in head 105 between the inlet and the outlet of the coater 101 as clearly shown in FIG. 1(A).

In the case of a Newtonian fluid, since the viscosity is identical before and after passing through the coater, no hindrance is caused by a difference in viscosity between the inlet and the outlet of the coater. By a difference in head produced by a bank (see FIG. 1), therefore, the liquid component flows into the coater in a volume larger than the volume of the space between the coater and the movable supporting member and assumes a thickness greater than that of the space by the coater (owing to the difference between the speed of the supporting member and the speed of inflow of the Newtonian fluid). Further, a change if any in the height of the bank before the coater results in varying the amount of inflow and preventing the thickness from becoming constant after the regulation. In the case of the Newtonian fluid, therefore, the coater permits impartation of shape but renders the relation of thickness difficult for the reason given above.

In contrast, in the case of an HIPE which is a thixotropic fluid, a change in the shear speed before and after the coater 101 gives rise to a situation in which low viscosity occurs on a lower side 107 of contact of the coater 101 and very high viscosity occurs before and after the coater 101 (see FIG. 1(B)), with the result that the excess of HIPE will enter the gap defined by the lower side 107 of coater only with difficulty. (Strictly, though the difference in head 105 may constitute itself the propelling force for the inflow, it brings only insignificant effects.)

By the hindrance arising from the difference in viscosity before and after the lower side 107 of contact of the coater 101, even a coater of such simple construction as a doctor knife is enabled to effect the impartation of shape and the regulation of thickness as well.

Since the high viscosity existing while the coater is suspended from operation (during zero shear) obstructs the HIPE from being leveled under gravity, the use of the coater is necessary in the sense of ensuring the leveling to proceed.

As the means for solving the other technical task of this invention, a method for producing a porous cross-linked polymer by the horizontal continuous polymerization of an HIPE wherein a die is used in the supply part for said emulsion as a means for spreading said emulsion in the width direction of the movable supporting member is provided.

By passing the HIPE between the movable supporting member and the object (a coater, for example) disposed so as to retain a prescribed distance relative to the upper side of the movable supporting member as the means for solving the technical task of this invention, when applied to the HIPE, the HIPE which manifests inferior self-leveling properties as pointed out above has a low spreading force in the width direction (vertical relative to the travel direction of the movable supporting member). This fact was left unexplained in the passage concerning successful regulation of thickness by the passage of the HIPE between the coaters. The polymer cannot be obtained in a prescribed width unless the HIPE is amply stored (till a state of being filled with the HIPE in the width direction) to form a bank (see FIG. 1(A)) in front of the coater before the movable supporting member is started and subsequently the HIPE is supplied in a stated amount and the movable supporting member is operated meantime.

The use of a die, specifically a T die, as the means for enabling the HIPE to be spread in the width direction, therefore, constitutes itself an essential construction of the invention. When the HIPE can be spread in a uniform thickness in the width direction by the use of the die, therefore, a pattern obviating the necessity for the coater which is the means for solving the task mentioned above is fully conceivable. Theoretically, it is technically feasible to spread the HIPE in a uniform thickness in the width direction in spite of an increase in width. Actually, however, the use of this die is difficult because it requires delicate adjustment. In this case, the combined use of the former means for solving the technical task of this invention and the means for using the T die as a method for spreading the HIPE in the width direction turns out to be a preferred embodiment.

Now, the component steps of the method for the production of a porous cross-linked polymer contemplated by this invention will be described in detail below in the order of their occurrence.

[I] Raw Material (HIPE)

(1) Composition of HIPE

The components of the HIPE which can be used in the method for the production of a porous material contemplated by this invention does not need to be particularly discriminated. It may be properly selected among compositions heretofore known in the art to suit the purpose for which the product is intended to be used. The composition of the HIPE is only required specifically to contain as essential components a monomer composition comprising (a) a polymerizing monomer containing one polymerizing unsaturated group in the molecular unit thereof and (b) a cross-linking monomer containing at least two polymerizing unsaturated groups in the molecular unit thereof, (c) a surfactant, (d) water, and (e) a polymerization initiator. It may optionally contain (f) a salt and (g) another additive as arbitrary components as well.

(a) Polymerizing Monomer Containing one Polymerizing Unsaturated Group in the Molecule Thereof The monomer composition essential for the composition of the HIPE mentioned above is a polymerizing monomer having one polymerizing unsaturated group in the molecule thereof. Though it does not need to be particularly discriminated but has only to be capable of being polymerized in a dispersion or a water-in-oil type high internal phase emulsion and allowed to form an emulsion consequently. It preferably contains a (meth)acrylic ester at least partly, more preferably contains not less than 20 mass % of the (meth) acrylic ester, and particularly preferably contains not less than 35 mass % of the (meth)acrylic ester. When the (meth)acrylic ester is contained as a polymerizing monomer having one polymerizing unsaturated group in the molecule thereof proves advantageous because the produced porous cross-linked polymer abounds in flexibility and toughness.

As typical examples of the polymerizing monomer which is used effectively in this invention, allylene monomers such as styrene; monoalkylene allylene monomers such as ethyl styrene, α-methyl styrene, vinyl toluene, and vinyl ethyl benzene; (meth)acrylic esters such as methyl (meth)acrylate, ethyl (meth)acrylate, butyl (meth)acrylate, isobutyl (meth) acrylate, isodecyl (meth)acrylate, 2-ethylhexyl (meth) acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizing monomers may be used either singly or in the form of a combination of two or more members.

The content of the polymerizing monomer may be preferably in the range of 10 to 99.9 mass %, based on the total mass of the monomer composition consisting of the polymerizing monomer and a cross-linking monomer. The reason for this range is that the produced porous cross-lined polymer can acquire pores of minute diameters. The range may be more preferably in the range of 30 to 99 mass %, particularly preferably 30 to 70 mass %. If the content of the polymerizing monomer is less than 10 mass %, the produced porous cross-linked polymer would be possibly friable and deficient in water absorption ratio. Conversely, if the content of the polymerizing monomer exceeds 99.9 mass %, the porous cross-linked polymer consequently produced would be possibly deficient in strength and elastic recovery power and incapable of securing sufficient amount of water absorbed and sufficient velocity of water absorption.

(b) Cross-Linking Monomer having at Least Two Polymerizing Unsaturated Groups in the Molecule The other member essential for the monomer composition of the HIPE mentioned above is a cross-linking monomer having at least two polymerizing unsaturated groups in the molecule thereof. Similarly to the polymerizing monomer mentioned above, it does not need to be particularly limited so long as it have only to be capable of being polymerized in a dispersion or a water-in-oil type high internal phase emulsion and allowed to form an emulsion consequently.

As typical examples thereof, aromatic monomers such as divinyl benzene, trivinyl benzene, divinyl toluene, divinyl xylene, p-ethyl-vinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and esters of polyhydric alcohols with acrylic acid or methacrylic acid such as ethylene glycol di(meth)acrylate, diethylene glycol di(meth)acrylate, triethylene glycol di(meth) acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth) acrylate, trimethylol propane tri(meth)acrylate, pentaerythritol di(meth)acrylate, pentaerythritol tri(meth)acrylate, pentaerythritol tetra(meth)acrylate, dipentaerythritol di(meth) acrylate, dipentaerythritol tri(meth)acrylate, dipentaerythritol tetra(meth)acrylate, N,N'-methylene bis (meth)acryl amide, triallyl isocyanurate, triallyl amine, tetraallyloxy ethane, hydroquinone, catechol, resorcinol, and sorbitol maybe cited These cross-linking monomers may be used either singly or in the form of a combination of two or more members.

The content of the cross-linking monomer may be preferably in the range of 0.1 to 90 mass %, more preferably 1 to 70 mass %, particularly preferably 30 to 70 mass %, based on the total mass of the monomer composition consisting of the polymerizing monomer and the cross-linking monomer. If the content of the cross-linking monomer is less than 0.1 mass %, the produced porous cross-linked polymer would possibly be deficient in strength and elastic recovery force, unable to effect absorption sufficiently per unit volume or unit mass, and incapable of securing absorption in a sufficient amount at a sufficient velocity. Conversely, if the content of the cross-linking monomer exceeds 90 mass %, the porous cross-linked polymer produced consequently would possibly be friable and deficient in water absorption ratio.

(c) Surfactant

The surfactant which is essential for the composition of the HIPE mentioned above does not need to be particularly discriminated so long as it can emulsify a water phase in an oil phase to form the HIPE. It is not limited to the specific examples cited above but may be selected among the nonionic surfactants, cationic surfactants, and amphoteric surfactants heretofore known to the art.

Among these surfactants, the nonionic surfactants include nonyl phenol polyethylene oxide adducts; block polymers of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonylphenyl ether; polyoxyethylene sorbitan fatty acid esters such as polyoxyethylene sorbitan monolaurate, polyoxyethylene sorbitan monomyristylate, polyoxyethylene sorbitan monopalmintate, polyoxyethylene sorbitan monostearate polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides, for example. They may preferably have HLB not exceeding 10, more preferably in the range of 2 to 6. These nonionic surfactants may be used in the form of a combination of two or more members. This combined use may possibly result in improving the stability of the HIPE.

The cationic surfactants include quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate, and stearyl amine acetate; alkyl betaines such as lauryl betaine, stearyl betaine, and lauryl carboxymethyl hydroxyethyl imidazolium betain; and amine oxides such as lauryl dimethyl amine oxide, for example. The use of such a cationic surfactant may possibly enable the produced porous cross-linked polymer to manifest excellent antibacterial properties when the material is used for an absorbent material, for example.

Incidentally, the combined use of a nonionic surfactant and a cationic surfactant may possibly result in improving the stability of the HIPE.

The content of the surfactant mentioned above may be preferably in the range of 1 to 30 parts by more preferably 3 to 15 parts by mass, based on 100 parts by mass of the total mass of the monomer composition consisting of the polymerizing monomer and the cross-linking monomer. If the content of the surfactant is less than 1 part by mass, the shortage would be at a disadvantage in possibly impairing the stability of the high dispersibility of the HIPE and preventing the surf actant from sufficiently manifesting the operation and function inherent therein. Conversely, if the content of the surf actant exceeds 30 parts by mass, the excess would be at a disadvantage in possibly rendering the produced porous cross-linked polymer excessively brittle and disrupting the expected proportionate addition to the effects of the surfactant.

(c) Water

As the water which is an essential component for the construction of the HIPE mentioned above, in addition to purified water and deionized water, waste water to be obtained in the production of the porous cross-linked polymer may be used either in its unmodified form or after it has been given a prescribed treatment with a view to promoting the reuse of the waste water.

The content of the water mentioned above may be properly selected to suit the purpose for which the porous cross-linked polymer containing open cells aimed at is used (for example, a water absorbent material, an oil absorbent material, a soundproof material, and a filter). It may be decided, for example, so that the HIPE eventually produced will assume an expected water phase/oil phase (W/O) ratio which will be specifically described herein below.

(e) Polymerization Initiator

The polymerization initiator essential for the composition of the HIPE has only to be a polymerization initiator which can be used for the reverse-phase emulsion polymerization. It may be soluble in water or in an oil, whichever may fit for the occasion. As typical examples thereof, azo compounds such as 2,2'-azobis(2-amidinopropane) dihydrochloride; persulfates such as ammonium persulfate, potassium persulfate, and sodium persulfate; peroxides such as hydrogen peroxide, sodium peracetate, sodium percarbonate, cumene hydroperoxide, t-butyl hydroperoxide, di-t-butyl peroxide, diisopropyl benzene hydroperoxide, p-methane hydroperoxide, 1,1,3,3-tetramethylbutyl hydroperoxide, 2,5-dimethylhexane-2,5-dihydroperoxide, benzoyl peroxide, and methylethyl ketone peroxide; and redox initiators formed by combining the peroxides mentioned above with such reducing agents as sodium hydrogensulfite, sodium thiosulfate, L-ascorbic acid, iron II salts, formaldehyde, sodium sulfoxylate, glucose, dextrose, and diethanolamine may be cited. These polymerization initiators may be used either singly or in the form of a combination of two or more members.

The content of the polymerization initiator mentioned above may be preferably in the range of 0.05 to 15 parts by mass, more preferably 1.0 to 10 parts by mass, based on 100 parts by mass of the total mass of the monomer composition consisting of the polymerizing monomer and the cross-linking monomer, though it may be varied with the combination of the monomer composition and the polymerization initiator. If the content of the polymerization initiator is less than 0.05 part by mass, the shortage would be at a disadvantage in increasing the amount of unaltered monomer components and consequently increasing the residual monomer content in the produced porous cross-linked polymer. Conversely, if the content of the polymerization initiator exceeds 15 parts by mass, the excess would be at a disadvantage in rendering the polymerization difficult to control and degrading the mechanical property of the produced porous cross-linked polymer.

(f) Salt

The salt as an arbitrary component for the composition of the HIPE mentioned above may be used when it is necessary for improving the stability of the HIPE.

As typical examples of the salt, halogenides, sulfates, nitrates, and other similar water-soluble salts of alkali metals and alkaline earth metals such as calcium chloride, sodium sulfate, sodium chloride, and magnesium sulfate may be cited. These salts may be used either singly or in the form of a combination of two or more members. Such a salt may be preferably added in the water phase. Among other salts cited above, polyvalent metal salts prove particularly advantageous from the viewpoint of the stability of the HIPE during the course of polymerization.

The content of the salt may be preferbaly in the range of 0.1 to 20 parts by mass, preferably 0.5 to 10 parts by mass, based on 100 parts by mass of the total mass of the monomer composition consisting of the polymerizing monomer and the cross-linking monomer. If the content of the salt exceeds 20 parts by mass, the excess would be at a disadvantage in suffering the waste water squeezed out of the HIPE to contain the water in an unduly large amount, boosting the cost for the disposal of the waste water, failing to bring a proportional addition to the effect, and not doing any good economically. If the content is less than 0.1 part by mass, the shortage would possibly prevent the effect of the addition of the salt from being fully manifested.

(g) Other Additive

Varying other additive which are capable of improving the conditions of production, the property of HIPE, and the performance of the porous cross-linked polymer by imparting the performance and the function of their own, they may be suitably used herein. For example, a base and/or a buffer may be added for the purpose of adjusting the pH value. The content of the other additive may be selected within such a range that the additive used may fully manifest the performance, function, and further the economy commensurate with the purpose of addition.

(2) Water Phase/Oil Phase Ratio (Mass Ratio)

The water phase/oil phase ratio (mass ratio) (hereinafter occasionally abbreviated simply as "W/O ratio") of the HIPE mentioned above does not need to be particularly limited but may be suitably selected depending on the kind of use (for example, a water absorbent material, an oil absorbent material, a soundproof material, and a filter) for which the porous cross-linked polymer containing continuous cells is intended. When the W/O ratio is in the range of 10/1 to 100/1, for example, the produced porous cross-linked polymer may be suitable for the use in various absorbent materials such as disposable diapers, sanitary materials, and the like. Since void ratio of the porous material may be decided by varying the W/O ratio, the W/O ratio may be preferably not less than 3/1, more preferably in the range of 10/1 to 250/1, particularly preferably 10/1 to 100/1. If the W/O ratio is less than 3/1, the shortage would be at a disadvantage in suffering the produced porous cross-linking polymer to be deficient in the ability to absorb water and energy and in the degree of openings as well and possibly lowering the degree of openings in the surface of the produced porous cross-linked polymer and preventing the polymer from acquiring an ample capacity for liquid permeation.

(3) Method for Preparation of HIPE

The method for the production of the HIPE which can be used in this invention does not need to be particularly discriminated. Any of the methods for the production of HIPE heretofore known to the art may be suitably used. A typical method for the production of interest will be specifically described below.

First, the components forming an oil phase comprising a monomer composition consisting of a polymerizing monomer and a cross-linking monomer and an oil-soluble polymerization initiator (which may be additionally used or not used where a water-soluble polymerization initiator is used) are joined in each the amounts specified above and stirred at a prescribed temperature to prepare a homogeneous oil phase.

Separately, the components forming a water phase comprising water and a water-soluble polymerization initiator (which may be additionally used or not used where an oil-soluble polymerization initiator is used) and, when necessary, a salt are joined in each the amounts specified above and heated with stirred to a prescribed temperature in the range of 30° to 95° C. to prepare a homogeneous water phase.

Then, by mixing the water phase with the oil phase efficiently and exerting a proper shearing force thereon, an HIPE can be prepared stably.

(4) Apparatus for Production of HIPE

The apparatus for the production of the HIPE does not need to be particularly discriminated but may be selected among apparatuses for production of HIPE heretofore known to the art. As the stirrer (emulsifying device) to be used for mixing the water phase with the oil phase, conventional stirring devices and mixing devices may be used. As typical examples thereof, stirring devices provided with propeller type, paddle type, and turbine type vanes, homomixers, line mixers, and pin mills may be cited. Any of these devices may be used.

The optimum temperatures of the water phase and the oil phase may be in the range of 20° to 100° C. From the viewpoint of the stability of the HIPE, they may be preferably in the range of 40° to 95° C. The oil phase and the water phase may be mixed together after the temperature of the oil phase and/or the water phase has been adjusted at prescribed temperatures. Since the production of the HIPE uses the water phase in a large amount, it is commendable to adjust the water phase at a prescribed temperature as mentioned above.

(5) Temperature for Formation (Emulsification) of HIPE

The temperature for forming (emulsifying) the HIPE may be generally in the range of 20° to 100° C. From the viewpoint of the stability of the HIPE, it may be preferably in the range of 30° to 95° C., more preferably 40° to 95° C., particularly preferably 450 to 90° C., and most preferably 50° to 85° C. If the HIPE forming temperature is less than 20° C., the shortage would be at a disadvantage in heightening the viscosity of the emulsion and consequently rendering the emulsification difficult of handling. Conversely, if the HIPE forming temperature exceeds 100° C., the excess would be at a disadvantage in not allowing the emulsification to proceed under a normal pressure and suffering the emulsion obtained under a high pressure to be deprived of stability. It is commendable to have the temperature of the oil phase and/or the water phase adjusted in advance to a prescribed forming temperature (emulsifying temperature) and then have the two phases stirred and mixed till the emulsification to form the HIPE aimed at. Since the quantity of the water phase is large during the preparation (formation) of the HIPE, it may well be considered commendable to have at least the temperature of the water phase adjusted to a prescribed forming temperature (emulsifying temperature). When the polymerization of the polymerizing monomer or the cross-linking monomer is started while the emulsification is in process and then continued till the formation of the polymer, the HIPE would be possibly deprived of stability. When the HIPE containing a polymerization initiator (including a redox polymerization initiator) in advance is to be prepared, therefore, the HIPE forming temperature (emulsifying temperature) may be preferably set to a temperature at which the polymerization initiator (oxidizing agent) induces substantially no thermal decomposition. Thus, it is commendable to effect the emulsification at a temperature lower than the temperature at which the polymerization initiator (oxidizing agent) has a half-time of 10 hours (10 hours half-time temperature).

(6) Behavior of HIPE

The HIPE which is obtained by stirring the water phase with the oil phase may generally form a white emulsion with high viscosity. This HIPE, in terms of behavior, may be identified as a non-Newtonian, thixotropic fluid as described above.

Since the HIPE which can be used in this invention is thixotropic in nature, the viscosity ratio ($\eta_1/\eta_{100}$) at the shear rates, 1 [$s^{-1}$] and 100 [$s^{-1}$], may be not less than 5, preferably not less than 10, and more preferably not less than 100. If the viscosity ratio ($\eta_1/\eta_{100}$) is less than 5, the shortage would render the impartation of shape and the regulation of thickness difficult. The viscosity of the HIPE at the shear rate of 100 [$s^{-1}$] may not be more than 10 Pa.s, preferably not more than 5 Pa.s, and more preferably in the range of 3 to 0.01 Pa.s, if the viscosity exceeds 100, the excess would render the impartation of shape by this method difficult.

[II] Production of Porous Cross-Linked Polymer (1) Method for Polymerization of HIPE (Partially Inclusive of Apparatus for Polymerization)

For this invention, the production of the porous cross-linked polymer by the horizontal continuous polymerization of the HIPE mentioned above constitutes itself a construction of invention.

In the method for the production according to this invention, the mode of effecting the horizontal continuous polymerization of the HIPE does not need to be particularly discriminated. For example, a method which comprises polymerizing an HIPE by continuously supplying the HIPE to a movable supporting member traveling in the horizontal direction of the apparatus (e.g., an endless belt or a sheet material such as a film traveling on the belt as synchronized therewith) by using a device for drive conveyance such as a belt conveyor, forming the applied HIPE in a uniform thickness as with a coater, and passing the formed layer of the HIPE through the interior of a polymerizing furnace provided with a suitable heating means, and a method which comprises polymerizing an HIPE by continuously supplying the HIPE to a movable supporting member traveling in the horizontal direction of the apparatus (e.g., a sheet material such as a film) by using a device for drive conveyance capable of advancing a sheet material such as film on a belt-like plate of a stationary supporting member, forming the HIPE in a uniform thickness as by means of a coater, and passing the formed layer of the HIPE through the interior of a polymerizing furnace provided with a suitable heating means may be cited. This invention does not need to be limited to these methods. The method adopted at all is only required to be capable of forming the HIPE in a necessary shape and conveying the formed HIPE in a substantially horizontal direction (this direction does not need to be perfectly horizontal; the width direction may be a little perpendicular to the travel direction or the flow direction may be inclined more or less against the parallel direction thereto) and meantime polymerizing the HIPE. Specifically, in this preferred embodiment, the series of operations and steps of supplying the HIPE as the raw material onto the substantially horizontally traveling movable supporting member of the device for drive conveyance, regulating the thickness of the HIPE thereby forming the HIPE in the shape of a layer, and passing the formed layer of HIPE through the interior of a polymerizing furnace provided with a suitable heating means thereby polymerizing the HIPE (more specifically, heat-treating the HIPE in the polymerizing furnace at a prescribed curing temperature for a prescribed time) may be carried out continuously.

For the purpose of forming the HIPE as the raw material in a proper shape as described above, the HIPE may be simultaneously supplied and formed (particularly spread in the width direction) so as to assume a prescribed shape to a certain degree at the time of supply or alternatively it may be formed in a suitable shape such as a sheet by using one or a plurality of objects mentioned above (forming members) subsequently to the supply thereof {further using the objects mentioned above such as coaters and an upper side sheet material on the upper side (further adopting a tensile force generating means for stretching the sheet material lest it should sag) and using weirs one each at the opposite end parts}.

When the HIPE as the raw material is to be supplied onto the horizontally traveling movable supporting member of the device for drive conveyance, this supply may be made directly onto an endless belt made of a metal or a resin and serving as a movable supporting member or onto a sheet material serving as a movable supporting member on either an endless belt mentioned above or an elongate plate serving as a stationary supporting member. These alternative manners of supply have an advantage of enabling the porous cross-linked structure of the contacting surface layer part of the produced porous cross-linked polymer to be suitably varied by changing the quality of the material with which the HIPE is destined to contact. Further, unlike the supply of the HIPE in the manner of direct loading on the continuously operated endless belt which suffers the produced porous cross-linked polymer, while in the process of being peeled from the belt, to stick fast to the belt and requires the adhering polymer to be completely removed before the HIPE is again supplied thereto in the subsequent round, the alternative manners of supply adopted where the sheet material is used have an advantage of enabling the adhering polymer to be removed (peeled) easily and permitting the sheet material to be discarded after use because of its extremely low cost as compared with the endless belt.

Then, this invention in implementing the horizontal continuous polymerization of an HIPE may have the use of a supporting member on the lower side of the HIPE and a sheet material preferably made of at least one member selected from the group consisting of films, non-woven fabrics, and woven fabrics on the upper side thereof as the construction of this invention. The reason therefor is that the sheet material effectively functions as a means for lowering the oxygen content of the HIPE.

The supporting member that can be used on the lower side of the HIPE does not need to be particularly discriminated so long as it is capable of retaining the formed HIPE in the shape once formed and supporting the HIPE from the lower side to preclude the other possible leakage and incapable of being deteriorated even upon the exposure to the polymerization temperature. It is, therefore, necessary to form the supporting member with one substance or a combination of two or more substances which have strength enough for preventing the formed supporting member from breaking, bending, or warping because of loss of support. The supporting member of this nature, therefore, may be an endless belt made of a metal or a resin and intended as one kind of a movable supporting member forming a device for drive conveyance mentioned above, a sheet material of a film intended as another kind of a movable supporting member, an elongate plate made of a metal or a resin and intended as a stationary supporting member, or even the sheet material used on the elongate plate or the endless belt. The term "lower side" and not the term "lower part" is used for the HIPE. The use of a corrugated supporting member, a curved supporting member, and a concave-shaped supporting member, for example, may be involved in the technical scope of this invention. Since the supporting member is fated to function as a means for decreasing the oxygen content as will be specifically described herein below, it will be described in detail in the paragraph titled "means for decreasing the oxygen content".

As the substance for the sheet material that can be used for the upper side of the HIPE, at least one member selected from the group consisting of films, non-woven fabrics, and woven fabrics may be cited. This substance does not need to be particularly discriminated but is only required to be incapable of being fractured under a prescribed tensile force or being deteriorated on the exposure to the polymerization temperature. The term "upper side" and not the term "upper part" is used for the HIPE. The case of forming the HIPE in a trapezoidal shape or in a semicircular shape may be involved in the technical scope of this invention. Since the sheet material is fated to function as a means for decreasing the oxygen content will be specifically described herein below, it will be described in detail in the paragraph titled "means for decreasing the oxygen content".

Further, this invention prefers the supporting member mentioned above to use a weir (inclusive of a gasket) at each of the opposite end parts in the width direction thereof. The use of these weirs manifests many useful effects such as ① preventing the continuously supplied HIPE from flowing out or leaking from the opposite lateral sides in the width direction, ② retaining the formed shape of the HIPE intact, ③ preventing the HIPE from escaping polymerization, and ④ retaining the sheet material fast on the outer surface of the HIPE. Incidentally, when the supporting member to be used is in a concave shape, the opposite end parts of the concave shape may fulfill the function as the weirs mentioned above and, therefore, may well be called weirs of one sort. The case of using the supporting member of this shape, therefore, should be construed as being involved in the expression of using the weirs on the assumption that the supporting member and the weirs are integrated. The weirs under discussion are fated to function as a means for decreasing the oxygen content which will be specifically described hereinafter. The function will be described in detail below.

Further, the method for producing a porous cross-linked polymer by the horizontal continuous polymerization of an HIPE according to this invention prefers the horizontal continuous polymerization of the HIPE to be performed with the outer surface part of the HIPE retained by an oxygen content decreasing means in an atmosphere or a state having a lower oxygen content than the ambient air. The lowered oxygen content consequently attained results in perfectly solving the various technical problems encountered by the method of combined continuous and batch polymerization disclosed in WO 97/27240 (namely, ① the problem of imposing limits on height (width) and thickness of the bag, encountering difficulty in retaining uniformity of thickness and performance quality of the bag, and failing to control the width and the thickness freely because the lower part of the bag tends to gain in thickness under the weight of the HIPE and, to make the matter worse, because the oil phase and the liquid phase tend to deflect and separate vertically from each other, despite the belief that the lower part of the bag begins to thicken from the time of packing the HIPE onward and the uniformity of thickness of the bag is exalted slightly in consequence of the reeling operation; ② the problem of failing to make the most of advantages by the continuous packing step because the operation from packing through polymerization of the HIPE cannot be carried out continuously and consequently because the transitional stage between the step for continuous packing of HIPE and the step for batch polymerization constitutes itself a rate-determining process; and ③ the problem of being barely capable of obtaining a porous cross-linked polymer exhibiting uniform qualities on the opposite sides but incapable of obtaining a porous cross-linked polymer exhibiting differences in qualities on the opposite sides owing to the use of the bag made of a film). In addition, the lowered oxygen content can also bring solution to many problems such as suffering the surface layer portion of the outer surface part of the produced porous cross-linked polymer to contain uncured spots, giving rise to pinholes and voids in the porous cross-linked polymer, failing to impart open cells to the texture of the polymer, and inducing discernible occurrence of separated water in the cured polymer.

The oxygen content decreasing means mentioned above is only required to enable the outer surface part of the HIPE to assume an atmosphere or a state having a lower oxygen content than the ambient air. Preferably, the atmosphere or the state has an oxygen content of not more than 2.0 vol. %, preferably not more than 0.2 vol. %, and particularly preferably perfectly no oxygen content. If the oxygen content exceeds 2.0 vol. %, the excess would be at a disadvantage in preventing the surface layer portion of the outer surface part of the HIPE from being polymerized.

The oxygen content decreasing means mentioned above is only required to be capable of enabling the HIPE to retain an atmosphere or a state of having a lower oxygen content than the ambient air until a porous cross-linked polymer is produced following the horizontal continuous polymerization of the HIPE. As typical examples thereof, (a) an oxygen content decreasing means using a solid which represses or blocks the contact of the ambient air (oxygen gas) with the HIPE by applying to the outer surface part of the HIPE a solid material (such as, for example, an upper side sheet material such as of a film, an endless belt, an elongate plate, a supporting member such as a lower side sheet material, or a weir) which is capable of decreasing or cutting off the amount of the oxygen to expose to the HIPE; and (b) an oxygen content decreasing means using a gas which represses or blocks, preferably blocks, the contact of the ambient air (oxygen gas) with the HIPE by displacing a part or a whole, preferably a whole, of the ambient air contacting the outer surface part of the HIPE with a gas having a lower oxygen content than the ambient air, preferably an inert gas containing no oxygen may be cited. As typical examples of the inert gas, a nitrogen gas, an argon gas, a helium gas, a neon gas, a krypton gas, a xenon gas, a radon gas, and a mixture of two or more such gases may be cited. Further, in the oxygen content decreasing means using the solid material mentioned above, when a solid material having high gas permeability is to be applied to the outer surface part of the HIPE, it may be used in combination with the oxygen content decreasing means using the gas as mentioned above. As regards the relation among the solid material mentioned in (a) above, the sheet materials (used on the upper and lower sides), and the film, the "solid material" has the broadest sense, enjoys applicability to the outer surface part of the HIPE (upper side, lower side, and opposite end parts), and includes the upper side sheet material, supporting member (inclusive of the lower side sheet material), and weir. Then, the "sheet material" has the next broad sense, constitutes itself one kind of the solid material mentioned above, and includes a film, a non-woven fabric, and a woven fabric. Finally, the "film" has the narrowest sense and constitutes itself one kind of the sheet material mentioned above.

Figure 3:
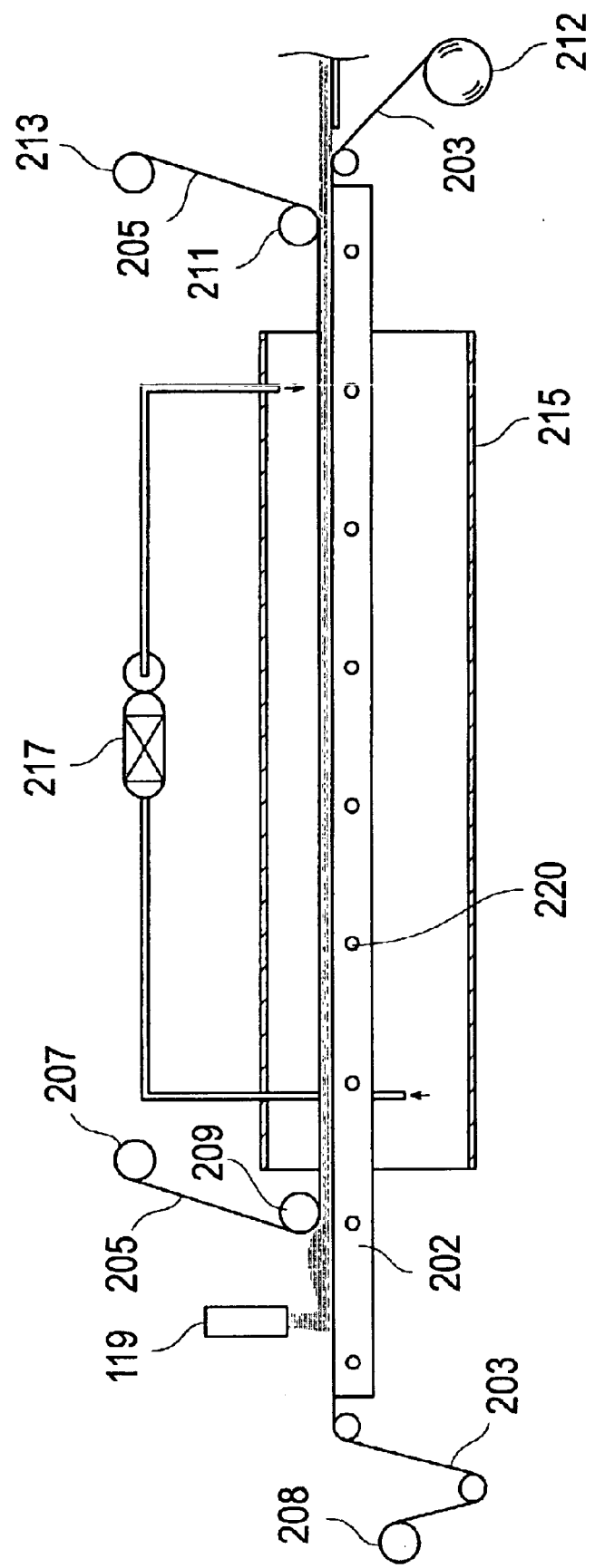
FIG. 3 is a schematic side view illustrating a typical embodiment of the polymerization apparatus including a sheet material (a movable supporting member) held in motion on a plate.

The expression "causing the outer surface part of the HIPE to assume an atmosphere or a state having a lower oxygen content than the ambient air by the oxygen content decreasing means" as used in the specification ought not be interpreted in a narrow sense because the oxygen content decreasing means is only required to repress or block the contact of the ambient air with the HIPE ① at least in the polymerization part (excluding the case in which the polymerization is initiated from the part of supplying the HIPE onward, because this case falls under ② or ③ shown below), ② preferably at least in the part after the completion of supply, and ③ more preferably in the supplying part of the HIPE as shown in FIG. 2 and FIG. 3. In the case of the sheet material which is used on the upper side of the HIPE, for example, the oxygen content decreasing means does not necessarily provided with the part of supplying the HIPE. In the case of the gas, the HIPE can be supplied as it is displaced meantime. In the case of the sheet material mentioned above, it can suffice to repress or block the contact of the ambient air with the HIPE after the HIPE has been supplied (see FIG. 2 and FIG. 3). The contact of the ambient air with the HIPE does not need to be repressed or blocked strictly from the supply part through the sheet material (similarly applicable to the case of the gas). This is because the time between the supply of the HIPE and the superposition of the sheet material is short (about 5 seconds), the time of the exposure of the HIPE to the ambient air is consequently short, effects by the ambient air exerted on the characteristic properties of the produced porous cross-linked polymer are small, and effects by the method of this invention to be manifested is ample as compared with conventional methods.

The sheet material to be applied to the upper side of the HIPE may be preferably have sealing property exceeding a prescribed level so as to afford desired effects of decreasing the oxygen content. The sheet material having a gas permeability (oxygen permeability) exceeding a prescribed level and thus low sealing property cannot be easily used solely as the oxygen content decreasing means. In consideration with these facts, the gas permeability of the sheet material may be not more than 100 $cm^3/cm^2 \cdot s$, preferably not more than 5 $cm^3/cm^2$ S. If the gas permeability of the sheet material exceeds 100 $cm^3/cm^2 \cdot s$, the excess would be at a disadvantage in lowering the ability of the sheet material to decrease an oxygen content when used solely and, depending on such conditions as a W/O ratio, possibly suffering the produced porous cross-linked polymer to give rise to an uncured part. The term "gas permeability" as used herein may be determined by any of the testing methods specified in the paragraph "Gas Permeability" at the Section 6.27 of JIS (Japanese industrial standards) L1096 (1990).

The upper limit of the gas permeability mentioned above can be applied exclusively to the sole use, i.e., the case wherein the exterior of determination is an ambient air. When the oxygen content decreasing means is used in combination with another means for decreasing an oxygen content as by making the exterior in a nitrogen atmosphere, the surpass of the upper limit mentioned above would pose no problem. Even when the gas permeability exceeds 5 $cm^3/cm^2 \cdot s$ but not more than 100 $cm^3/cm^2 \cdot s$, the combined use with another oxygen content decreasing means using the gas as mentioned above may possibly repress defects such as pinholes and voids. On the other hand, when the curing temperature of the HIPE is heightened, a part of water contained therein may possibly succumb to vaporization during the polymerization process. In this case, a sheet material having slightly low sealing property and manifesting gas permeability to a certain extent so as to balance these two properties well (for example, a gas permeable film, a porous film, a non-woven fabric, or a woven fabric) may possibly prove more advantageous for the purpose of repressing defects such as pinholes and voids generated on the surface of the porous cross-linked polymer, as compared with a sheet material having high sealing property (for example, a gas barrier film or an ordinary film). In deciding sealing property (gas permeability) of the sheet material, therefore, it is desirable to be select a sheet material having optimum sealing property by taking into due consideration about polymerization conditions and performing a preliminary experiment as occasion demands.

The substance for the sheet material mentioned is only required to be usable under the prevalent polymerization conditions. Then, the sheet material that can be applied to the upper side of the HIPE does not need to be particularly discriminated but is only required to be capable of being used under a tensile force which will be specifically described herein below. It can be properly selected among well-known macromolecular materials to suit the intended use. The sheet material which manifests durability fit for the continuous polymerization (various properties such as heat resistance, weatherability, abrasion resistance, recycling property, tensile strength and other mechanical strengths) and mold releasability, and further an ability to be applied to the upper side of the HIPE may preferably excel in such mechanical strengths as a tensile strength and allow the control of surface properties of a porous cross-linked polymer. As typical examples thereof, fluorine resins such as polytetrafluoroethylene (hereinafter occasionally referred to briefly as "PTFE"), tetrafluoroethylene-perfluoroalkylvinyl ether copolymers (hereinafter occasionally referred to briefly as "PFA"), tetrafluoroethylene-hexafluoropropylene copolymers (hereinafter occasionally refered to briefly as "FEP"), and tetrafluoroethylene-ethylene copolymers (hereinafter occasionally referred to briefly as "ETFE"); silicone resins such as dimethyl polysiloxane and dimethylsiloxane-diphenyl siloxane copolymers; heat-resistant resins such as polyimides (hereinafter occasionally referred to briefly as "PI"), polyphenylene sulfides (hereinafter occasionally referred to briefly as "PPS"), polysulfones (hereinafter occasionally referred to briefly as "PSF"), polyether sulfones (hereinafter occasionally referred to briefly as "PES"), polyether imides (hereinafter occasionally referred to briefly as "PEI"), polyether ether ketones (hereinafter occasionally referred to briefly as "PEEK"), and para type aramid resins; thermoplastic polyester resins such as polyethylene terephthalates (hereinafter occasionally referred to briefly as "PET"), polybutylene terephthalates (hereinafter occasionally referred to briefly as "PBT"), polyethylene naphthalates (hereinafter occasionally referred to briefly as "PEN"), polybutylene naphthalates (hereinafter occasionally referred to briefly as "PBN"), and polycyclohexane terephthalates (hereinafter occasionally referred to briefly as "PCT"), thermoplastic polyester type elastomer resins (hereinafter occasionally referred to briefly as "TPEE elastomer") such as block copolymers (polyether type) formed of PBT and polytetramethylene oxide glycol and block copolymers (polyester type) formed of PBT and polycaprolactone may be cited. These substances may be used either singly or in the mixed form of two or more members.

Further, one sheet material may be used as laminated with two kinds of different materials. Alternatively, two or more sheet materials different in quality may be used as simply superposed.

The thickness of this sheet material does not need to be particularly restricted. Generally, the sheet material can acquire durability fit for the continuous polymerization (various properties such as heat resistance weatherability, abrasion resistance, recycling property, tensile strength and other mechanical strengths) and also sufficient durability against loaded tension, when the thickness thereof is in the range of 0.01 to 3.0 mm. It may be fabricated in the form of an endless belt which permits the recycling.

Further, the form of the sheet material may be a film, a non-woven fabric, a woven fabric, or the combination thereof. As one example of the gas-impermeable film (gas permeability in the approximate range of 0 to 0.0001 $cm^3/cm^2 \cdot s$), gas barrier films such as an aramid film and a PET film coated with polyvinylidene chloride (hereinafter occasionally referred to briefly as "PVDC"); and ordinary films such as a PEN film, a PET film, a PBT film, a PPS film, a PI film, an ETFE film, a polypropylene (hereinafter occasionally referred to briefly as "PP") film, and a PTFE film may be cited. As typical examples of the gas-permeable film (gas permeability in the approximate range of 0.0001 to 35 $cm^3/cm^2 \cdot s$), gas permeable films such as a dimethyl polysiloxane film; and porous films such as a PTFE based porous film and a polyolefin based porous film may be cited. Further, as typical examples of the woven fabric (gas permeability in the approximate range of 0.1 to 8 $cm^3/cm^2 \cdot s$), PET multifilament type woven fabrics may be cited. Furthermore, as typical examples of the non-woven fabric (gas permeability in the approximate range of 10 to 1000 $cm^3/cm^2$ S), PET spun bond type non-woven fabrics may be cited.

The mechanical continuous working temperature (UL746B) may be available as one of the criteria for rating the heat resistance of the sheet material. It has been known to be 105° C. for PET, 160° C. for PEN, 200° C. for PI, 160° C. for PPS, 240° C. for PEEK, 150° C. for PSF, 180° C. for PES, 170° C. for PEI, and 180° C. for aramid film. The sheet material to be used can be suitably selected, depending on the curing temperature.

The endless belt or the elongate plate made of a metal or a resin and suitable for the supporting member mentioned above maybe desirably selected to be of such a type as excelling in corrosion resistance, for the sake of withstanding by an electrolyte such as calcium chloride as an ingredient of the HIPE. As the substance, therefore, it is commendable to use a metal such as stainless steel or a resin selected for the sheet material mentioned above.

Further, the supporting member may be desirably selected to be of such a type as excelling in corrosion resistance, for the sake of withstanding by an electrolyte such as calcium chloride as an ingredient of the HIPE. Because of this selection coupled with the fact that the supporting member concurrently serves as a seal for the outer surface part of the HIPE, the endless belt or the elongate plate having the sheet material used on the side thereof exposed to the HIPE may prove to be advantageous.

As regards the expression that the sheet material is "used" on the endless belt or the elongate plate, (1) in the case of a movable endless belt, the sheet material such as a film of excellent durability may be advanced at a fixed speed in the same direction (synchronously) in such a manner as to contact with the belt without pasting (inclusive of adhesion and fusion) or application (inclusive of coating) at least between the time of supplying the HIPE and the time of completing the polymerization, or the sheet material such as a film of excellent durability may be pasted to the endless belt by the processing using a proper adhesive agent or a tackifier or by fusing through the medium of heat, or the sheet material may be formed by coating the endless belt or the elongate plate with a resinous material excelling in durability, though not exclusively. Meanwhile, (2) in the case of a stationary elongate plate, the sheet material such as a film excelling in durability may be advanced so as to contact the plate without pasting (inclusive of adhesion and fusion) or application (inclusive of coating) at least between the time of supplying the HIPE and the time of completing the polymerization, though not exclusively.

The method for the production of this invention may preferably comprises the horizontal continuous polymerization with the formed HIPE retaining the shape acquired at the end of the formation thereof. This method, therefore, is at an advantage in enabling the formed HIPE to be fabricated in a shape arbitrarily selected and allowing the porous cross-linked polymer wholly homogeneous in quality to be manufactured with extremely high productivity. Thus, the method turns out to be unusually excellent even from the commercial point of view.

As one example of a method for the retention of the formed HIPE in the shape assumed at the end of the formation thereof is a method which comprises supplying the HIPE into the inner empty space surrounded with the supporting member of the device for drive conveyance and the weirs and allowing it to form in the relevant shape of the empty space. By this method, the effect of enabling the HIPE to retain the shape assumed at the end of the formation owing to the provision of the weirs (such as gaskets), the effect of preventing the continuously supplied HIPE from leaking through the outer surface part, the effect of preventing the HIPE from escaping polymerization, and the effect of enabling the sheet material on the outer surface part to be retained intact can be acquired, despite the fact that the formed HIPE tends to give rise to and keep a convexoconcave more or less on the surface thereof because the HIPE by nature is a fluid of kinematic viscosity manifesting only inferior flowability and resembling soft cream or yogurt in constitution. For example, by using the sheet material as the oxygen content decreasing means on the outer surface part of the HIPE, nipping the outer surface part of the HIPE vertically, and further surrounding the outer surface part laterally with weirs, the formed HIPE can be retained more stably in the shape assumed at the end of the formation thereof. As typical examples of the method for retaining the formed HIPE in the consequently assumed shape, the exertion of tensile force to the sheet material and the application of uniform pressure (depression) to the outer surface part of the HIPE by means of a shape adjusting plate disposed on the sheet material may be cited, though not exclusively.

Then, the method for production of this invention has as a main construction thereof the fact that the HIPE is polymerized and cured by exerting tensile force in the width direction and/or the travel direction of the sheet material. This construction may result in improving the smoothness of surface and the accuracy of thickness in the width direction. The requirement for polymerizing and curing the HIPE will be described in detail in the paragraphs led by "(4) Curing temperature".

As typical examples of a method for improving the smoothness of surface and the accuracy of thickness in the width direction by the exertion of tensile force in the width direction of the sheet material such as a film (means for exerting tensile force in the width direction), 1) a tension roller method, 2) a clip tenter method, and 3) a pin tenter method may be cited. These methods 1) to 3) comprises exerting tensile force in the width direction on the sheet material applied to the upper side of the HIPE (which may be occasionally referred in the specification herein simply to as "upper side sheet material"). Similarly, the film applied to the upper side of the HIPE may be occasionally referred simply to as "upper side film", the sheet material applied to the lower side of the HIPE simply to as "lower side sheet material", and the film applied to the lower side of the HIPE simply to as "lower side film"), bending the sheet material by the weirs disposed in the opposite end parts, thereby forming into a strongly closed empty space the injection part of the HIPE surrounded around the movable supporting member applied to the lower side of the HIPE (which may be occasionally referred in the specification herein simply to as "lower side movable supporting member"), the weirs, and the upper side sheet material, with the result that the wrinkles on the outer surface of the HIPE will be eliminated and the accuracy of thickness can be improved.

Now, the means for generating tensile force in the width direction indicated in 1) to 3) above will be described specifically below.

1) Tension Roller Method (An Example of the Mode Utilizing Weirs will be Described Below.)

Figure 6A:
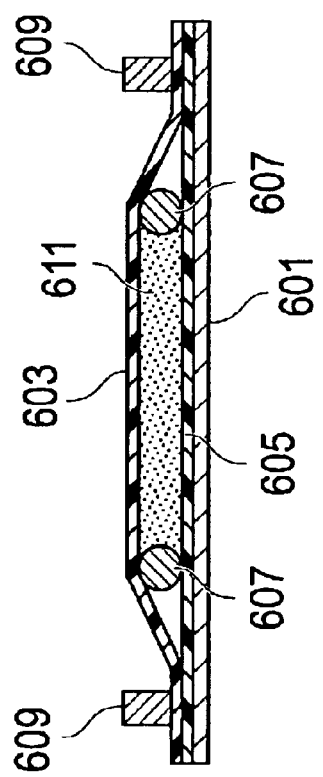
FIG. 6(A) is a schematic cross section perpendicular to the travel direction of a movable supporting member for conveying an HIPE and FIG. 6(B) is a plan view.
Figure 6B:
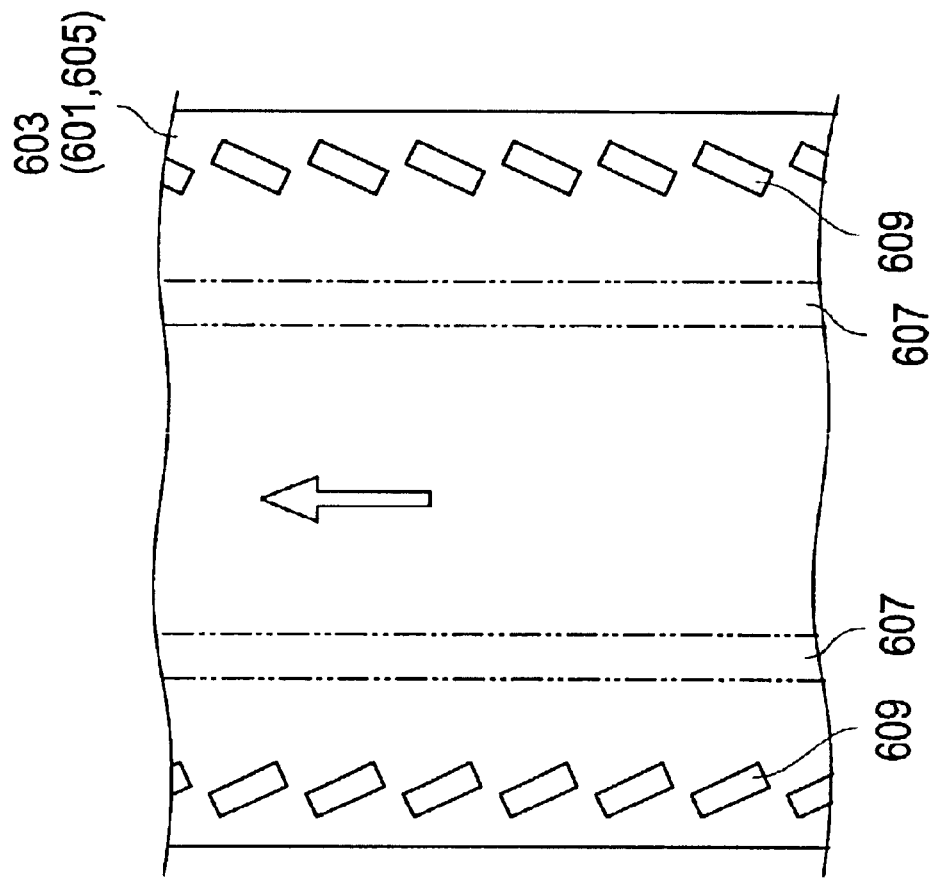

In the preferred embodiment of the tension roller method, two tension rollers may be disposed one each in the opposite end parts of the upper side sheet material such as a film (on the outer side parts of the weirs disposed at the opposite end parts of the supporting member) laterally symmetrically in a diverging pattern (diverging in the travel direction) and the upper side sheet material is pressure-welded by the tension rollers against the lower side movable supporting member (such as, for example, a belt conveyor or a lower side sheet material) and rotated by utilizing the driving force of the lower side movable supporting member. As a result, the upper side sheet material may succumb to an outwardly extending force which imparts tensile force to the upper side sheet material. Where no weirs are used, a movable supporting member which permits the upper side sheet material to be pressure-welded thereagainst with rollers may be disposed substantially flush with the upper side sheet material in such a manner that the opposite end parts of the upper side sheet material may be exposed to prescribed tensile force tending to exert the effect outwardly.

Where the weirs are used, the weirs disposed one each in the opposite end parts of the supporting member (which may be either a movable supporting member or a stationary supporting member) (provided that the weirs are disposed on inner sides of the positions of the tension rollers; see FIG. 6 in more detail) may be at an advantage in producing a force tending to depress the weirs downwardly and enabling the end parts to intercept the air more infallibly. They may be further at an advantage in preventing the upper side sheet material itself from suspending scratch and stretch (particularly weirs having no sharp corners as found in tubes and pipes may prove more advantageous because their constructions do not easily inflict a scratch) and enabling the upper side sheet material to be put to reuse or converted into an endless film.

The tension rollers may be disposed on a line as spaced with a certain interval or they may be disposed continuously with practically no interval on condition that they do not contact each other.

<Shape of Tension Roller>

Figure 4A:
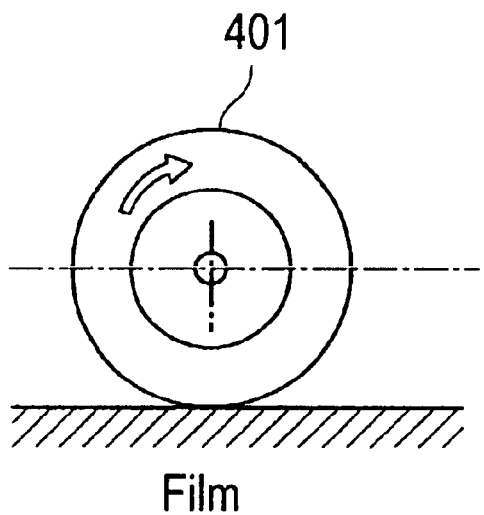
FIG. 4(A) is a front view and FIG. 4(B) is a right side view.
Figure 4B:
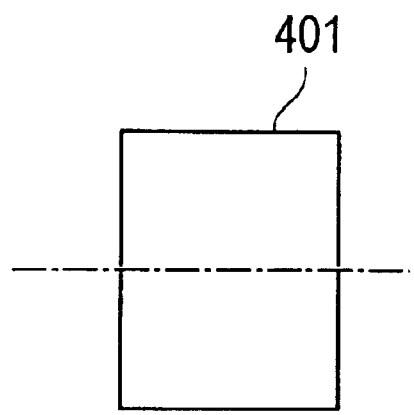
Figure 5A:
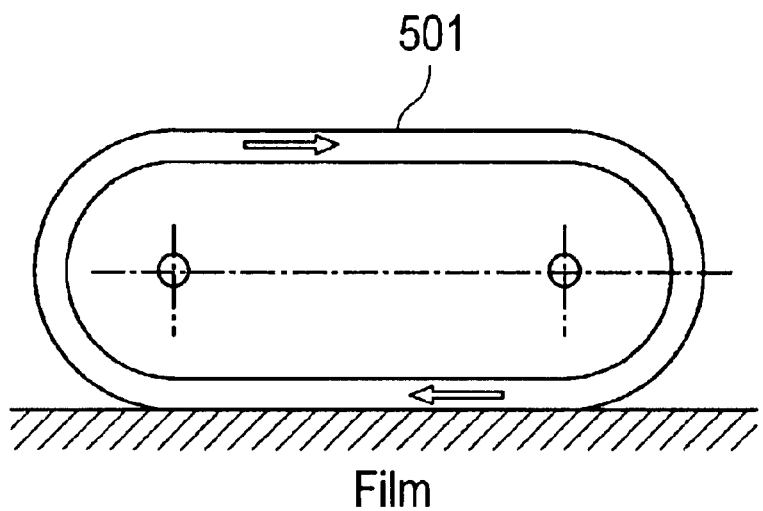
FIG. 5(A) is a front view and FIG. 5(B) is a right side view.
Figure 5B:
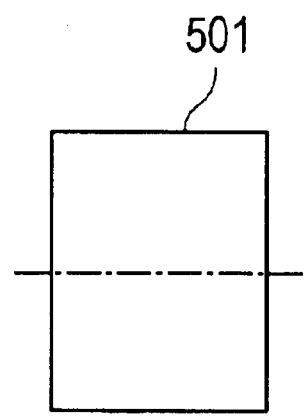

As regards the shape of a tension roller, such a cylindrical tension roller 401 as illustrated in FIG. 4 or such an oval tension roller 501 as illustrated in FIG. 5 may be used, though not exclusively.

<Method for Disposing Tension Roller>

One typical embodiment of the method for the disposition of a tension roller is illustrated in FIG. 6. As illustrated in FIGS. 6(A) and (B), a lower side film 605 applied integrally to a belt conveyor 601 (a lower side movable supporting member), an upper side film 603, and weirs 607 shaped like a tube and intended to prevent leakage of an HIPE 611 are disposed on the belt conveyor 601 and a pair of tension rollers 609 are disposed laterally symmetrically in a necessary length on the opposite outer sides of the weirs 607. This configuration does not need to be particularly discriminated because such components as a lower side movable supporting member and weirs are suitably selectable.

<Method for Mounting Tension Rollers and Method for Adjusting Contact Force>

The method for causing the tension rollers to exert tensile force in the width direction (the lateral direction) may be decided by the contact force with which the tension rollers are pressed against the movable supporting member across the upper side sheet and the angle relative to the direction of flow (the travel direction) of the HIPE. The installation of the tension rollers may require a mechanism capable of adjusting the contact force and the angle. The examples of the tension roller are illustrated in FIG. 7 and FIG. 8.

Figure 7:
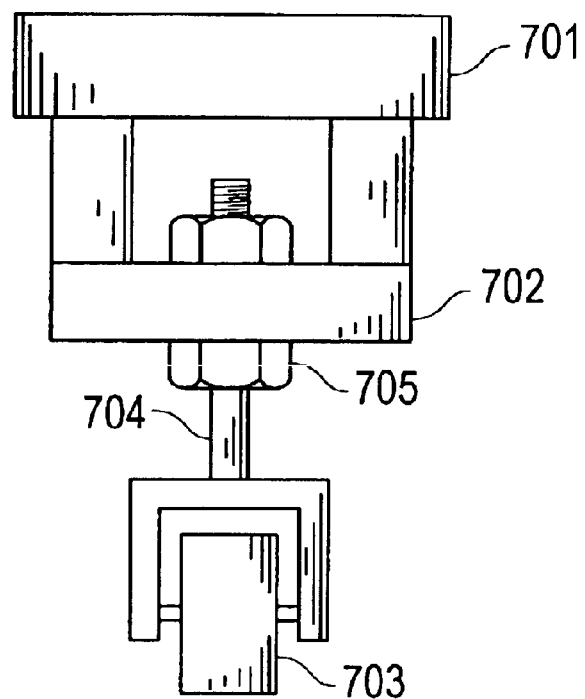
FIG. 7 is a schematic diagram illustrating one embodiment of the mechanism (configuration) for adjusting the force and the angle of contact of a tension roller during the installation of the tension roller.

For the tension roller illustrated in FIG. 7:

A tension roller fitting jig 702 may be connected to a rigid supporting member 701 and a tension roller 703 may be connected to the tension roller fitting jig 702 with a holt 704 and a nut 705. The contact force with the movable supporting member can be adjusted by the length of the bolt 704 and the angle of fitting the tension roller 703 can be arbitrarily fixed by the position of fastening the nut 705.

Figure 8:
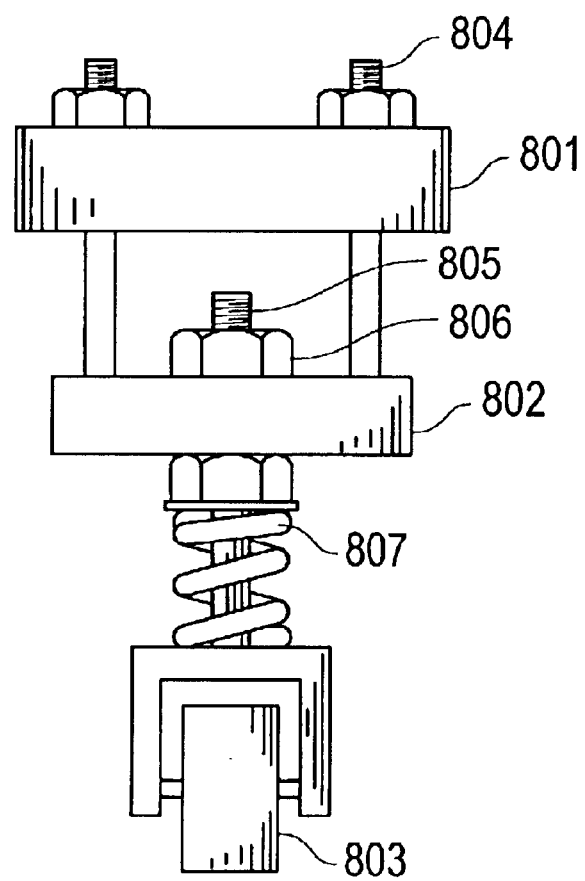
FIG. 8 is a schematic diagram illustrating another embodiment of the mechanism (configuration) for adjusting the force and the angle of contact of a tension roller during the installation of the tension roller.

For the tension rollers illustrated in FIG. 8:

A tension roller fitting jig 802 may be connected to a rigid supporting member 801 with a bolt 804 and the fitting height thereof can be decided by the length of the bolt 804. A tension roller 803 may be connected to the tension roller fitting jig 802 with a bolt 805 and a nut 806. The fitting angle can be arbitrarily fixed by the fastening position of the nut 806 at the time of this connection. The contact force can be adjusted with a spring 807 (with the kind of this spring) which is passed through the bolt 805.

Incidentally, the mechanism for adjusting the contact force and the angle of the tension rollers which can be used in this invention does not need to be limited to the typical examples cited above. Other well-known adjusting mechanisms can be property used.

2) Clip Tender Method

Figure 9:
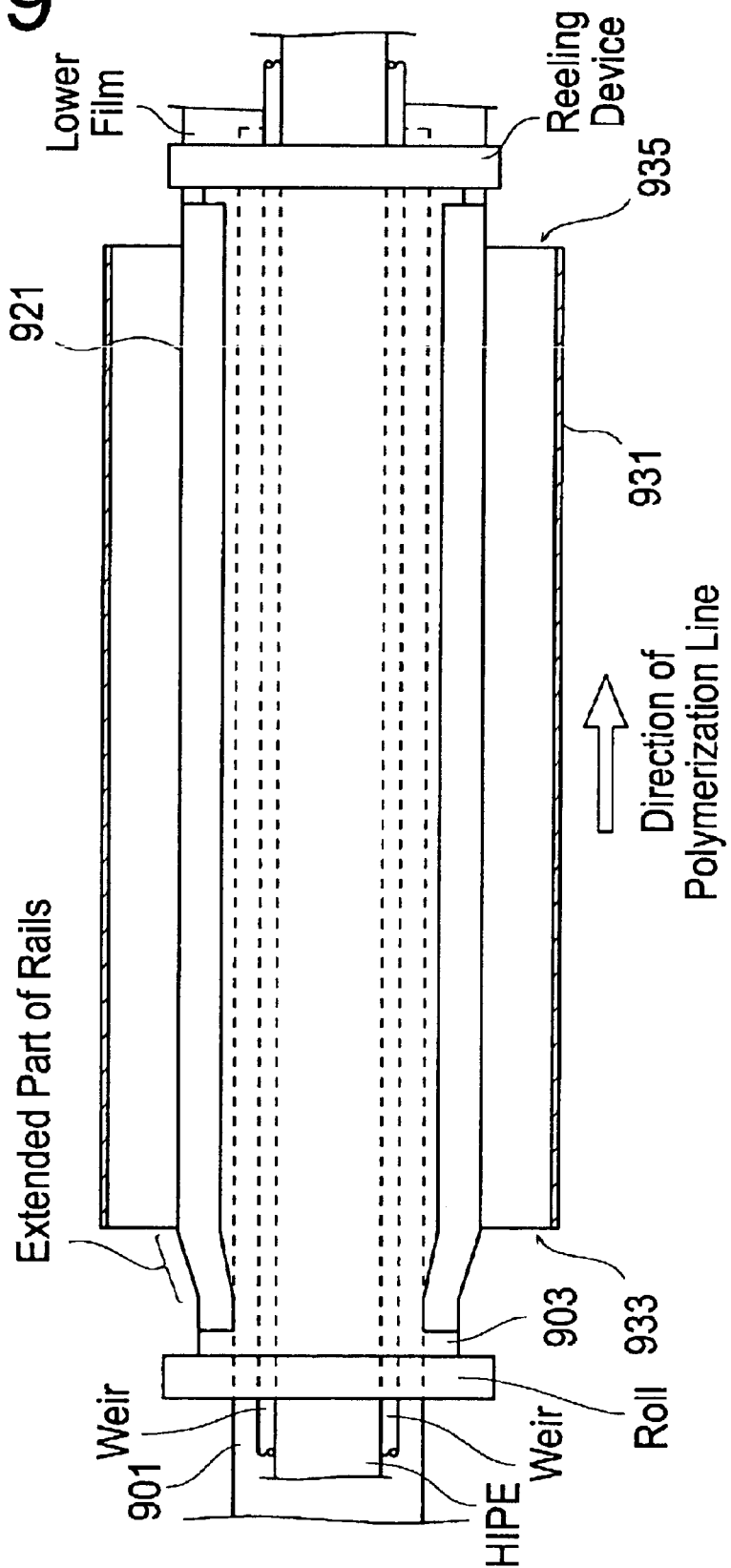
FIG. 9 is a schematic plan view illustrating a typical embodiment of the method for installation of a tenter.
Figure 10:
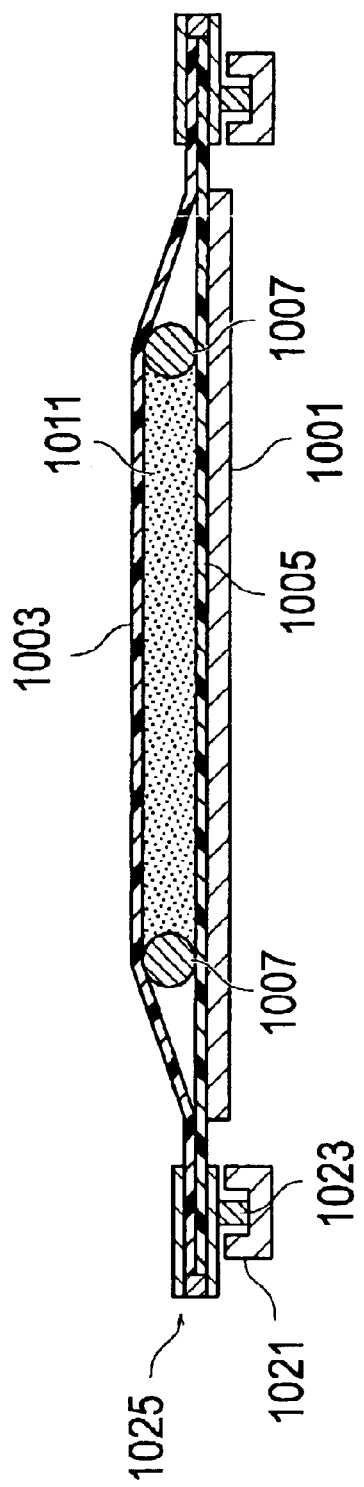
FIG. 10 is a schematic plan view illustrating a typical embodiment of the method for installation of a clip tenter, which is a schematic cross section parallel to the travel direction of a movable supporting member for conveying an HIPE.

The clip tenter method, as illustrated in FIG. 9 and FIG. 10, is a method which comprises exerting tensile force in the width direction by causing rails 1021 (921) parallelly fixed to the outsides of a movable supporting member 1001 (901) in the direction of polymerization line (the flow direction or the travel direction of HIPE; indicated by an arrow in FIG. 9) so as to be kept apart slightly outward (see FIG. 9) between the proximity of the starting point of the polymerization line (such as, for example, the foreground of an entrance 933 to a polymerization furnace 931) where the end parts of the upper side sheet material 1003 (903) such as of film are gripped with a clip 1025 attached to a chain 1023 being circulated on the rails 1021 (921) and the proximity of the terminal point of the polymerization line (such as, for example, the background of an outlet 935 of the polymerization furnace 931) where the clips are released. The rails 1021 (921) are slightly spread outward near the entrance 933 of the polymerization furnace 931 and the magnitude of the tensile force can be adjusted with the size of this spread (which can be freely varied). The tensile force generated can be arbitrarily controlled by the kind of substance used, thickness of the material, and elastic modulus of the upper side sheet material. When weirs are not installed, the rails may be disposed so that they may be substantially flush with the top of the HIPE.

The upper side sheet material, depending on the kind of substance used therefore, may possibly succumb to thermal expansion and thermal contraction in the polymerization furnace. Thus, a tenter capable of absorbing such expansion and contraction may be required to be provided in the rails for the adjustment thereof. The rails for the tenter, therefore, may be preferably furnished with a mechanism capable of adjusting the rails so as to permit the adjustment of expansion and contraction. The mechanism for adjusting the rails does not need to be particularly discriminated. Multinodular rails may be utilized, for example.

3) Pin Tenter Method

Figure 11:
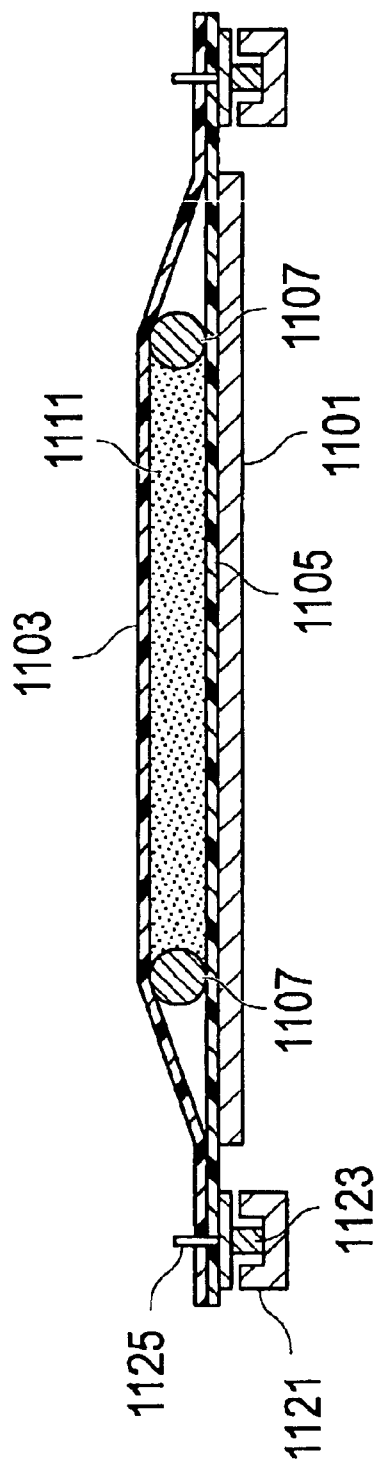
FIG. 11 is a schematic plan view illustrating a typical embodiment of the method for installation of a pin tenter, which is a schematic cross section parallel to the travel direction of a movable supporting member for conveying an HIPE.

The pin tenter method, similarly to the clip tenter method described above, is a method which comprises exerting tensile force in the width direction, as illustrated in FIG. 9 and FIG. 11, by causing rails 1121 (921) parallelly fixed to the outsides of a movable supporting member 1101 (901) in the direction of polymerization line (the flow direction or the travel direction of HIPE; indicated by an arrow in FIG. 9) so as to be kept apart slightly outward (see FIG. 9) between the proximity of an entrance 933 of the polymerization furnace 931 where the end parts of the upper side sheet material 1103 (903) such as of a film are transfixed with a pin 1125 attached to a chain 1123 being circulated on the rails 1121 (921) and the proximity of the terminal point of the polymerization line (such as, for example, the background of an outlet 935 of the polymerization furnace 931) where the pins are released. The magnitude of tensile force can be adjusted by the size of spread of the rails 1121 (921) (the size of spread is freely variable). When weirs are not installed, the rails may be disposed so that they may be substantially flush with the top of the HIPE.

The kind of substance used for the upper side sheet material may be limited because the upper side sheet material would possibly sustain a tear from a pinhole to be formed with the pin.

Figure 12:
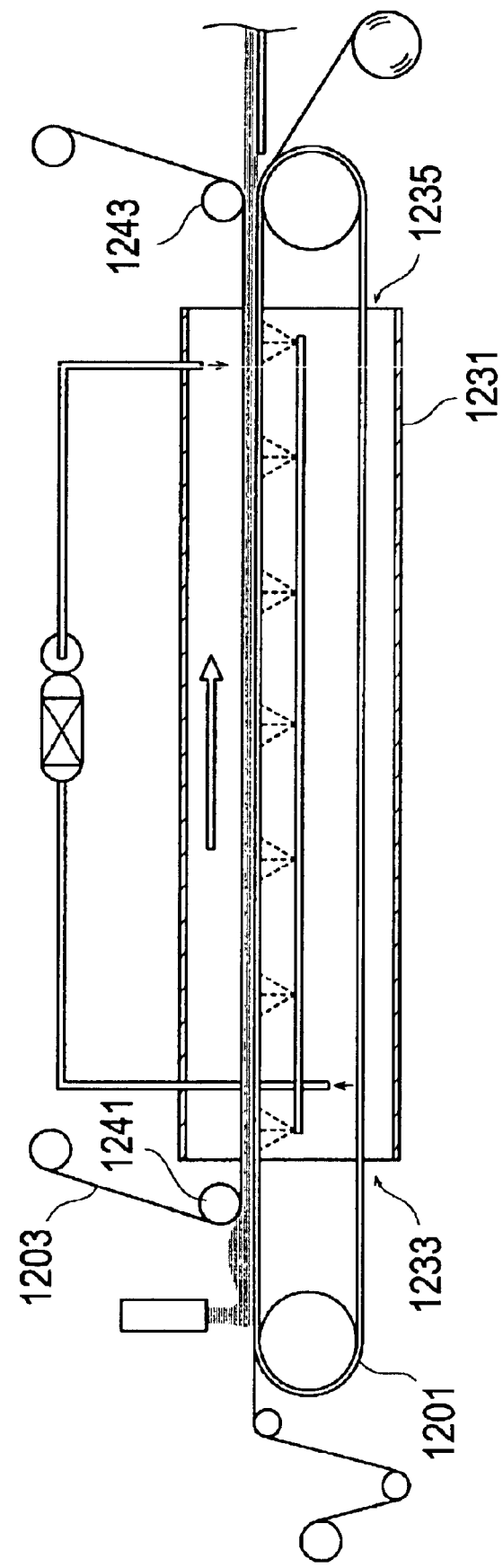
FIG. 12 is a schematic plan view illustrating one embodiment of the means for generating a tensile force in the travel direction for the sake of improving the smoothness of surface and the accuracy of thickness in the travel direction by exerting the tensile force in the travel direction of an upper side sheet material such as a film, which is a schematic cross section parallel to the travel direction of a movable supporting member for conveying an HIPE.

Then, in the method for the production of this invention, a typical method for improving the smoothness of surface and the accuracy of thickness in the travel direction by the exertion of tensile force in the travel direction of the upper side sheet material such as of a film (a means for generating tensile force in the travel direction) does not need to be particularly limited. Various known means for generating tensile force can be suitably utilized. For example, the adjustment of tensile force in the travel direction (indicated by an arrow in FIG. 12) may be accomplished as illustrated in FIG. 12 by disposing a thickness imparting roll (a drive roll or a non-drive roll) 1241 in the injection part of an HIPE on an inlet 1233 side of a polymerization furnace 1231, disposing a reeling device 1243 provided with a torque control mechanism (reeling torque adjusting mechanism; not shown) in the reeling part on an outlet 1235 side of the polymerization furnace 1231, and causing the reeling device 1243 with the torque thereof so adjusted as to generate prescribed tensile force constantly to act on the upper side sheet material 1203 traveling between the thickness imparting roll 1241 and the reeling device 1243.

Further, as the means for generating tensile force in the travel direction suitably for the purpose of improving the smoothness of surface and the accuracy of thickness in the travel direction owing to the manifestation of tensile force in the travel direction of the upper side sheet material such as of a film, a method for effecting the adjustment of the tensile force in the travel direction by disposing a driven roll (non-drive roll) and a drive roll as vertically opposed nip rolls in the injection part of an HIPE on the inlet side of the polymerization furnace and disposing a reeling device furnished with a reeling torque adjusting mechanism in the reeling part on the outlet side of the polymerization furnace may be cited.

Figure 13:
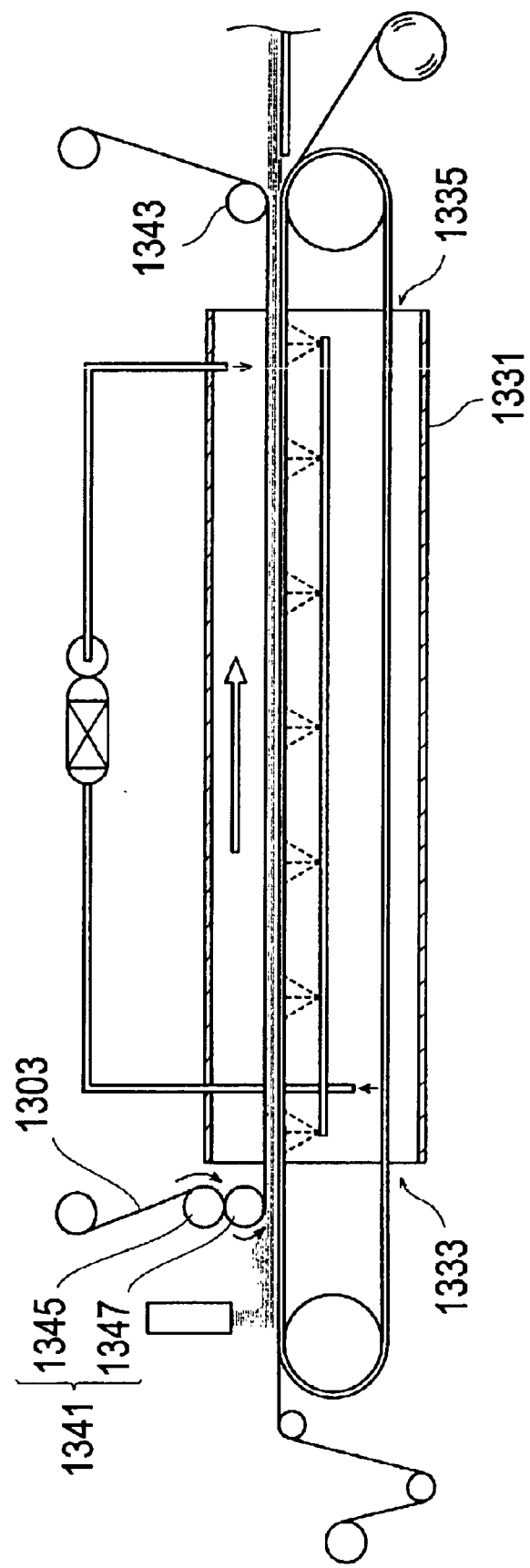
FIG. 13 is a schematic plan view illustrating another embodiment of the means for generating a tensile force in the travel direction for the sake of improving the smoothness of surface and the accuracy of thickness in the travel direction by exerting the tensile force in the travel direction of an upper side sheet material such as a film, which is a schematic cross section parallel to the travel direction of a movable supporting member for conveying an HIPE.

In the suitable means for generating tensile force in the travel direction which is constructed more specifically as illustrated in FIG. 13, by fixing a pair of nip rolls 1341, i.e. a driven roll (non-drive roll) 1345 and a driving roll 1347 vertically opposed and intended to serve as rolls for carrying the upper side sheet material 1303 in the part for injecting an HIPE (supply part; not shown) on an inlet 1333 side of a polymerization furnace 1331 and a reeling device 1343 furnished with a torque control mechanism (reeling torque adjusting mechanism; not shown) on the reeling side of the upper side sheet material 1303 on an outlet 1335 side of the polymerization furnace 1331, and suitably selecting the rotation rate of the nip rolls 1341 and the torque of the reeling device 1343 the tensile force in the longer direction (travel direction; indicated by an arrow in FIG. 13) of the upper side sheet material 1303 can be adjusted constantly in the most suitable state and the porous cross-linked polymer as the cured polymer of HIPE can be obtained with a smooth surface free from wrinkles.

Further, by adjusting the rotation rate of the nip rolls 1341 with the suitable means (method) for generating tensile force in the travel direction, it is made possible to impart an equal speed to a lower side conveying member 1301 (such as, for example, a belt conveyor or a lower side sheet material which is a movable supporting member), prevent the HIPE in the process of polymerization from forming shear deformation due to the deviation of the upper side sheet material 1303, and permit the production of a porous cross-linked polymer as a satisfactory cured product of uniform physical properties.

In this invention, it is desirable to suitably use a means for generating tensile force in the shorter direction (width direction) in combination with a means for generating tensile force in the longer direction (travel direction). In the continuous production of the porous cross-linked polymer, this combined use may prove highly advantageous for the sake of attaining mass production on the commercial scale while constantly securing the high smoothness of surface and the accuracy of thickness.

The method for the production of this invention has as a main construction thereof the fact that the HIPE 111 as the raw material is passed between a movable supporting member 101 and an object (coater 103) disposed so as to retain a prescribed distance from the movable supporting member 101 as illustrated in FIG. 1 thereby regulating the thickness thereof.

To be specific, the object (coater 103) is disposed above the movable supporting member 101 (more specifically, at such a position as that the height (distance) between the top of the supporting member 101 and the bottom (the lower end part in the case of a roll) of the object (coater 103) may be retained at a prescribed distance (i.e., thickness of the porous cross-linked polymer) as laid from end to end in the width (lateral) direction substantially perpendicular to the direction of advance of the movable supporting member 101 (namely, laid across the movable supporting member). This invention can only require the object to be disposed in the width direction and does not always require it to be disposed perpendicularly to the direction of advance. It can even tolerate the object to be laid obliquely against the width direction. The distance (interval) of the object from the top of the supporting member does not need to be uniform from end to end at the height. Depending on the purpose of use, the object may be thick in the middle part or may be thick conversely at the opposite end parts. It is not inconceivable that the polymer ought to assume a varying shape other than the shape of a sheet just to suit the purpose of use. Of course, the object which has the distance thereof from the supporting member suitably varied by properly varying its own shape may be embraced in the technical scope of this invention. Conversely, the object which has the distance varied as required by properly varying the shape of the top on the supporting member side, for example, so as to suit the purpose of use may be also embraced in the technical scope of this invention.

Further, a plurality of such objects may be used as suitably combined. For example, ① by having a plurality of the objects disposed in a longitudinal direction (see Examples 13, 16, and 18 to 21), effects of the regulation of thickness can be manifested more distinctly and consequently the accuracy of thickness can be improved. Further, ② by causing one of the objects to produce the action of regulating thickness at suitable intervals instead of using this one object constantly, a change in thickness can also be imparted on the longitudinal direction (travel direction) side. These measures permit impartation of more complicated shapes.

Besides the disposition of a plurality of objects mentioned above, the purpose of improving the accuracy of thickness may be fulfilled by resorting to the control which fixes the height of the HIPE bank to be formed in front of the object (see FIG. 1). This measure can attain the regulation of thickness more effectively by fixing the difference in head and repressing the fluctuation of thickness indirectly. As typical examples of the controlling means (method), the regulation of a feed rate (amount of supply) of the HIPE and the regulation of a speed of the movable supporting member may be cited. In this case, when the amount of the HIPE supplied and the speed of the movable supporting member are strictly constant, it is no longer necessary to regulate the height of the HIPE bank (see FIG. 1) at a constant level.

The limit to be imposed on the height of the HIPE bank (see FIG. 1) under control, when the HIPE is expected to be formed in the same shape and regulated at the same thickness as the prescribed distance produced by the object, the height of the HIPE bank may be adjusted so as to be the sum of the prescribed distance and within 100%, preferably within 50%, and more preferably within 10 to 30%, of that distance. If the height of the HIPE bank exceeds the sum of the prescribed distance and 100% of that distance, the excess would be at a disadvantage in suffering the regulated thickness to be greater than the prescribed distance produced by the object and consequently lowering the accuracy of thickness. The reason for designating the lower limit by the expression "more preferably the sum of the prescribed distance and not less than 5% of that distance may be that the margin of +5% in the bank part allows the continuous polymerization to proceed stably even when the amount of the HIPE supplied is slightly changed during the switch from one lot to another lot as in the batch production of a plurality of lots of HIPE. The lower limit imposed on the continuous production of HIPE may be theoretically the sum of the prescribed distance and 0% of that distance. The bank part is such that the opposite end parts thereof will not easily suffer the HIPE to leak therethrough because of the quality of the HIPE. It may be nevertheless commendable to provide, separately of the weir to be specifically described herein below, weirs having a greater height than that weir. This provision of the additional weirs permits the prevention of the leakage through the opposite end parts in the bank parts and proves advantageous from the viewpoint of the regulation of height.

The reason for installing a plurality of such objects and regulating the height of the HIPE bank is that the mere passage between the supporting member and the one fixed object existing at a prescribed distance from the supporting member may possibly fail to produce the same thickness as the prescribed distance because of the influence of the HIPE bank prior to the impartation of shape (prior to the regulation of thickness). As pointed out in the paragraph described with reference to FIG. 1 above, the thixotropic quality possessed by the HIPE may constitute itself an important factor for the impartation of shape and the regulation of thickness. The extent of this quality in question may be largely varied with the composition of the HIPE. When the thixotropic quality is weak, for example, the bank may tend to manifest its effect easily. If the bank is extremely high, the thickness obtained after the impartation of shape and the regulation of thickness (by one object) would possibly become larger than the prescribed distance mentioned above. The method (means) mentioned above may be cited as means for eliminating the excessive increase of the thickness and exalting the accuracy of thickness.

Figure 34:
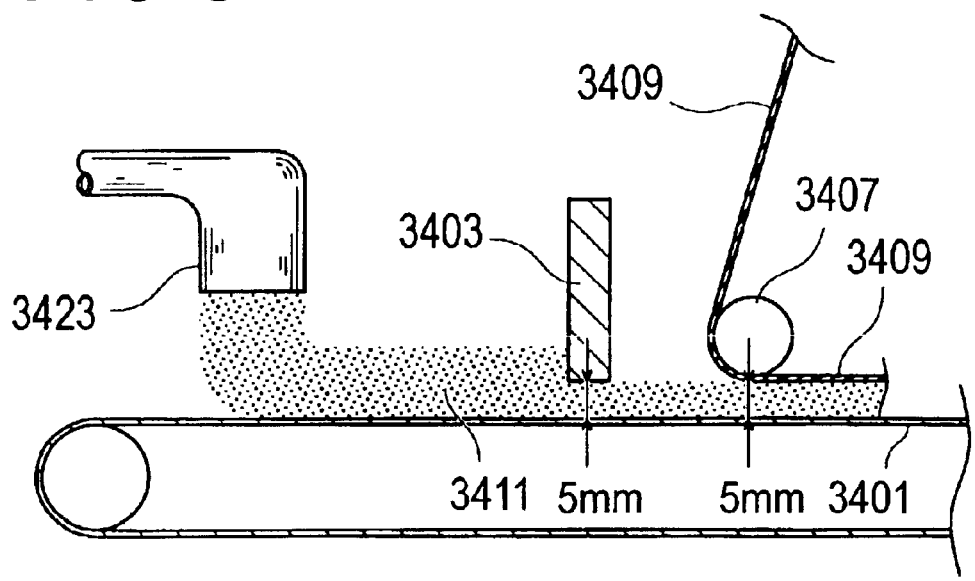
FIG. 34 is a schematic side view illustrating a polymerization apparatus used in Example 20, particularly the manner of performing operations from supply of an HIPE through regulation of thickness by means of the apparatus of Example 19 in combination with a knife coater.
Figure 35:
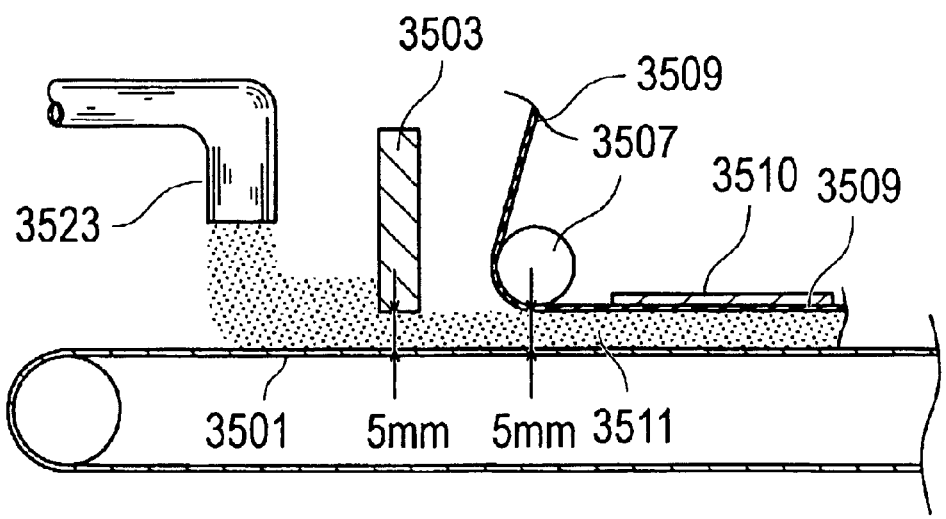
FIG. 35 is a schematic side view illustrating a polymerization apparatus used in Example 21, particularly the manner of performing operations from supply of an HIPE through regulation of thickness while using the apparatus of Example 20 for covering the upper side of the HIPE with a film and subsequently using a thickness regulating plate in combination therewith.

The object mentioned above does not need to be particularly discriminated. As typical examples thereof, various coaters such as a knife coater, a rod coater, a squeeze coater, and a slot orifice coater and rotary rolls may be cited. When the sheet material such as of a film (means for decreasing the oxygen content) is superposed on the upper surface of the HIPE as mentioned above, the use of a rotary roll which is capable of simultaneously performing the regulation of thickness and the attachment of the sheet material may prove to be advantageous. As respects the shape of the object, particularly the shape of the bottom (lower end part) of the object fated to allow passage of the HIPE, the lower end part does not need to have an appreciable length in the longitudinal direction as illustrated in FIG. 1(A). The lower end part may be short in the longitudinal direction as described in the typical example cited above. Even when the lower end part is a point as in the case of the rotary roll, the regulation of thickness can be attained by the distance between the lower end part and the upper surface of the supporting member. Conversely, the bottom (the lower end part) of the object may be long in the longitudinal direction as illustrated in FIG. 34 see (Example 21). The large length of the bottom of the object enables the object (such as a coater) to function highly effectively as a thickness regulating plate which excels in the ability to prevent the outlet of the object from excess inflow of the HIPE.

The substance to form the object does not need to be particularly discriminated. It is desirably to exhibit a satisfactory mold releasability to the HIPE and offer heat resistance and corrosion resistance. As typical examples thereof, such corrosion-resistant metals as stainless steel and titanium, metal plates which have undergone such the corrosion proofing treatment as chrome plating, and plastic materials capable of withstanding the HIPE temperature may be cited.

The method for the production of this invention may preferably use a die in the supply part of the HIPE as means for spreading the HIPE in the width direction of the movable supporting member. Only naturally, the supply part may be preferably disposed in front of the object (the foreground part of the movable supporting member).

As regards the die, a die (such as, for example, a T die) may preferably, from the viewpoint of spreading the HIPE in the width direction of the supporting member, have a feed inlet extended throughout the entire width (entire distance between the opposite weirs where weirs are in use) of the movable supporting member.

As typical examples of the die, a T die, a fishtail die, and a screw die may be cited.

The method for the production of this invention does not need to use essentially a means for spreading the HIPE in the width direction of the movable supporting member. It is only natural, therefore, that various well-known supplying means can be suitably utilized in addition to the die mentioned above. For example, the method for directly supplying the HIPE via a pipeline to the central part of the movable supporting member as described in Example 12 (see the diagram used in Comparative Example 3) may be embraced in the technical scope of this invention.

(2) Apparatus for Polymerization

The polymerization apparatus does not need to be particularly limited but is only required to be provided with a device for drive conveyance which is furnished with a lower side supporting member (including a lower side sheet; a supporting member, when necessary, may partly have heating function for the sake of polymerization), an upper side sheet material, preferably weirs in the opposite end parts in the width direction of the supporting member, as well as a means for generating tensile force fated to act in the width direction and/or the travel direction of the sheet material, and an object disposed so as to retain a prescribed distance from the lower side supporting member, and a polymerization furnace capable of polymerizing the HIPE conveyed by the device for drive conveyance. The main configuration of this apparatus which constitutes itself a construction of this invention has been specifically described with the aid of diagrams in [II] (1) Method of polymerization as mentioned above. It will be omitted from the following description to avoid useless repetition.

Now, the typical polymerization apparatus which can be utilized for the horizontal continuous polymerization according to this invention will be described briefly below with reference to the drawings.

FIG. 2 and FIG. 3 are schematic side views of polymerization apparatuses each comprising a movable sheet material (combination of movable supporting member and a means for decreasing oxygen content) adapted to travel on an endless belt or a plate and utilized effectively as the polymerization apparatus for the use in the horizontal continuous polymerization contemplated by this invention. These apparatuses form one of the representative preferred embodiments of this invention.

As illustrated respectively in FIG. 2 and FIG. 3, an endless belt (movable supporting member) type conveyor (device for drive conveyance) 201 made of stainless steel, disposed horizontally relative to an HIPE supply part [die (T die)] 119 and adapted to travel at a fixed speed in the horizontal direction, or a horizontally laid jacketed elongate plate (stationary supporting member) (202) are set in place. Then, an unreeling and reeling type lower side sheet material 203 formed of a PET film traveling at a fixed speed in one direction on the belt of the conveyor 201 or formed of a PET film traveling on the elongate plate 202 is provided. Further, the regulation of thickness may be attained by spreading the HIPE from the HIPE supply part [die (T die)] 119 in the width direction and continuously extracting it, continuously supplying the HIPE onto the lower side sheet material (movable supporting member) 203 (thereby forming a bank of an approximate height of "Y×1.3" mm in front of a rotary roll 209), and passing the HIPE between the lower side sheet material (movable supporting member) 203 and the object (rotary roll) 209 disposed so as to retain a prescribed distance (Y mm) from the lower side sheet material. For the purpose of imparting to the emanating layer of the HIPE having a cross section measuring about X m in width and about Y mm in thickness, the rotary roll 209 may be set in place behind the HIPE supply part [die (T die)] 119 which is defined by the height of the rotary roll 209, namely the height of the weirs (not shown) disposed in the opposite end parts in the width direction of the supporting member which is a belt, a plate, or a sheet. Further, an unreeling and reeling type upper side sheet material 205 (which is an oxygen content decreasing means on the upper side of the HIPE layer) formed of a PET film and mounted on the upper side of the HIPE layer shaped through the medium of the rotary roll 209 and advanced at the same speed in the same direction as the lower side sheet material 203 may be provided. These upper side and lower side sheet materials may be each formed in the shape of an endless belt using a substance excelling in durability and mold releasability from the viewpoint of ensuring recyclic use. Then, in the case of the endless belt type, unreeling and reeling rolls 208, 212 may have their rotating speeds controlled so that the lower side sheet material 203 may be advanced at the same speed in the same direction as the belt of the conveyor 201. In order that the upper side sheet material 205 may be advanced as kept under tension so as to enhance further the smoothness of surface and the accuracy of thickness of the HIPE, a means such as a tension roller (not shown) which generates tensile force in the width direction and the rotary rolls 209, 211 and unreeling and reeling rolls 207, 213 disposed before and after the conveyor 201 may be set in place at proper heights and the rotating speeds of the unreeling and reeling rolls may be controlled with a torque adjusting mechanism of an unreeling device (a means for generating tensile force in the travel direction (not shown)). Consequently, the upper side and lower side sheet materials 203, 205 may be made to advance in the same direction at the same speed and meantime allowed to retain a fixed vertical distance from each other and remain in a horizontal posture. Similarly in the case of a jacketed elongate plate, rotating speeds of unreeling and reeling rolls 208, 212, as well as rotating speeds of unreeling and reeling rolls 207, 213, may be controlled so as to advance the upper side and lower side sheet materials 203, 205 synchronously at the same speed in the same direction. Alternatively, in order that the upper side sheet material 205 may be advanced as kept under tension so as to enhance further the smoothness of surface and the accuracy of thickness of the HIPE, a means such as a tension roller (not shown) which generates tensile force in the width direction and the rotary rolls 209, 211 and the unreeling and reeling rolls 207, 213 disposed before and after the conveyor 201 may be set in place at proper heights and the rotating speeds of the unreeling and reeling rolls can be controlled with a torque adjusting mechanism of an unreeling device (a means for generating tensile force in the travel direction (not shown)). In the opposite end parts (opposite sides) on the belt of the conveyor 201 or on the elongate plate (202), continuous weirs (including a gasket) having a diameter (height) of Y mm and fixed at the opposite sides (the edges on the long sides) may be disposed in the rear part of the rotary roll 209, and continuous weirs (including of a gasket) having a diameter (height) of Y mm and fixed at the opposite sides (the edges on the long sides) may be disposed in the front part of the rotary roll 209 (not shown).

Further, a polymerization furnace 215 which is provided ① halfway in the length of the conveyor 201 with a heating means permitting the belt of the conveyor 201 carrying the HIPE to travel in a horizontal direction through the interior thereof and enabling the belt while traveling through the interior thereof to be heated from above and below or ② halfway in the length of the elongate plate 202 with a heating means permitting the PET film of the elongate plate 202 carrying the HIPE to travel in a horizontal direction through the interior thereof and enabling the belt while traveling through the interior thereof to be heated from above and below may be disposed in a circular manner (or encircling manner). The polymerization furnace 215 may be provided above the belt or the elongate plate with a temperature elevating means 217 which is formed of a hot air circulating device. Below the belt or the elongate plate, a temperature elevating means 219 formed of a hot water shower device (hot water spraying device) and adapted so as to project hot water directly against the lower side of the belt or a temperature elevating means 220 formed of a hot water supply device (hot water circulating device) and adapted so as to supply hot water to the jacket of the elongate plate may be set in place in order to elevate quickly the temperature of the HIPE through the medium of the sheet material of the belt or the elongate plate. The temperature elevating means 217 as a thermally curing means for polymerizing the HIPE stably at a prescribed curing temperature for a prescribed time may be disposed above the belt or the elongate plate for the additional purpose of enabling the HIPE which has been quickly heated to a curing temperature to retain this temperature through the medium of the sheet material on the upper side of the HIPE. Then, the temperature elevating means 219 may be disposed for the additional purpose of enabling the HIPE which has been quickly heated to the curing temperature to retain this temperature with the heat supplied from below the belt through the medium of the belt and the sheet material and the temperature elevating means 220 through the medium of the elongate plate and the sheet material. Incidentally, the temperature elevating means or the thermally curing means does not need to be limited to the example cited above. As typical examples of the means, oscillators and various infrared heaters which use continuous output magnetrons capable of radiating such active thermal energy rays as microwaves fit for active use of radiation energy, far infrared rays, and near infrared rays and hot air circulating devices, hot water spraying devices, and hot water circulating devices which are adapted to spout such heat media as hot water and hot air may be cited. The latter half zone of the polymerization furnace 215 may be used as a cooling zone for cooling quickly the porous cross-linked polymer obtained at the end of polymerization. This use can be satisfactorily implemented by lowering the set temperature of the hot air circulating device, hot water spraying device, or hot water circulating device. When nitrogen gas is used for forming the hot air, the sealing can be attained with the nitrogen gas in place of the sheet material. When the hot water spraying device is used on the upper side, the sealing can be attained with the water layer in place of the sheet material. They can function concurrently as an oxygen content decreasing means and a heating means.

This invention, in the process of forming the HIPE and producing a porous cross-linked polymer by the horizontal continuous polymerization, may preferably use weirs in the opposite end parts in the width direction of the supporting member which is used for forming the HIPE and subjecting it to the horizontal continuous polymerization.

Specifically, in the case of the HIPE formed as described above, since the HIPE is a thixotropic and viscous non-Newtonian fluid, the weirs (including a gasket) do not need to be used in a tightly compressed state for the purpose of improving the HIPE in the sealing property. In this case, since the weirs are used without being compressed, when the thickness of the HIPE is equal to that of weirs, the porous cross-linked polymer as a polymerized product of the HIPE can be obtained in an expected thickness. Further, by providing such weirs, since oxygen is blocked on the side of the HIPE during the polymerization process thereof, the polymer having desired open cells on the side thereof as well can be obtained effectively.

Figure 14:
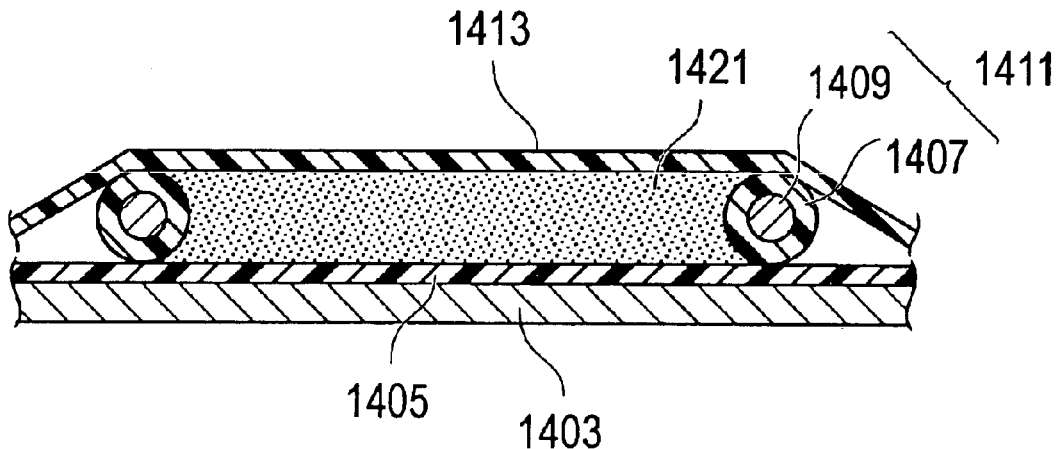
FIG. 14 is a schematic diagram illustrating a typical embodiment of the device for drive conveyance having a movable supporting member furnished with stationary weirs, which is a schematic cross section parallel to the travel direction of an HIPE.
Figure 15:
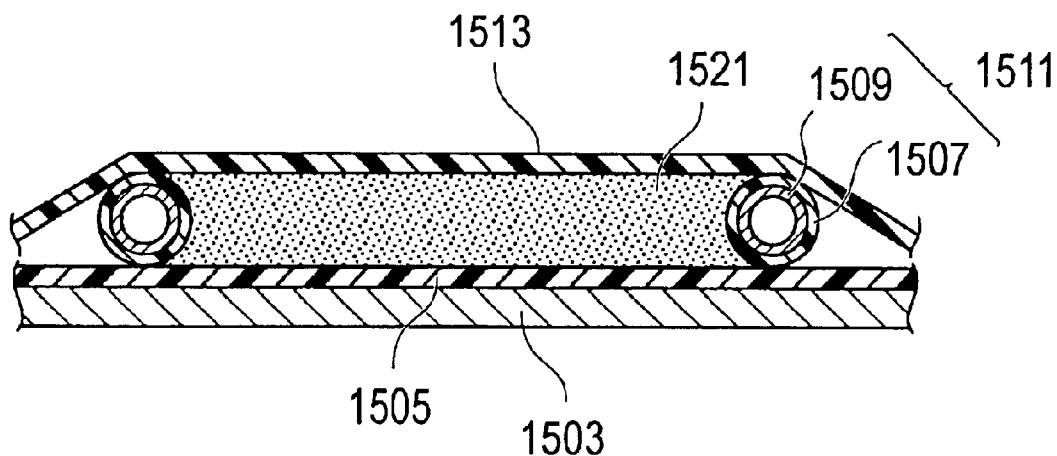
FIG. 15 is a schematic diagram illustrating another typical embodiment of the device for drive conveyance having a movable supporting member furnished with stationary weirs, which is a schematic cross section parallel to the travel direction of an HIPE.

The weirs may be either in a stationary pattern or in a moving pattern (including two types, i.e., an integral pattern and a drive pattern). As a typical example of the stationary pattern, a construction having the weirs so fixed as to contact the opposite end parts in the width direction of a supporting member (for example, an endless belt or a lower side sheet on an endless belt) and consequently allow only the supporting member held in contact with the weirs to travel (FIG. 14 and FIG. 15) may be cited. FIG. 14 is a schematic cross section illustrating a typical preferred embodiment of the device for drive conveyance having a movable supporting member furnished with weirs of the stationary pattern, the cross section being taken perpendicular to the travel direction of the HIPE. To be specific, FIG. 14 is a schematic cross section of a device for drive conveyance 1401 which comprises a horizontally disposed endless belt 1403, a lower side sheet material 1405 conveyed synchronously with the belt 1403, and an upper side sheet material 1413 adapted to use a means for generating tensile force (not shown) and is provided in the opposite end parts of the lower side sheet material 1405 with weirs (1411) of the stationary pattern having tension exerted on a gasket 1411 in which a stainless steel wires 1409 is inserted in a tube 1407 made of a resin. FIG. 15 is a schematic cross section illustrating another typically preferred embodiment of a device for drive conveyance having a movable supporting member provided with weirs of the stationary pattern, the cross section being taken perpendicular to the travel direction of the HIPE. To be specific, FIG. 15 is a schematic cross section of a device for drive conveyance 1501 which comprises a horizontally disposed endless belt 1503, a lower side sheet material 1505 conveyed synchronously with the belt 1503, and an upper side sheet material 1513 adapted to use a means for generating tensile force (not shown) and is provided in the opposite end parts of the lower side sheet material 1505 with gaskets 1511 formed by coating a pipe 1507 made of stainless steel with a resin material 1509 and intended as weirs (1511) of the stationary pattern.

Figure 16:
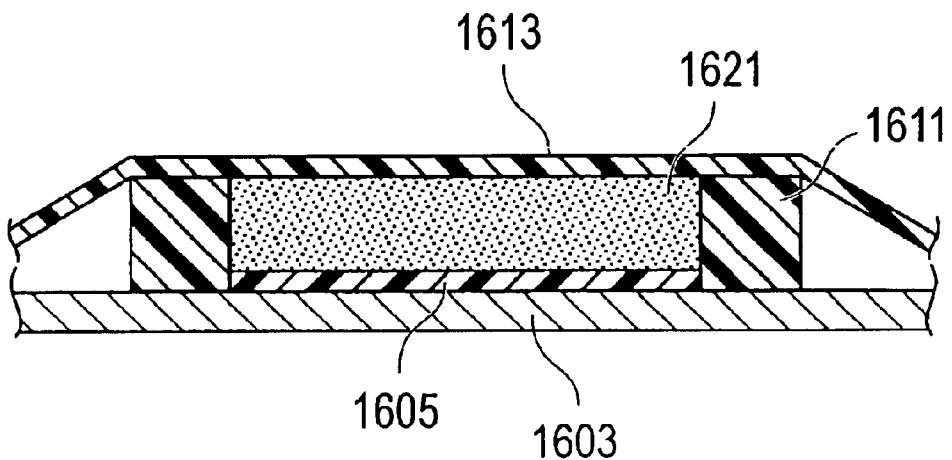
FIG. 16 is a schematic diagram illustrating a typical embodiment of the device for drive conveyance having a movable supporting member furnished with mobile (integral type) weirs, which is a schematic cross section parallel to the travel direction of an HIPE.
Figure 17:
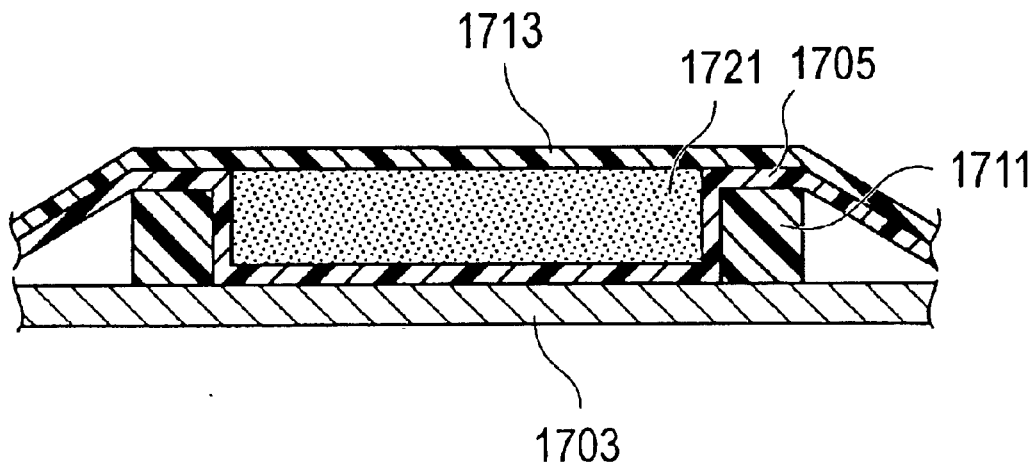
FIG. 17 is a schematic diagram illustrating another typical embodiment of the device for drive conveyance having a movable supporting member furnished with mobile (integral type) weirs, which is a schematic cross section parallel to the travel direction of an HIPE.

The purpose of fixing weirs in such a manner as to contact the opposite end parts in the width direction of a supporting member may be attained, for example, by preparing weirs having wires passed through the interior of a tube and stretching the wires taut in the travel direction with tension or by superposing the upper side sheet material on the upper side of the HIPE and pulling the upper side sheet material toward the opposite end parts in the width direction of the supporting member. By using stationary weirs possessed of a supporting member capable of stably fixing the tube without inducing the weirs to zigzag, it is made possible to stabilize the weirs without producing a zigzagging motion. As a typical example of the integral type moving pattern, a construction having weirs joined to the opposite end parts in the width direction of a supporting member (such as an endless belt or a lower side sheet on an endless belt) and consequently integrated with the supporting member may be cited (FIG. 16 and FIG. 17). FIG. 16 is a schematic cross section illustrating a typical preferred embodiment of a device for drive conveyance having a movable supporting member which is provided with weirs of the moving pattern (integral pattern), the cross section being taken perpendicular to the travel direction of the HIPE. More specifically, FIG. 16 is a schematic cross section of a device for drive conveyance 1601 which comprises a horizontally disposed endless belt 1603, a lower side sheet material 1605 conveyed synchronously with the endless belt 1603, and an upper side sheet material 1613 adapted to use a means for generating tensile force (not shown) and provided in the opposite end parts of the belt 1603 with weirs 1611 of the moving pattern (integral pattern) made of rubber to be adhered to the opposite end parts with an epoxy resin (not shown). FIG. 17 is a schematic cross section illustrating another typical preferred embodiment of a device for drive conveyance having a movable supporting member which is provided with weirs of the moving pattern (integral part), the cross section being taken perpendicular to the travel direction of the HIPE. More specifically, FIG. 17 is a schematic cross section of a device for dive conveyance 1701 which comprises a horizontally disposed endless belt 1703, a lower side sheet material 1705 conveyed synchronously with the endless belt 1703 adapted to use a means for generating tensile force (not shown) and is provided in the opposite end parts of the belt 1703 with weirs 1711 of the moving pattern (integral pattern) made of a resin to be adhered to the opposite end parts with an epoxy resin (not shown).

Figure 18:
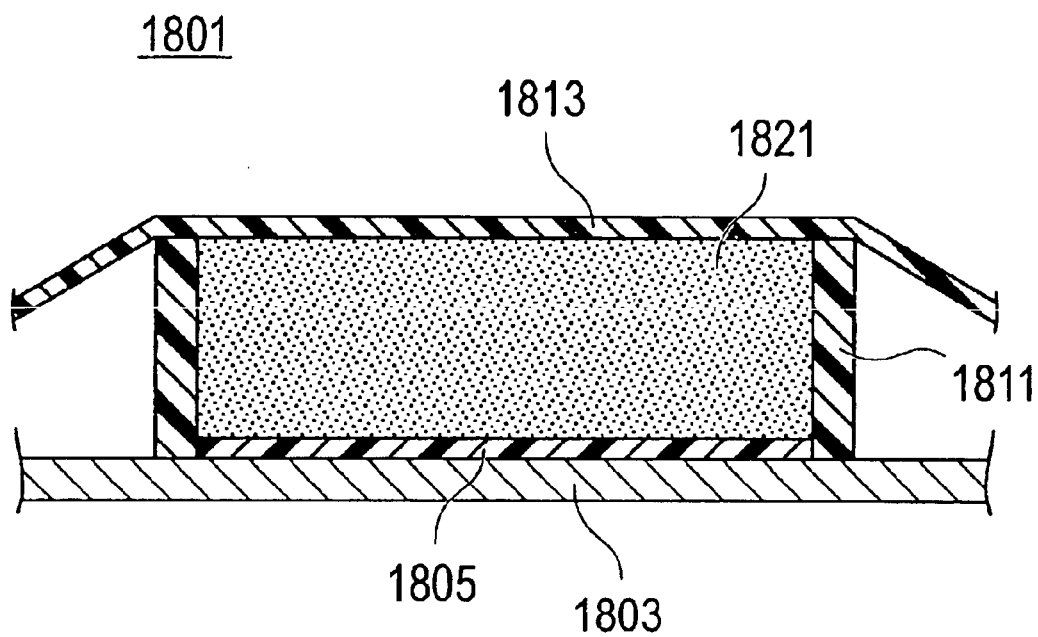
FIG. 18 is a schematic diagram illustrating a typical embodiment of the device for drive conveyance having a movable supporting member furnished with mobile (drive type) weirs, which is a schematic cross section parallel to the travel direction of an HIPE.

In this invention, the supporting member and the weirs may be integrally produced. To be more specific, an endless belt having a concave cross section in the width direction may be used and allowed to function concurrently both as a supporting member and weirs. The endless belt thus used, though incapable of adjusting the height of weirs, may well be rated as suitable for quantity manufacture of products of one fixed configuration on the commercial scale. As typical example of the drive type moving pattern, a construction having weirs mounted in the opposite end parts in the width direction of a supporting member (such as a lower side sheet material on an endless belt) and consequently allowed to travel (drive) in the same direction at the same speed as the supporting member may be cited (FIG. 18). FIG. 18 is a schematic cross section illustrating a typical preferred embodiment of a device for drive conveyance having a movable supporting member which is provided with weirs of the moving pattern (drive type), the cross section being taken perpendicular to the travel direction of the HIPE. More specifically, FIG. 18 is a schematic cross section of a device for drive conveyance 1801 which comprises a horizontally disposed endless belt 1803, a lower side sheet material 1805 conveyed synchronously with the endless belt 1803 adapted to use a means for generating tensile force (not shown) and is provided in the opposite end parts of the belt 1803 with an endless belt 1811 of the moving pattern (drive type) made of an elastomer and intended as weirs (1811).

The shape and construction of the weirs does not need to be particularly discriminated but is only required to accomplish the purpose of the use of the weirs. As typical examples thereof, various cross sections including hollow (see FIG. 14 and FIG. 15), circle, ellipse, tetragon (see a square of FIG. 16 and FIG. 17 and a rectangle of FIG. 18), trapezoid, and semicircle may be cited.

The materials usable for the weirs, though including those which exhibit elasticity and flexibility at low levels, may preferably include those which exhibit small swelling property to the HIPE those which succumb to small thermal deterioration caused by the polymerization of the HIPE, and those which exhibit a satisfactory mold releasability to the porous cross-linked polymer which is the polymerized product of the HIPE.

As typical examples of the material for the weirs, synthetic resins such as polyolefin resins including polyethylene and polypropylene, saturated polyester resins including polyethylene terephthalate and polybutylene terephthalate, polyamide resins including 6-nylon and 6,6-nylon, polyvinyl chloride resin, acrylic resin, methacrylic resin, fluorine resin, silicon resin, ABS resin, polycarbonate resin, polystyrene resin, epoxy resin, polyimide resin, polyphenyl sulfide resin, polysulfone resin, polyether sulfone resin, polyether imide resin, polyether ether ketone, para type aramid resin, ionomer resin, AS resin, EVA ressin, vinylidene chloride resin, polyacetal resin, polyamideimide resin, polyarylate resin, nylon resin, vinyl acetate resin, phenol formaldehyde resin, urea resin, melamine formaldehyde resin, furan resin, unsaturated polyester resin, vinyl ester resin, and DAP resin; rubber materials such as natural rubber (NR), isoprene rubber (IR), styrene butadiene rubber (SBR), butadiene rubber (BR), chloroprene rubber (CR), butyl rubber (BR), nitrile rubber (NBR), silicone rubber, fluorine rubber, acrylic rubber, urethane rubber, chlorosulfonated polyethylene rubber, ethylene propylene rubber (EPDM), and polysulfide rubber; thermoplastic elastomers such as polyester elastomer, polyamide elastomer, urethane type elastomer, and styrene type elastomer; the synthetic resins and rubber materials mentioned above to be reinforced with such inorganic fillers as glass and graphite and such organic fillers as polyimide; synthetic resins provided with a coating layer of synthetic resin different in quality from the body of the weirs; metals such as hollow rings made of stainless steel, for example; and composites of metals with synthetic resins or rubbers (including a metal coated with a synthetic resin) maybe cited. In terms of the resistance to the swelling property manifested in the HIPE, the resistance to the thermal deterioration manifested in the polymerization of the HIPE, and the mold releasability manifested by the porous cross-linked polymer as the polymerized product of the HIPE, a rubber material such as chloroprene rubber or silicone rubber, a fluorine resin such as polytetrafluoroethylene, tetrafluoroethylene-perfluoro alkylvinyl ether copolymer, tetrafluoroethylene-hexafluoropropylene copolymer and tetrafluoroethylene-ethylene copolymer, and a thermoplastic elastomer such as polyester elastomer or polyamide elastomer may be preferably used.

Since the porous cross-linked polymer as the polymerized product of the HIPE is obtained in an expected thickness when the forming thickness of the HIPE and the thickness of the weirs are equal, the height of the weirs ought to be properly decided so as to coincide with the forming thickness of the HIPE. Preferably, this height is in the range of 0.5 to 100 mm similarly to the forming thickness of the HIPE. If the height of the weirs is less than 0.5 mm, the shortage would be at a disadvantage in rendering the handling of the formed HIPE difficult. Conversely, if the height exceeds 100 mm, i.e., the height of the weirs is greater than the thickness of the formed HIPE and they consequently produce a difference in height, the excess would be at a disadvantage in possibly rendering difficult the tight adhesion of the sheet material for decreasing the oxygen content of the upper side of the HIPE to the upper side of the HIPE.

One preferred embodiment of the polymerization apparatus contemplated by this invention has been described. It goes without saying that the polymerization apparatus which can be adopted for the method for the production of this invention does not need to be limited to these examples.

The material for forming the polymerization apparatus (excluding the weirs as described above) does not need to be particularly restricted. From among the materials that satisfy the technical standard requirements such as strength (durability) and corrosion resistance, the optimum material may be properly selected in consideration of economy and environmental protection and recycling property. As typical examples thereof, metals (including alloys) such as aluminum, iron, and stainless steel, synthetic resins such as polyethylene, polypropylene, fluorine resins, polyvinyl chloride, and unsaturated polyester resins, and fiber-reinforced resins obtained by reinforcing such synthetic resins with fibers such as glass fibers or carbon fibers may be cited. When the material for the apparatus is subjected to the high-frequency dielectric heating using microwaves as a temperature elevating means and aluminum is to be used in this material, for example, it has a possibility of catching fire (by virtue of vortex current). Thus, the selection of this material requires due attention.

(3) Impartation of Shape to HIPE, Regulation of Thickness Range, and Shape Thereof The regulated thickness of the HIPE obtained after the impartation of shape by the object may be in the range of 0.5 to 100 mm, preferably 0.5 to 50 mm, and more preferably 0.5 to 30 mm. If the regulated thickness of the HIPE after the impartation of shape is so large as to exceed 100 mm, the excess would be at a disadvantage, if slightly in conferring added strength on the movable supporting member for the purpose of securing flatness of surface and preventing deformation, suffering the apparatus to become rigid and expensive, and inducing the phenomenon of separation of water during the course of polymerization. Even when the regulated thickness of the HIPE exceeds 100 mm, the excess may be tolerated by adjusting the speed of conveyance of the HIPE so as to secure a long time for curing the polymer at a comparatively low temperature. If the regulated thickness of the HIPE after the impartation of shape is less than 0.5 mm, the shortage would be at a disadvantage in rendering the handling of the formed HIPE difficult. When the regulated thickness is not less than 0.5 mm, a multiplicity of porous cross-linked polymers to be obtained in a small thickness may be properly superposed and used in liquid absorbents, energy absorbents, and chemical impregnating substrates, for example, and allowed to manifest necessary performance and quality amply. Incidentally, the regulation of the thickness of the formed HIPE in the range of 0.5 to 20 mm may bring further conspicuous effects of enabling the temperature of the formed HIPE to be quickly elevated to the target curing level and permitting the polymerization to be completed in an unusually short length of time.

The shape of the formed HIPE does not need to be particularly restricted. It may be in such a cross section as described above. As typical examples of the cross section, given sections including tetragons such as rectangle, square, trapezoid, and parallelogram, polygons, ellipse, semicircle, and plate, and corrugated plate may be cited.

(4) Curing Temperature

The curing temperature of the HIPE may generally fall in the range of a normal temperature to 120° C. From the viewpoint of the stability of the HIPE and the polymerization rate, it may be preferably in the range of 40° to 100° C., more preferably 80° to 100° C., and particularly preferably 95° to 100° C. Further, the forming temperature of the HIPE (To) (i.e., the temperature at the time of starting elevation of temperature by heating) and the curing temperature ($T_1$) may preferably satisfy the relation: $T_0 \leq T_1$ (This relation may be introduced from the requirement that the HIPE is heated to a prescribed curing temperature and then polymerized).

If the curing temperature is below a normal temperature, the shortage would be at a disadvantage in necessitating a long time for the polymerization, requiring the apparatus to be newly provided with a cooling means, and impairing the economy from the commercial point of view. Conversely, if the curing temperature exceeds 120° C., the excess would be at a disadvantage in possibly suffering the produced porous cross-linked polymer to include pores not uniform in diameter and degrading the capacity of the porous cross-linked polymer for absorption.

The $T_0$ and $T_1$, therefore, is only required to satisfy the relation: $T_0 \leq T_1$. For the purpose of producing the porous cross-linked polymer uniformly, the temperature difference between $T_0$ and $T_1$ [$T_0-T_1$] may be preferably not more than 50° C. If the temperature difference [$T_0-T_1$] exceeds 50° C., the excess would be at a disadvantage in suffering the surface of HIPE to be locally heated because of a rapid elevation of temperature and consequently rendering the production of an uniform porous cross-linked polymer difficult. From the standpoint of the performance and quality of the produced porous cross-linking polymer and the control of the temperature, the curing temperature (polymerization temperature) of the HIPE [$T_1$] may be preferably set within a prescribed temperature (±several ° C.) range by controlling externally the amount of energy. The curing temperature may be varied during the course of polymerization within the temperature range as defined above. This curing temperature should not exclude the manner for polymerization.

After the polymerization (after the elapse of the polymerization and curing time), the produced polymer may be cooled or gradually cooled to a prescribed temperature. Depending on the method used for the polymerization, the polymer may be shifted without being cooled to the step for a subsequent treatment such as dehydration or compression which will be described more specifically herein below.

(5) Rate of Temperature Elevation by Heating

When the curing temperature of the HIPE is higher than the forming temperature thereof, the rate of temperature elevation by heating to the curing temperature during the polymerization of the HIPE does not need to be particularly restricted. Though it can not be defined uniquely because it is varied with the composition and the thickness of the HIPE and with the means for temperature elevation by heating, it may be preferably not less than 5° C./min. If the rate of temperature elevation by heating is less than 5° C./min, the shortage would be at a disadvantage in retarding the polymerization and aggravating the discernible water separation during the course of polymerization. The rate of temperature elevation by heating may be more preferably in the range of 5 to 60° C./min. If the rate of temperature elevation by heating is unduly high exceeding 60° C./min, the excess would beat a disadvantage in not enabling the emulsified state of HIPE to be retained stably and possibly suffering the HIPE to be crushed depending on the W/O ratio. The term "rate of temperature elevation by heating" as used herein refers to [$T_{0.9}-T_0/(t_{0.9}-t_0)$] which is obtained only from the time [$t_{0.9}$] required to reach the temperature [$T_{0.9}$] equivalent to 90% of the temperature difference between the prescribed curing temperature, [$T_1$] and the temperature for formation of HIPE, [$T_0$], but not to [$T_1-T_0/(t_1-t_0)$] which is determined from the time [$t_1$] required for the temperature [$T_0$] of the HIPE at the time for starting the heating [$t_0$] to reach (constantly) a prescribed curing temperature [$T_1$]. On other words, this relation is represented by the equation, $$[T_{0.9}]=[T_0]+([T_1]-[T_0])\times 0.9.$$

(6) Time for Temperature Elevation by Heating

At the rate of temperature elevation by heating as mentioned above, the total time for temperature elevation by heating may be not less than 15 seconds, preferably in the range of 15 seconds to 10 minutes, more preferably 30 seconds to 7 minutes, and particularly preferably 1 to 5 minutes. If the temperature elevation is completed in a period of less than 15 seconds or more than 10 minutes, the deviation would be possibly at a disadvantage in not enabling the HIPE to be retained stably during the course of temperature elevation, aggravating the water separation, and suffering the polymerization to proceed ununiformly. The term "time for temperature elevation by heating" as used herein refers to the total time [$t_1-t_0$] which elapses from the time for starting the temperature elevation of HIPE by heating [$t_0$] till the time [$t_1$] at which the temperature of HIPE reaches the prescribed curing temperature [$T_1$] (for stabilization).

(7) Time for Curing Polymer

The time for curing the polymer as contemplated by this invention can not be defined uniquely because it is variable with the composition of the HIPE and the forming thickness. The method of this invention for continuously performing the process from the supplying step of an HIPE through the polymerizing step thereof, as compared with the conventional method for the combined continuous and batch polymerization, is highly effective in carrying out the polymerization stably in such a short time as in the range of some tens of seconds to 60 minutes. For example, it may suffice only to control a traveling speed of a conveying device so that the polymerization is completed before or at the time when the conveying device passes through the interior of a proper polymerization furnace. The time for curing and polymerization may be preferably in the range of 60 seconds to 60 minutes. If the curing time of the polymer exceeds 60 minutes, the excess would be at a disadvantage in degrading the productivity of the porous cross-linked polymer because of the necessity for elongating a curing furnace or lowering the conveyance speed. If the curing time is less than 60 seconds, the shortage would be at a disadvantage in not allowing the porous cross-linked polymer to acquire fully satisfactory properties because the polymerization is not completed. Of course, this invention does not need to exclude the adoption of a polymerizing and curing time longer than the upper limit of the range specified above. The term "polymerizing and curing time" as used herein refers to a total time [$t_2-t_0$] from the time [$t_0$] for starting temperature elevation by heating till the time [$t_2$] for completing the polymerization.

(8) Shape of Porous Cross-Linked Polymer

The shape of the porous cross-linked polymer which is obtained by the step of polymerization as mentioned above does not need to be particularly restricted but may be selected arbitrarily, similar to the shape of the HIPE after the impartation of shape, because the HIPE is polymerized with the imparted shape maintained to form a porous cross-linked polymer.

(9) Step of Slicing Porous Cross-Linked Polymer

In the present invention, the porous cross-linked polymer obtained by the horizontal continuous polymerization of the HIPE as described above can be continuously sliced.

The method for continuously slicing the porous cross-linked polymer does not need to be particularly restricted. Any of conventional slicing means can be properly used. As typical examples thereof, a belt conveyor type horizontal endless band knife may be cited.

When the porous cross-linked polymer is to be continuously sliced subsequently to the polymerization, the polymer may be formed in the shape of a layer of (n×X) mm in thickness and then this polymer may be sliced at (n−1) stages into sheets or films of X mm in thickness to give rise to n sheets or films. In this case, a method for sequentially slicing the polymer may be implemented by serially arranging a plurality of the horizontal endless band knives on the route of conveyance, with the slicing surfaces (at a height from the conveying device) thereof positioned stepwise.

If the slicing speed of the porous cross-linked polymer is unduly high, the porous cross-linked polymer would possibly sustain a fold or a crack. The slicing speed, therefore, may be preferably not more than 100 m/minute, more preferably in the range of 1 to 30 m/minute.

(10) Step of After-Treatment (Reduction to Finished Product) After Formation of Porous Cross-Linked Polymer (a) Dehydration The porous cross-linked polymer produced by the polymerization or, as occasion demands, produced by the slicing operation following the polymerization may be generally dehydrated by compression, aspiration under a reduced pressure, or the combination thereof. Generally, the dehydration thus implemented may expel a portion in the range of 50 to 98% of the water used, while the remainder of the water would adhere to and remain on the porous cross-linked polymer.

The ratio of dehydration may be properly set so as to suit for the purpose for which the porous cross-linked polymer is intended, for example. Generally, it may suffice to set the ratio of dehydration that the porous cross-linked polymer may assume a water content in the range of 1 to 10 g or a water content in the range of 1 to 5 g, per g of the porous cross-linked polymer in a perfectly dried state.

(b) Compression

The porous cross-linked polymer according to this invention can be obtained in a form compressed to one of several divisions of the original thickness. The compressed sheet has a smaller inner volume than the original porous cross-linked polymer and permits the decrease in the cost for the transportation or storage. The porous cross-linked polymer in the compressed state is characterized by being disposed to absorb water when exposed to a large volume of water and resume the original thickness and exhibiting the ability to absorb water at a higher speed than the original polymer.

For the porous cross-linked polymer to acquire a compressed form, a compressing means conforming to the shape of the porous cross-linked polymer can be used so as to exert an uniform pressure to the entire porous cross-linked polymer and compress it uniformly. This invention prefers the steps following the polymerization to be performed continuously by using a proper conveying device so that the porous cross-linked polymer to be obtained by the polymerization may be continuously dehydrated while being conveyed and thereafter compressed by being passed between rolls or belts separated with an adjusted interval. Generally, the sheet is caused to decrease the thickness thereof to a certain extent by the work of compression or the work of suction by decompression at the dehydration step. The need for deliberately incorporating the compression step is no longer exist when the sheet after the completion of the dehydration step has a thickness within a prescribed range.

From the viewpoint of saving a space for the transportation or storage of the polymer and facilitating the handling thereof, it may be effective to compress the polymer to not more than ½ of the original thickness. More preferably, the compression is made to not more than ¼ of the original thickness.

(c) Washing

The porous cross-linked polymer, for the purpose of imparting an improving surface condition thereto, may be washed with purified water or an aqueous solution or a solvent containing an arbitrarily selected additive.

(d) Drying

The porous cross-linked polymer obtained by the steps mentioned above, when necessary, may be heated and dried with hot air or microwaves, or alternatively may be moistened for the adjustment of the water content thereof.

(e) Cutting

The porous cross-linked polymer obtained by the steps mentioned above, when necessary, may be cut into proper sizes and worked to obtain a finished product fitting for the varying uses.

(f) Impregnation

The porous cross-linked polymer obtained by the steps mentioned above, when necessary, may be impregnated with such an additive as a detergent, an aromatizer, a deodorant, a coloring agent, a wetting agent, and an antibacterial agent so as to be endowed with pertinent forms of functionality.

EXAMPLE

Now, this invention will be described more specifically below with reference to working examples.

Example 1

An oil phase was prepared by adding and uniformly dissolving 0.4 part by mass of diglycerin monooleate to a mixture consisting of 5.0 parts by mass of 2-ethylhexyl acrylate and 3.0 parts by mass of 55% divinyl benzene. Separately, a water phase was prepared by dissolving 8.0 parts by mass of calcium chloride and 0.2 part by mass of potassium persulfate in 395 parts by mass of purified water and heated to a temperature of 55° C. The oil phase and the water phase were continuously supplied at a W/O ratio of 1/48 into a dynamic mixing device and mixed together and emulsified therein, to produce an HIPE (1).

Figure 19:
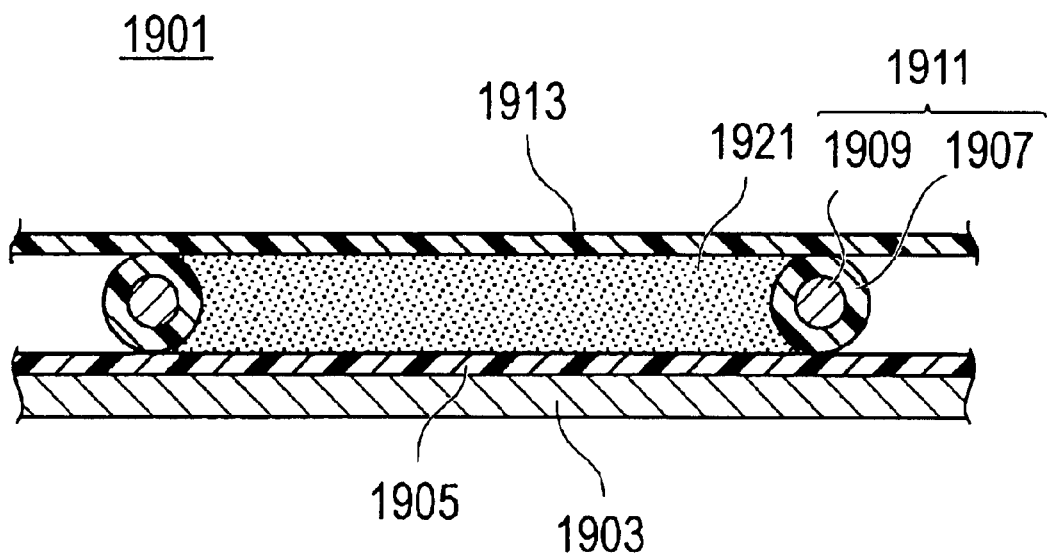
FIG. 19 is a schematic diagram illustrating a typical embodiment of the device for drive conveyance having a movable supporting member furnished with stationary weirs for the use in the horizontal continuous polymerization of an HIPE in Example 1, which is a schematic cross section perpendicular to the travel direction of the HIPE.

Then, the resultant HIPE (1) 1921 was continuously applied with a coater at a feed rate of 1.9 kg/min so as to be a width of 1.5 m and a thickness of 5 mm, as illustrated in FIG. 19, on a lower PET film 1905 of a device for drive conveyance 1901 measuring 1.5 m in width and provided in each of the opposite end parts on a horizontally disposed endless steel belt 1903 and the lower PET film 1905 conveyed synchronously with the belt 1903 and measuring 1.6 m in width and 50 µm in thickness with stationary type weirs (1911) having tension exerted on a gasket 1911 and comprising a stainless steel wire of a diameter of 2.0 mm inserted in a tube 1907 made of a fluorine resin PFA and measuring 50 mm in outer diameter and 3.0 mm in inside diameter. Subsequently, an upper PET film 1913 measuring 1.6 m in width and 50 µm in thickness was mounted on the resultant layer of the HIPE and passed jointly at a traveling speed of 0.25 m/min through a polymerization furnace measuring 15 m in length and having a hot air circulation unit kept at 90° C. so as to heat the upper PET film 1913 and hot water shower units kept at 90° C. set so as to heat the lower steel belt 1903. The HIPE was polymerized in the polymerization furnace for 60 minutes to produce a porous cross-linked polymer (hereinafter occasionally referred simply to as "polymer") (1). Since the opposite end parts in the width direction of the polymer (1) that contacted with the weirs 1911 were cut off in a size of 3 mm each because of the deflection in the width direction, the yield of the polymer was 99.6%. The product had a thickness of 5±0.3 mm, though the upper side thereof had the smoothness thereof lowered slightly because it formed small yet discernible waviness. The evaluation results are shown in Table 1 below and a schematic cross section illustrating the condition of conveyance of the HIPE by the use of the device for drive conveyance provided with the weirs as mentioned above and taken perpendicularly to the travel direction of the HIPE is shown in FIG. 19.

Example 2

An HIPE (1) was produced by following the procedure of Example 1.

Figure 20:
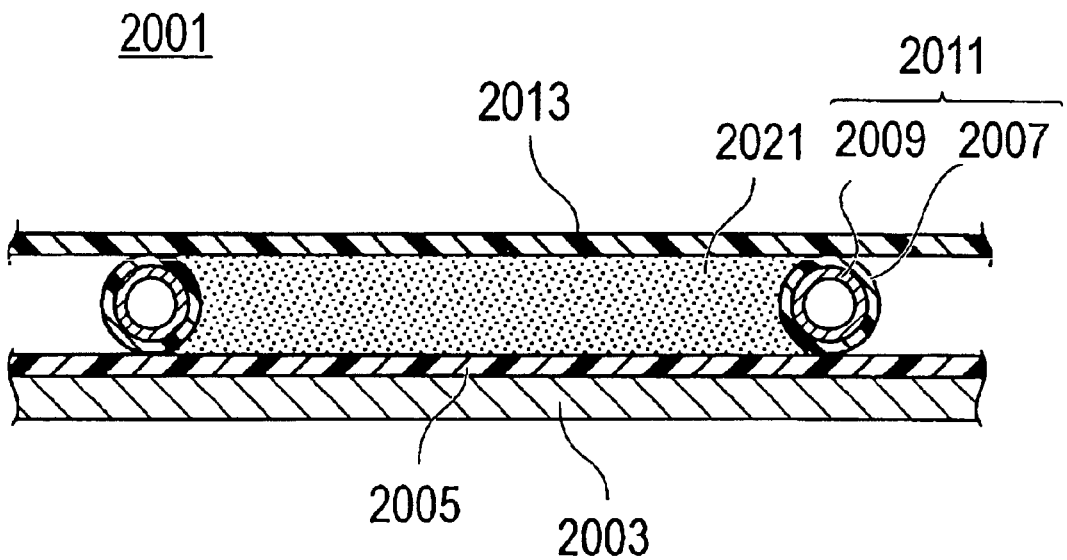
FIG. 20 is a schematic diagram illustrating a typical embodiment of the device for drive conveyance having a movable supporting member furnished with stationary weirs for the use in the horizontal continuous polymerization of an HIPE in Example 2, which is a schematic cross section perpendicular to the travel direction of the HIPE.

Then, the HIPE (1) 2021 was continuously applied with a coater at a feed rate of 1.9 kg/min in a width of 1.5 m and a thickness of 5 mm, as illustrated in FIG. 20, on a lower PET film 2005 of a device for drive conveyance 2001 measuring 1.5 m in width and provided in each of the opposite end parts of a horizontally disposed endless steel belt 2003 and the lower PET film 2005 conveyed synchronously with the belt 2003 and measuring 1.6 m in width and 50 µm in thickness with a gasket 2011 having a pipe 2007 of stainless steel measuring 4.6 mm in outer diameter and 2.6 mm in inside diameter coated with a fluorine resin PTFE 2009 so as to give a thickness of 0.2 mm as a weir (2011) of a stationary pattern. Subsequently, the resultant layer of the HIPE and an upper PET film 2013 measuring 1.6 m in width and 50 µm in thickness and mounted thereon were passed jointly at a traveling speed of 0.25 m/min through a polymerization furnace measuring 15 m in length and having a hot air circulation unit of 90° C. set for the sake of the upper PET film 2013 and a hot water shower unit of 90° C. set for the sake of the lower steel belt 2003 to polymerize the HIPE for 60 minutes thereby producing a polymer (2). Since the opposite end parts in the width direction of the polymer (2) that touched the weirs 2011 because of the shake in the width direction were cut off in a size of 3 mm each, the yield of the product was 99.6%. The product had a thickness of 5±0.3 mm, though the upper side thereof had the smoothness thereof lowered slightly because it formed small yet discernible waviness. The results of evaluation are shown in Table 1 below and a schematic cross section illustrating the condition of conveyance of the HIPE using the device for drive conveyance provided with the weirs and taken perpendicularly to the travel direction of the HIPE is shown in FIG. 20.

Example 3

An HIPE (1) was produced by following the procedure of Example 1.

Figure 21:
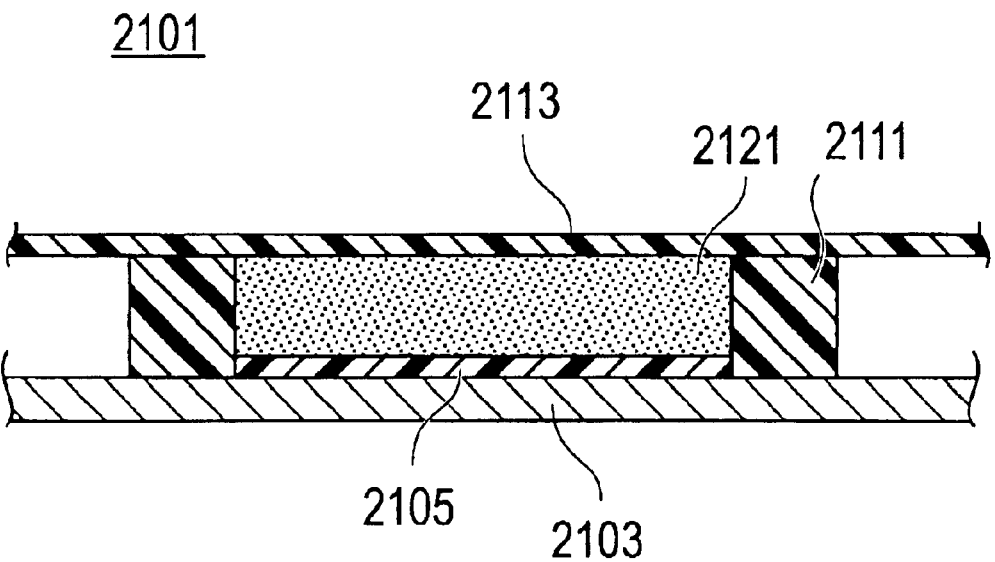
FIG. 21 is a schematic diagram illustrating a typical embodiment of the device for drive conveyance having a movable supporting member furnished with mobile (integral type) weirs for the use in the horizontal continuous polymerization of an HIPE in Example 3, which is a schematic cross section perpendicular to the travel direction of the HIPE.

Then, the HIPE (1) 2121 was continuously applied with a coater at a feed rate of 7.5 kg/min in a width of 1.5 m and a thickness of 20 mm, as illustrated in FIG. 21, on a lower PET film 2105 measuring 1.5 m in width and 50 µm in thickness and conveyed synchronously with a device for drive conveyance 2101 measuring 1.5 m in width and provided at each of the opposite end parts of a horizontally disposed endless belt 2103 having a width of 1.6 m with a weir (2111) of a moving pattern (integral type) having a chloroprene rubber piece 2111 measuring 30 mm in width and 20 mm in height adhered with epoxy resin (not shown). Subsequently, the resultant layer of the HIPE and an upper PET film 2113 measuring 1.6 m in width and 50 µm in thickness and mounted thereon were passed jointly at a traveling speed of 0.25 m/min through a polymerization furnace measuring 15 m in length and having a hot air circulation unit of 90° C. set for the sake of the upper PET film 2113 and a hot water shower unit of 90° C. set for the sake of the lower steel belt 2103 to polymerize the HIPE for 60 minutes thereby producing a polymer (3). Since the opposite end parts in the width direction of the polymer (3) that touched the weirs 2111 were cut off in a size of 1 mm each because the upper PET film enjoyed a satisfactory retaining property on account of the absence of a shake in the width direction, the yield of the product was 99.8%. The product had a thickness of 20±0.3 mm because the upper PET film had a satisfactory retaining property, though the upper side thereof formed small yet discernible waviness and consequently had the smoothness thereof lowered slightly. The results of evaluation are shown in Table 1 below and a schematic cross section illustrating the condition of conveyance of the HIPE using the device for drive conveyance provided with the weirs and taken perpendicularly to the travel direction of the HIPE is shown in FIG. 21.

Example 4

An HIPE (1) was produced by following the procedure of Example 1.

Figure 22:
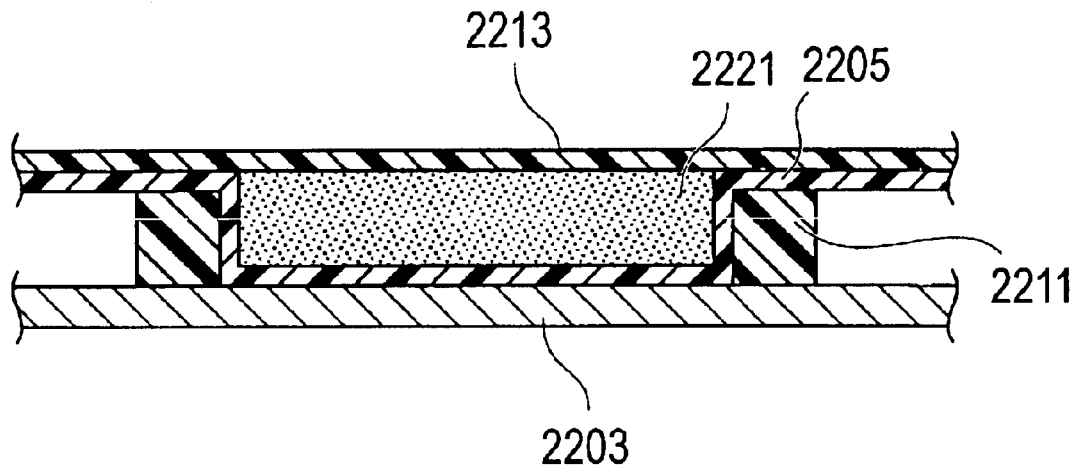
FIG. 22 is a schematic diagram illustrating a typical embodiment of the device for drive conveyance having a movable supporting member furnished with mobile (integral type) weirs for the use in the horizontal continuous polymerization of an HIPE in Example 4, which is a schematic cross section perpendicular to the travel direction of the HIPE.

Then, the HIPE (1) 2221 was continuously applied with a coater at a feed rate of 7.5 kg/min in a width of 1.5 m and a thickness of 20 mm, as illustrated in FIG. 22, on a thin lower PET film 2205 measuring 1.64 m in width and 12 μm in thickness in consideration of the sealing property of the HIPE and conveyed synchronously with a device for drive conveyance 2201 provided at each of the opposite end parts of a horizontally disposed endless belt 2203 having a width of 1.6 m with a weir (2211) of a moving pattern (integral type) having a fluorine type PTFE resin piece 2211 measuring 30 mm in width and 20 mm in height adhered with an epoxy resin (not shown). Subsequently, the resultant layer of the HIPE and an upper PET film 2213 measuring 1.6 m in width and 50 μm in thickness and mounted thereon were passed jointly at a traveling speed of 0.25 m/min through a polymerization furnace measuring 15 m in length and having a hot air circulation unit of 90° C. set for the sake of the upper PET film 2213 and a hot water shower unit of 90° C. set for the sake of the lower steel belt 2203 to polymerize the HIPE for 60 minutes thereby producing a polymer (4). Since the opposite end parts in the width direction of the polymer (4) that touched the weirs 2211 through the medium of the PET film were no longer required to be cut because the PET film had a satisfactory mold releasability, the yield of the product was 100%. The product had a thickness of 20±0.3 mm, though the upper side thereof formed small yet discernible waviness and consequently had the smoothness thereof lowered slightly. The results of evaluation are shown in Table 1 below and a schematic cross section illustrating the condition of conveyance of the HIPE using the device for drive conveyance provided with the weirs mentioned above and taken perpendicularly to the travel direction of the HIPE is shown in FIG. 22.

Example 5

An HIPE (1) was produced by following the procedure of Example 1.

Figure 23:
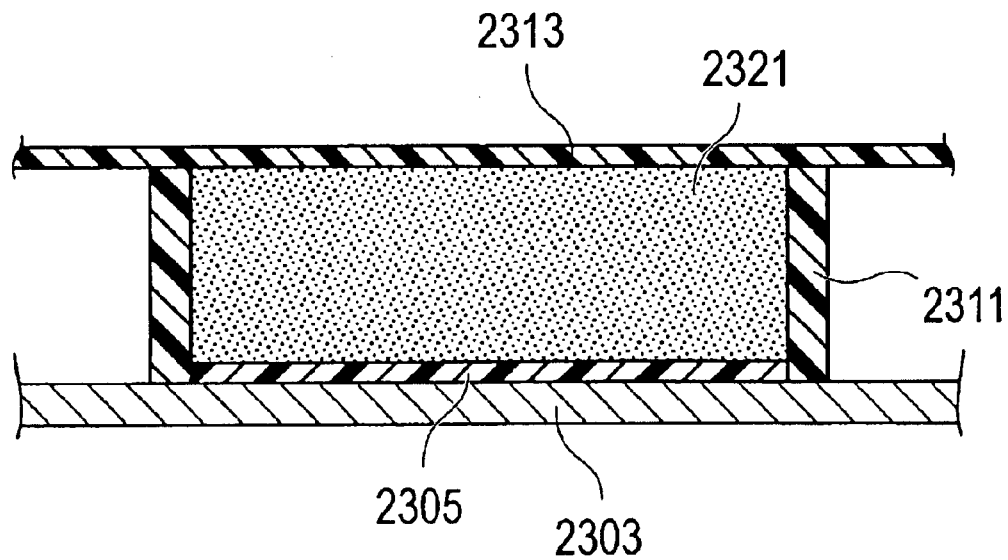
FIG. 23 is a schematic diagram illustrating a typical embodiment of the device for drive conveyance having a movable supporting member furnished with mobile (drive type) weirs for the use in the horizontal continuous polymerization of an HIPE in Example 5, which is a schematic cross section perpendicular to the travel direction of the HIPE.

Then, the HIPE (1) 2321 was continuously applied with a coater at a feed rate of 18.8 kg/min in a width of 1.5 m and a thickness of 50 mm, as illustrated in FIG. 23, on a lower PET film 2305 measuring 1.5 m in width and 50 μm in thickness and conveyed synchronously with a device for drive conveyance 2301 provided at each of the opposite end parts of a horizontally disposed endless belt 2303 having a width of 1.6 m with an endless belt 2311 of moving pattern (drive type) made of a thermoplastic polyester elastomer and measuring 5 mm in width and 50 mm in height as weirs (2311). Subsequently, the resultant layer of the HIPE and an upper PET film 2313 measuring 1.6 m in width and 50 μm in thickness and mounted thereon were passed jointly at a traveling speed of 0.25 m/min through a polymerization furnace measuring 15 m in length and having a hot air circulation unit of 90° C. set for the sake of the upper PET film 2313 and a hot water shower unit of 90° C. set for the sake of the lower steel belt 2303 to polymerize the HIPE for 60 minutes and consequently produce a polymer (5). Since the opposite end parts in the width direction of the polymer (5) that touched the weirs 2311 were cut each in a size of 2 mm on account of the absence of a shake in the width direction, the yield of the product was 99.7%. The product had a thickness of 50±0.3 mm, though the upper side thereof formed small yet discernible waviness and consequently had the smoothness thereof lowered slightly. The results of evaluation are shown in Table 1 below and a schematic cross section illustrating the condition of conveyance of the HIPE using the device for drive conveyance provided with the weirs and taken perpendicularly to the travel direction of the HIPE is shown in FIG. 23.

Comparative Example 1

An HIPE (1) was produced by following the procedure of Example 1.

Figure 24:
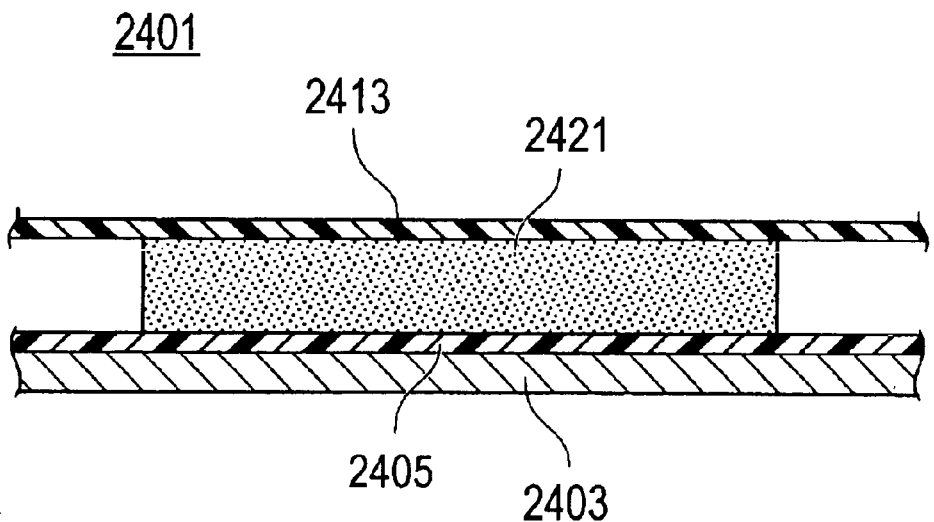
FIG. 24 is a schematic diagram illustrating a typical embodiment of the device for drive conveyance having a movable supporting member furnished with no weirs for the use in the horizontal continuous polymerization of an HIPE in Comparative Example 1, which is a schematic cross section perpendicular to the travel direction of the HIPE.

Then, the HIPE (1) 2421 was continuously applied with a coater at a feed rate of 1.9 kg/min in a width of 1.5 m and a thickness of 5 mm, as illustrated in FIG. 24, on a lower PET film 2405 measuring 1.6 m in width and 50 μm in thickness and conveyed synchronously with a horizontally disposed endless steel belt 903 having a thickness of 1.6 m and adopted as a device for drive conveyance 2401. Subsequently, the resultant layer of the HIPE and an upper PET film 2413 measuring 1.6 m in width and 50 μm in thickness and mounted thereon were passed jointly at a traveling speed of 0.25 m/min through a polymerization furnace measuring 15 m in length and having a hot air circulation unit of 90° C. set for the sake of the upper PET film 2413 and a hot water shower unit of 90° C. set for the sake of the lower steel belt 2403 to polymerize the HIPE for 60 minutes and consequently produce a polymer (1) for comparison. Since the opposite end parts in the width direction were not provided with such weirs as gaskets, the portions approximating closely to the opposite end parts were found to tend to escape polymerization and were found to suffer decline of accuracy of thickness. The yield of the product was 93.3% because the opposite end parts in the width direction of the polymer (1) for comparison were each cut in a size of 10 mm. The formed polymer had a thickness of 5±0.5 mm. The results of evaluation are shown in Table 1 below and a schematic cross section illustrating the condition of conveyance of the HIPE using the device for drive conveyance provided with no weirs mentioned above and taken perpendicularly to the travel direction of the HIPE is shown in FIG. 24.

Example 6

An HIPE (1) was produced by following the procedure of Example 1.

Figure 25:
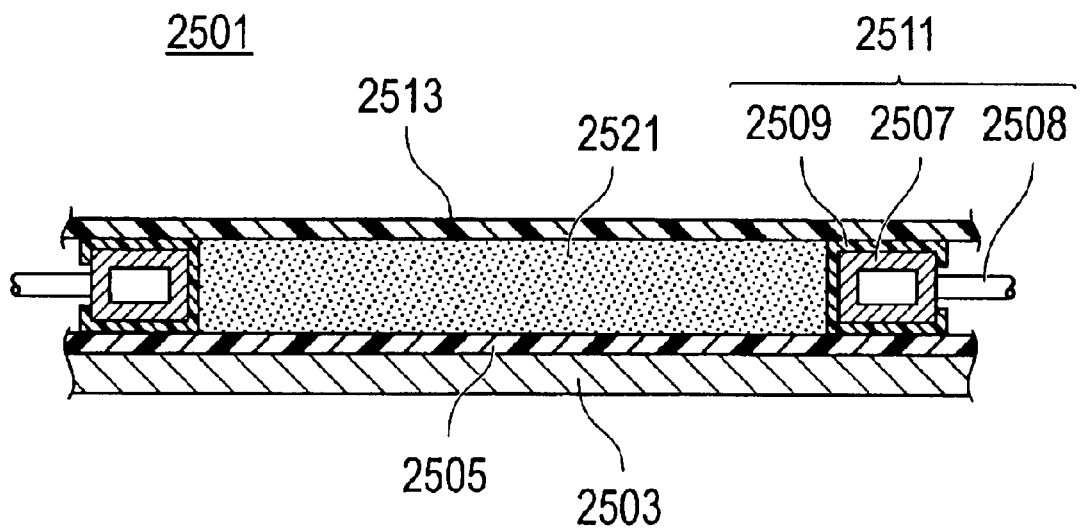
FIG. 25 is a schematic diagram illustrating a typical embodiment of the device for drive conveyance having a movable supporting member furnished with weirs of stationary pattern having a supporting rod for preventing shaking fixed on the outer side for the use in the horizontal continuous polymerization of an HIPE in Example 6, which is a schematic cross section perpendicular to the travel direction of the HIPE.

Then, the HIPE 2521 was continuously applied with a coater at a feed rate of 7.5 kg/min in a width of 1.5 m and a thickness of 20 mm on a lower PET film 2505 of a device for drive conveyance 2501 having a width of 1.5 m and provided at each of the opposite end parts on a horizontally disposed endless steel belt 2503 having a width of 1.6 m and the lower PET film 2505 measuring 1.6 m in width and 50 μm and conveyed synchronously with the belt 2503, as illustrated in FIG. 25, with a gasket 2501 obtained by coating an angular pipe 2507 of stainless steel measuring 30 mm in width and 19.6 mm in height with a fluorine resin PTFE 2509 to a thickness of 0.2 mm and fixing on the outer side of the coated pipe a supporting rod 2508 for preventing shaking (the supporting rod was intended to connect the gasket to the lateral inner wall of the polymerization furnace, the method for this connection is not shown in the diagram) and adopted as weirs 2511 of stationary pattern. Subsequently, the resultant layer of the HIPE and an upper PET film 2513 measuring 1.6 m in width and 50 μm in thickness and mounted thereon were passed jointly at a traveling speed of 0.25 m/min through a polymerization furnace measuring 15 m in length and having a hot air circulation unit of 90° C. set for the sake of the upper PET film 2513 and a hot water shower unit of 90° C. set for the sake of the lower steel belt 2503 to polymerize the HIPE for 60 minutes and consequently produce a polymer (6). Since the opposite end parts in the width direction of the polymer (6) that touched the weirs 2311 were cut each in a size of 1 mm on account of the absence of a shake in the width direction and the satisfactory retaining property of the upper film, the yield of the product was 99.8%. The product had a thickness of 20±0.3 mm, though the upper side thereof formed small yet discernible waviness and consequently had the smoothness thereof lowered slightly. The results of evaluation are shown in Table 1 below and a schematic cross section illustrating the condition of conveyance of the HIPE using the device for drive conveyance provided with the weirs mentioned above and taken perpendicularly to the travel direction of the HIPE is shown in FIG. 25.

TABLE 1

| Structure of weir | | Width (upper step) and thickness (lower step) of HIPE | Yield of polymer | Accuracy of thickness of polymer |
|---|---|---|---|---|
| Example 1 | [Stationary pattern] Tube of fluorine resin PFA having outer diameter of 5.0 mm and inside diameter of 3.0 mm and containing a stainless steel wire of 2.0 mm in diameter | 1.5 m 5 mm | 99.6% | 5 ± 0.3 mm |
| Example 2 | [Stationary pattern] Pipe of stainless steel having outer diameter of 4.6 mm and inside diameter of 2.6 mm and coated with a fluorine resin PEFT in thickness of 0.2 mm | 1.5 m 5 mm | 99.6% | 5 ± 0.3 mm |
| Example 3 | [Moving pattern (integral type)] Steel belt of 30 mm in width and 20 mm in height, having a chloroprene rubber layer adhered with epoxy resin | 1.5 m 20 mm | 99.7% | 20 ± 0.3 mm |
| Example 4 | [Moving pattern (integral type)] Steel belt of 30 mm in width and 20 mm in height, having a fluorine resin PEFE layer adhered with epoxy resin; using thin layer PET film | 1.5 m 20 mm | 99.8% | 20 ± 0.3 mm |
| Example 5 | [Moving pattern (drive type)] Endless belt of thermoplastic polyester elastomer of 5 mm in width and 50 mm in height | 1.5 m 50 mm | 99.7% | 50 ± 0.3 mm |
| Comparative Example 1 | No weirs used | 1.5 m 5 mm | 99.3% | 5 ± 0.5 mm |
| Example 6 | [Stationary pattern] Angular pipe pf stainless steel of 30 mm in width and 19.6 mm in height, coated with a fluorine resin PTFE in thickness of 0.2 mm, and provided on the outer side with a supporting rod intended to prevent shaking | 1.5 m 20 mm | 99.8% | 20 ± 0.3 mm |

Example 7

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, two rolls were vertically opposed in a fashion of a pair of nip rollers and a PET film (as an upper side sheet material) was superposed thereon, with the rotation rate of the nip rollers adjusted and synchronized with the feed rate of the movable supporting member. The torque of a film reeling device was adjusted by properly selecting the output of a torque adjusting device so as to avoid impartation of wrinkles in the travel direction (the longer direction of the upper side sheet material) (FIG. 13).

Then, two tension rollers were disposed in a diverging pattern from the proximity of the entrance to a polymerization furnace through the entire interior of the polymerization furnace (FIGS. 6A, B). The formed HIPE was passed at a traveling speed of 0.25 m/min through the polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (7) consequently obtained had a thickness of 5±0.1 mm and showed no sign of discernible waviness on the upper side thereof.

Example 8

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, a PET film (as an upper side sheet material) was superposed on the formed HIPE through the medium of rolls. After the formed HIPE had passed the rolls, the opposite end parts of the upper side sheet material were nipped with a clip tenter (FIG. 9 and FIG. 10). The rails for the chain to which the clip tenter was mounted were diverged relative to the width direction over a distance from about 50 cm to the front of the entrance to a polymerization furnace to about 50 cm inside the polymerization furnace and they were thence laid substantially rectilinearly. The clip tenters which had nipped the upper side sheet material were diverged by following the tracks of the rails and were allowed to exert tensile force in the width direction on the upper side sheet material.

The formed HIPE was passed at a traveling speed of 0.25 m/min through the polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (8) consequently obtained had a thickness of 5±0.1 mm, with the upper side thereof showing small waviness slightly and enjoying comparatively satisfactory smoothness.

Example 9

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, a vinylon film and a PET film (as an upper side sheet material) were superposed on the formed HIPE through the medium of rolls. After the formed HIPE had passed the rolls, the film was set on a pin tenter (FIG. 9 and FIG. 11) and, with the tensile force exerted in the width direction, passed at a traveling speed of 0.25 m/min through a polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (9) consequently obtained had a thickness of 5±0.1 mm, with the upper side thereof showing small waviness slightly and enjoying comparatively satisfactory smoothness.

Example 10

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, a vinylon film and a PET film (as an upper side sheet material) were superposed on the formed HIPE through the medium of rolls. After the formed HIPE had passed the rolls, two tension rollers were disposed in a diverging pattern on the upper side sheet material from the proximity of the entrance to the polymerization furnace through the interior of the polymerization furnace (FIGS. 6A, B). The formed HIPE, with the tension rollers exerting tensile force in the width direction (the shorter direction of the upper side sheet material), was passed at a traveling speed of 0.25 m/min through the polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (10) consequently obtained had a thickness of 5±0.1 mm, with the upper side thereof showing small waviness slightly and enjoying comparatively satisfactory smoothness.

Example 11

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, two rolls were vertically opposed in the fashion of a pair of nip rollers and a PET film (as an upper side sheet material) was superposed thereon, with the rotation rate of the nip rollers adjusted and synchronized with the feed rate of the movable supporting member. The torque of a film reeling device was adjusted by properly selecting the output of a torque adjusting device so as to avoid impartation of wrinkles in the travel direction (the longer direction of the upper side sheet material) (FIG. 13).

Subsequently, the formed HIPE was passed at a traveling speed of 0.25 m/min through a polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (11) consequently obtained had a thickness of 5±0.3 mm, with the upper side thereof showing small waviness slightly and enjoying comparatively satisfactory smoothness.

Comparative Example 2

An HIPE (1) was produced by following the procedure of Example 1.

The resultant HIPE (1) was continuously applied with a coater at a feed rate of 1.9 kg/min in a width of 1.5 m and a thickness of 5 mm onto a PET film (as a lower side sheet material) of a device for drive conveyance using a horizontally disposed endless steel belt having a width of 1.6 m and the PET film fastened to the belt as a movable supporting member and provided in the opposite end parts of the PET film with gaskets (weirs) formed of a tube of a soft vinyl chloride resin having an outer diameter of 5 mm. Then, one roll was used for the impartation of thickness and an upper side PET film (as an upper side sheet material) was superposed on the formed HIPE at the same time. The formed HIPE was passed at a traveling speed of 0.25 m/min through a polymerization furnace measuring 15 m in length and having a hot air circulation furnace set at 90° C. and a hot water shower of 90° C. set for the sake of the lower side steel belt to polymerize the HIPE for 60 minutes. The porous cross-linked polymer (2) for comparison consequently obtained had a concave cross section having an average thickness of 5±0.3 mm, a thickness of 5±0.4 mm in the central part and a thickness of 5±0.2 mm in the end parts. The surface of this polymer showed waviness which seemed to have originated in wrinkles in the film.

Comparative Example 3

(Case of Omitting the Regulation of Thickness; the HIPE Supplied Through a Pipe Line was Sprayed Directly on Movable Supporting Member from the Pipe.)

An HIPE (1) was produced by following the procedure of Example 1. At this time, the viscosity at a shear rate of 1 [s$^{-1}$] was 4.2 (Pa.s), that at 100 [s$^{-1}$] was 0.1 (Pa.s), and the ratio of $\eta_1/\eta_{100}$ was 42.

Figure 26A:
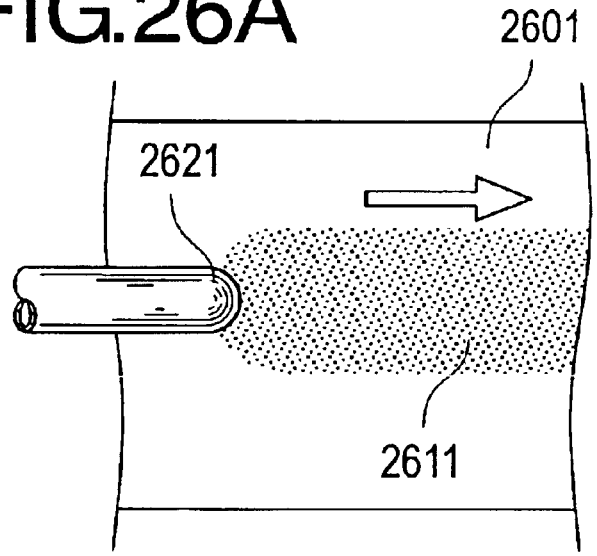
FIG. 26(A) is a plan view.
Figure 26B:
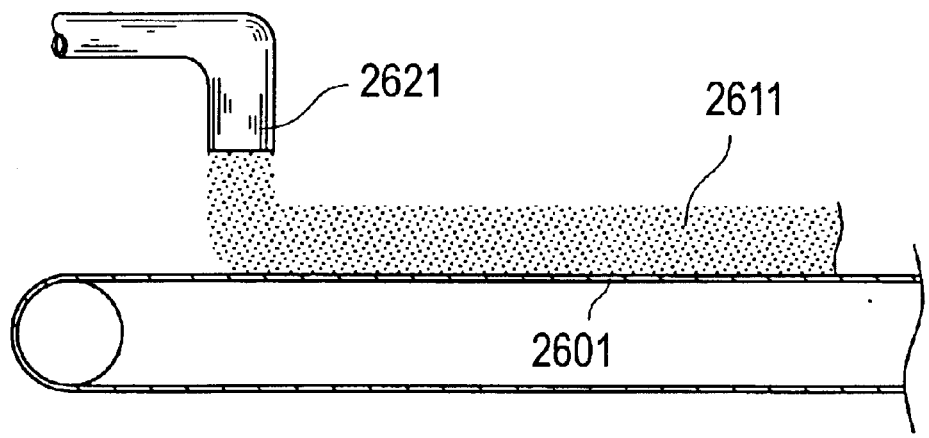
FIG. 26(B) is a side view.
Figure 26C:
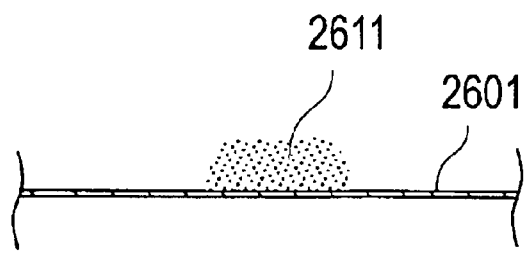
FIG. 26(C) is a cross section after the formation of the HIPE.

Then, the resultant HIPE (1) 2611 was continuously supplied at a feed rate of about 1.9 kg/min (at this feed rate, the HIPE was supplied at a traveling speed of 0.25 m/min in an amount enough to obtain a polymer measuring 1.5 m in width and 5 mm in thickness) through a pipe line 2621 laid above the central part of a movable supporting member 2601 comprising a horizontally disposed endless steel belt of SUS 316 having an effective width of 1.5 m and a PET film, as illustrated in FIG. 26, onto the movable supporting member 2601 and the upper side of the HIPE (1) 2611 was meanwhile swept with nitrogen gas so as to be kept enveloped with a nitrogen atmosphere. An observation made at this point revealed, as illustrated in FIG. 26, that the HIPE, on reaching the top of the supporting member, assumed a state of zero shear, i.e., an apparently solid state, and showed virtually no sign of spread in the width direction (namely, the impartation of shape, the self leveling).

Subsequently, the resultant formed HIPE was passed at a traveling speed of 0.25 m/min through a polymerization furnace measuring 15 m in length and having a nitrogen gas circulation unit of 90° C. set for the sake of the upper side of the HIPE (1) and a hot water shower of 90° C. set for the sake of the lower belt made of SUS 316 to polymerize the HIPE for 60 minutes. The porous cross-linked polymer (3) for comparison consequently obtained showed virtually no sign of forming a flat surface and assumed a semi-elliptic cross section measuring about 300 mm in width (see FIG. 26(C)) and differed immensely from an expected polymer measuring 1.5 m in width and 5 mm in thickness. Specifically, the polymer (3) for comparison had an accuracy of thickness of 5±2 mm because of the absence of regulation of thickness after the supply of the HIPE.

Example 12

(Case of Effecting the Impartation of Shape and the Regulation of Thickness by Means of one Knife Coater.)

An HIPE (1) was produced by following the procedure of Example 1. At this time, the viscosity at a shear rate of 1 [s$^{-1}$] was 4.2 (Pa.s), that at 100 [s$^{-1}$] was 0.1 (Pa.s), and the ratio of $\eta_1/\eta_{100}$ was 42.

Figure 27A:
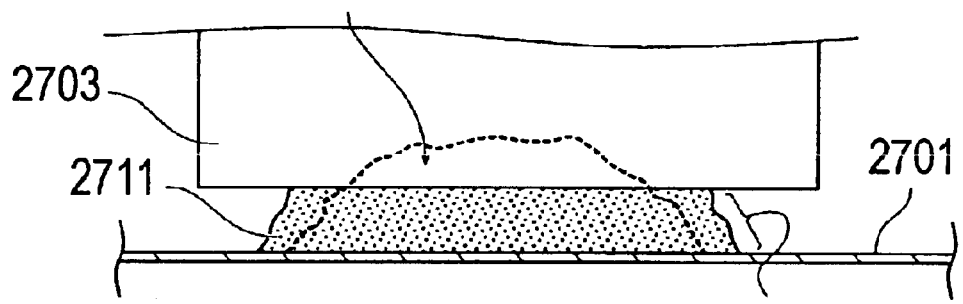
FIG. 27(A) is a cross section subsequently to the regulation of thickness of the HIPE and FIG. 27(B) is a side view.
Figure 27B:
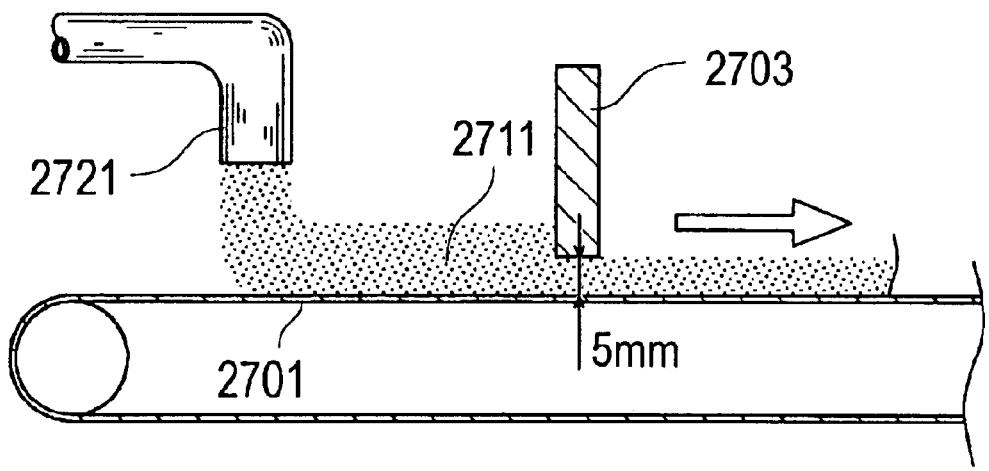

Then, the resultant HIPE (1) 2711 was continuously supplied at a feed rate of about 1.9 kg/min (at this feed rate, the HIPE was supplied at a traveling speed of 0.25 m/min in an amount enough to obtain a polymer measuring 1.5 m in width and 5 mm in thickness) through a pipe line 2721 laid above the central part of a movable supporting member 2701 comprising a horizontally disposed endless steel belt of SUS 316 having an effective width of 1.5 m and a PET film, as illustrated in FIG. 27, onto the movable supporting member 2701. Immediately thereafter, the formed HIPE was subjected to the regulation of thickness by being passed across one knife coater 2703 measuring 1.5 min width and 1 mm in thickness and disposed at a right angle relative to the travel direction of the movable supporting member 2701 so as to form a distance of 5 mm between the upper side of the movable supporting member 2701 and the lower end part of the coater and the upper part of the HIPE (1) 2711 was meanwhile swept with nitrogen gas so as to be kept enveloped with a nitrogen atmosphere.

Subsequently, the resultant formed HIPE was passed at a traveling speed of 0.25 m/min through a polymerization furnace measuring 15 m in length and having a nitrogen gas circulation unit of 90° C. set for the sake of the upper side of the HIPE and a hot water shower of 90° C. set for the sake of the lower belt made of SUS 316 to polymerize the HIPE for 60 minutes. The upper side of the produced polymer (12) showed waviness and a discernible decline of smoothness of surface. The accuracy of thickness at the part of the polymer which had touched the coater was 5±0.3 mm. In FIG. 27(A), a dash line represents the accuracy of thickness obtained in Comparative Example 3 and a solid line represents the accuracy of thickness obtained of the polymer of the present example after the passage across the knife coater, schematically indicating that the accuracy of thickness of the coater-touched part could be remarkably improved by being passed across the knife coater as compared with the sample of Comparative Example 3. Since the part of the polymer that had not touched the coater (the opposite end parts) was given no regulation of thickness, the opposite end parts of the polymer were cut each in a size of 10 mm. Thus, the yield of the product was 98.6%.

Example 13

(Case of Further Exalting Accuracy of Thickness by using a Plurality (2) of Knife Coaters.)

Figure 28A:
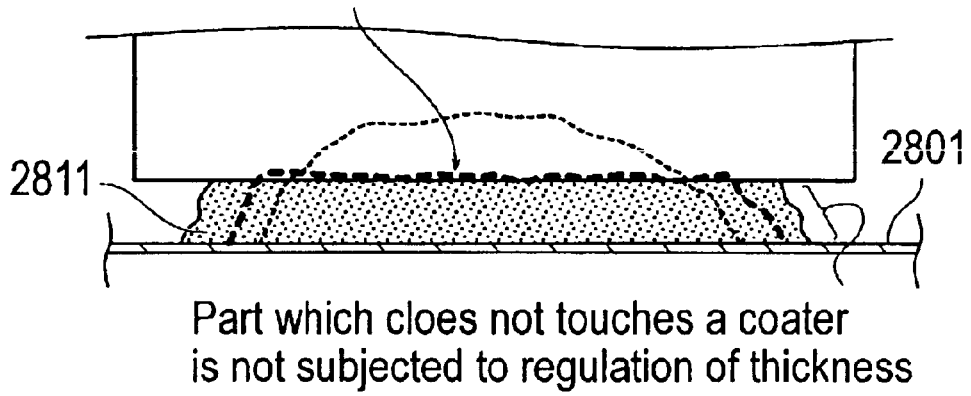
Figure 28B:
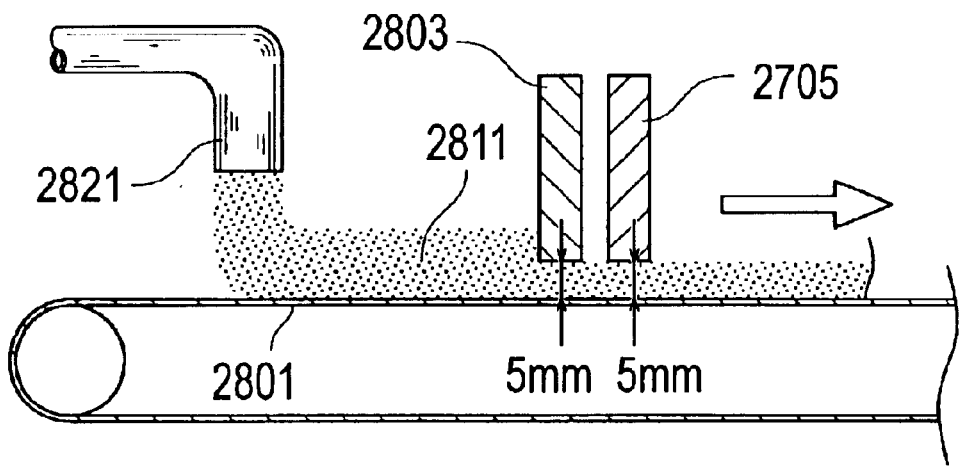

An HIPE (1) 2811 produced in the same manner as in Example 1 was continuously supplied onto a movable supporting member 2801 through a pipe line 2821 laid above the central part of the movable supporting member 2801 as illustrated in FIG. 28 by following the procedure of Example 12. Immediately thereafter, the supplied HIPE was subjected to the regulation of thickness by being passed successively across two knife coaters 2803, 2805 each measuring 1.5 m in width and 1 mm in thickness and disposed at an interval of 5 cm and at a right angle relative to the advance direction of the movable supporting member 2801 so as to form a distance of 5 mm between the upper side of the movable supporting member 2801 and the lower end part of each of the coaters to polymerize the HIPE in the same manner as in Example 12. The upper side of the produced polymer (13) showed waviness and a discernible decline of smoothness of surface. The accuracy of thickness at the part of the polymer which had touched the coaters was 5±0.2 mm. In FIG. 28(A), a dash line represents the accuracy of thickness obtained in Comparative Example 3, a dash line (thick line) represents the accuracy of thickness obtained after the passage across the first knife coater, and a solid line represents the accuracy of thickness obtained after passage across the second knife, schematically indicating that the accuracy of thickness of the coater-touched part could be remarkably improved by being passed successively across the knife coaters as compared with the sample of Comparative Example 3. Since the part of the polymer that had not touched the coater was given no regulation of thickness, the opposite end parts of the polymer were cut each in a size of 5 mm. Thus, the yield of the product was 99.3%.

Example 14

(Case of Using T Die)

An HIPE (1) was produced by following the procedure of Example 1.

The HIPE (1) 2911 was continuously supplied at a feed rate of about 0.63 kg/min through a T die 2921 having a lip width of 500 mm and a lip interval of 1 mm and disposed at a right angle relative to the advance direction of a movable supporting member 2901 comprising a stainless steel belt of SUS 316 having an effective width of 500 mm and a PET film onto the movable supporting member 2901 as illustrated in FIGS. 29(A1) and (A2) and the upper part of the HIPE was meanwhile swept with a nitrogen gas so as to be enveloped with a nitrogen atmosphere.

Then, the supplied HIPE was passed at a traveling speed of 0.25 m/min through a polymerizing furnace measuring 15 m in length and having a nitrogen gas circulation unit of 90° C. set for the sake of the upper part and a hot water shower of 90° C. set for the sake of a lower belt of SUS 316 to polymerize the HIPE for 60 minutes. The polymer (14) consequently obtained, unlike the polymer obtained in Comparative Example 3, assumed a flat surface owing to the spreading action and the shape imparting action produced by the T die in the width direction. Though the upper side showed waviness and a discernible decline of smoothness, the accuracy of thickness was 5±0.8 mm. The width of the polymer (14) increased so much as to equal the effective width, 500 mm, of the supporting member. Since the opposite end parts of the polymer (14) were cut each in a size of 5 mm, the yield of the product was 98.0%. As noted from the comparison of FIG. 29(B2) illustrating the appearance of Example 12 with FIG. 29(A2) illustrating the appearance of the present Example 14, the coaters were effective in regulating the thickness of the part of the HIPE allowed to contact them and not very effective in widening the HIPE in the width direction.

Example 15

(Case of Using T Die and Knife Coater in Combination)

An HIPE (1) was produced by following the procedure of Example 1.

Figure 30A:
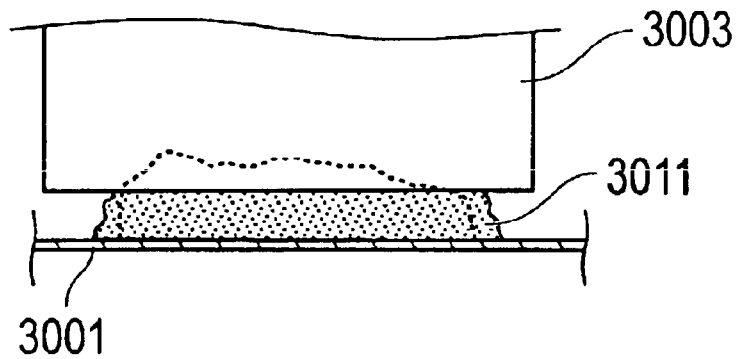
FIG. 30(A) is a cross section subsequently to the regulation of thickness of the HIPE and FIG. 30(B) is a plan view.
Figure 30B:
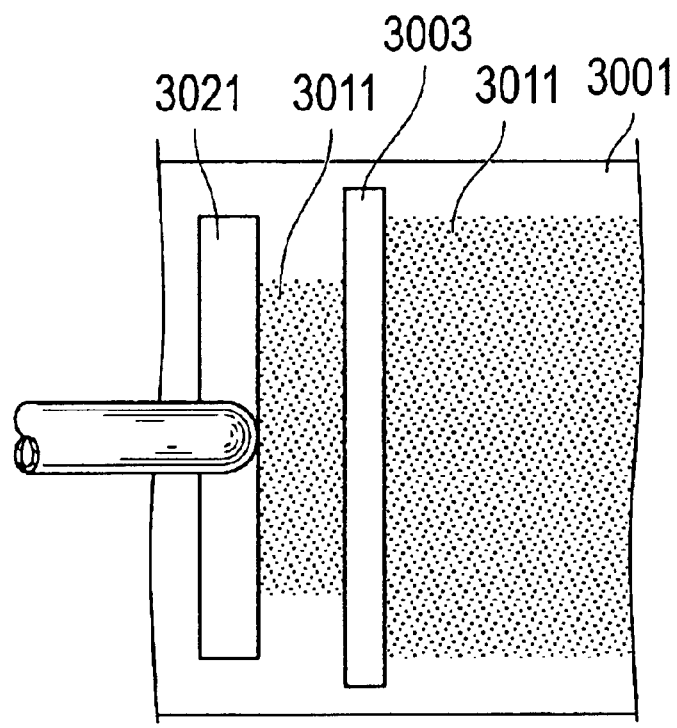

The HIPE (1) 3011 was continuously supplied at a feed rate of about 0.63 kg/min through a T die 3021 having a lip width of 500 mm and a lip interval of 1 mm and disposed at a right angle relative to the travel direction of a movable supporting member 3001 comprising a stainless steel belt of SUS 316 having an effective width of 500 mm and a PET film onto the movable supporting member 3001 as illustrated in FIG. 30. Immediately thereafter, the supplied HIPE was subjected to the regulation of thickness by being passed across one knife coater 3003 measuring 0.5 m in width and 1 mm in thickness and disposed at a right angle relative to the advance direction of the movable supporting member 3001 so as to form a distance of 5 mm between the upper side of the movable supporting member 3001 and the lower end part of the coater, and the upper part of the HIPE was swept meanwhile with a nitrogen gas so as to be enveloped with a nitrogen atmosphere.

Then, the HIPE was passed at a traveling speed of 0.25 m/min through a polymerizing furnace measuring 15 m in length and having a nitrogen gas circulation unit of 90° C. set for the sake of the upper part and a hot water shower of 90° C. set for the sake of a lower belt of SUS 316 to polymerize the HIPE for 60 minutes. The resultant polymer (15) had the surface thereof smoothed by the spreading action of the T die in the width direction and the thickness thereof regulated by the coater. Though the upper side of the polymer (15) showed waviness and a discernible decline of smoothness, the accuracy of thickness was 5±0.3 mm. The polymer (15) had the thickness thereof increase so much as to equal the effective width, 500 mm, of the supporting member. Since the opposite end parts of the polymer (15) were cut each in a size of 5 mm, the yield of the product was 98.0%. The die (T die) used in Examples 14 and 15 was effective in spreading the polymer in the width direction but was insufficient in regulating the polymer in thickness as represented by the dash line in FIG. 30(A). On the other hand, the combined use of a die and a coater in the present example was confirmed to improve both the accuracy of thickness and the spreading property in the width direction as represented by the solid line.

Example 16

(Case of Using T Die and a Plurality (2) of Knife Coaters in Combination)

An HIPE (1) was produced by following the procedure of Example 1.

Figure 31A:
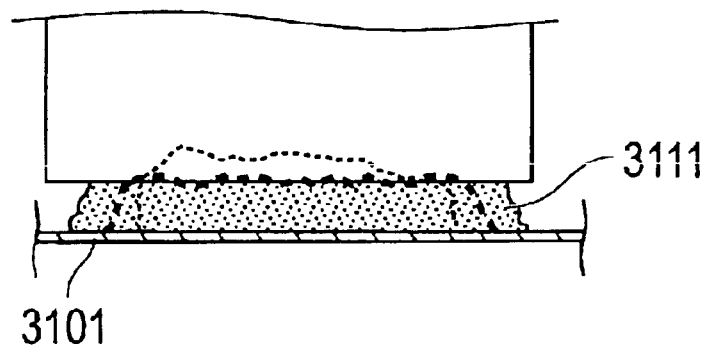
FIG. 31(A) is a cross section subsequently to the regulation of thickness of the HIPE and FIG. 31(B) is a plan view.
Figure 31B:
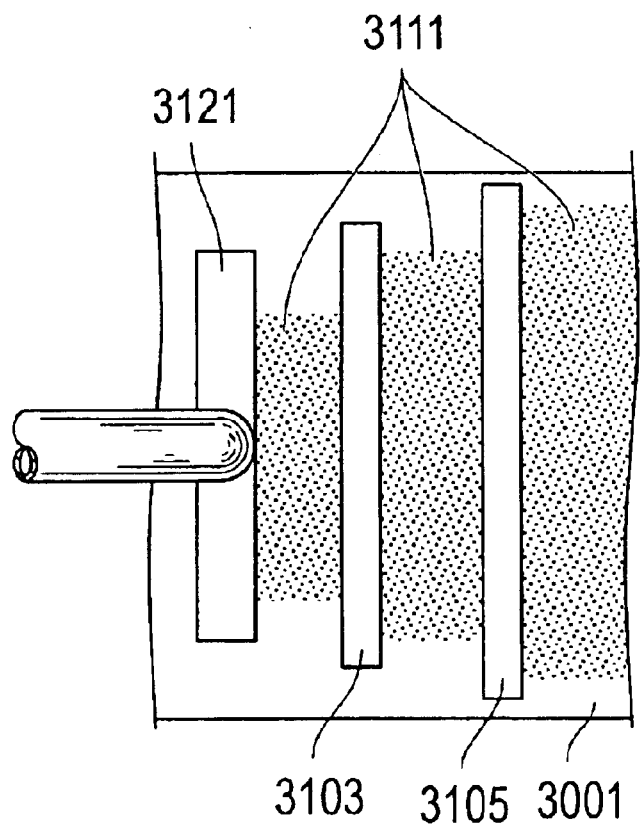

The HIPE (1) 3111 was continuously supplied at a feed rate of about 0.63 kg/min through a T die 3121 having a lip width of 500 mm and a lip interval of 1 mm and disposed at a right angle relative to the travel direction of a movable supporting member 3101 comprising a stainless steel belt of SUS 316 having an effective width of 500 mm and a PET film onto the movable supporting member 3101 as illustrated in FIG. 31. Immediately thereafter, the supplied HIPE was subjected to the regulation of thickness by being passed successively across two knife coaters 3103, 3105 each measuring 1.5 m in width and 1 mm in thickness and disposed at an interval of 5 cm and at a right angle relative to the advance direction of the movable supporting member 3101 so as to form a distance of 5 mm between the upper side of the movable supporting member 3101 and the lower end part of each of the coaters to polymerize the HIPE in the same manner as in Example 15. Though the upper surface of the resultant polymer (16) showed waviness and a discernible decline of smoothness, the accuracy of thickness thereof was 5±0.2 mm. The width of the polymer (16) increased so much as to equal the effective width, 500 mm, of the supporting member 3101. Since the opposite end parts of the polymer (16) were each cut in a size of 3 mm, the yield of the product was 98.8%. As schematically shown in FIG. 31(A), a dash line represents a cross section of the polymer before being passed across the first knife coater (i.e., Example 14), a dash line (thick line) represents a cross section of the polymer after being passed across the first knife coater (i.e., Example 15), and a solid line represents a cross section of the polymer after being passed across the second knife coater. These results may well be regarded as indicating that the successive passage of the polymer across the knife coaters can improve the part of the polymer that touched the coaters both in the accuracy of thickness and the spreading property in the width direction.

Example 17

(Case of Forming a Film Layer as Air Intercepting Layer in Examples 12 through 16)

In Example 12 to 16, the upper part of the formed HIPE was swept with a nitrogen gas to be enveloped with an inert atmosphere and the formed HIPE was thermally polymerized under the nitrogen atmosphere. In the present example, after the regulation of thickness by using a coater, a T die, or the combined use thereof as in Examples 12 to 16, the upper side of the formed HIPE was wholly covered by placing a PET film at the same speed as the movable supporting member for the purpose of intercepting an oxygen from an ambient air. Though the resultant polymers had their upper sides show waviness and a slight decline of smoothness, they showed no change in the accuracy of thickness. The results indicate that the formation of an inert atmosphere with an nitrogen gas is not necessary by using the PET film.

Example 18

(Case of Covering the Upper Side of the HIPE with a Sheet Material while Continuously Effecting the Regulation of Thickness with a Rotary Roll)

An HIPE (1) was produced by following the procedure of Example 1.

Figure 32:
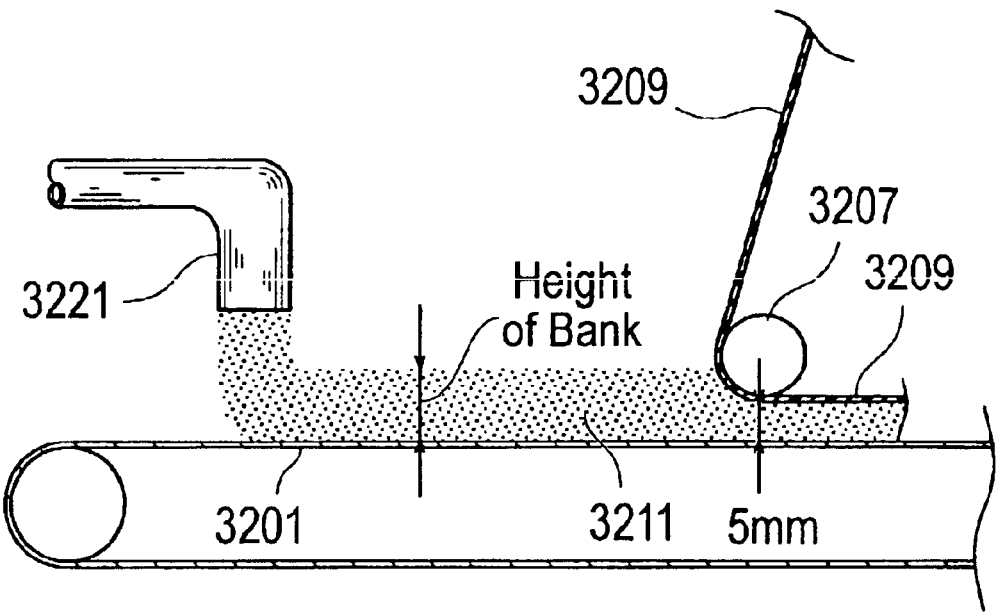
FIG. 32 is a schematic side view illustrating a polymerization apparatus used in Example 18, particularly the manner of performing operations from supply of an HIPE through regulation of thickness while covering the upper side of the HIPE with a sheet material by continuously effecting the regulation of thickness by means of rolls in motion.

The HIPE (1) 3211 was continuously supplied at a feed rate of about 1.9 kg/min through a pipe line (3221) laid above the central part of a movable supporting member 3201 comprising a horizontally disposed endless steel belt of SUS 316 having an effective width of 1.5 m and a PET film onto the movable supporting member 3201 as illustrated in FIG. 32. Immediately thereafter, the supplied HIPE was subjected to the regulation of thickness by being passed under a rotary roll 3207 measuring 1.5 m in width and 100 mm in outer diameter and disposed at a right angle relative to the advance direction of the movable supporting member 3201 so as to retain a distance of 5 mm between the upper side of the movable supporting member and the lower end part of the roll while the rotary roll 3207 accompanied a PET film 3209 and the upper side of the HIPE was meanwhile covered wholly with the PET film 3209.

The supplied HIPE was passed at a traveling speed of 0.25 m/min through a polymerizing furnace measuring 15 m in length and having a hot air circulation unit of 90° C. set for the sake of the upper PET film and a hot water shower unit of 90° C. set for the sake of the lower belt made of SUS 316 to polymerize the HIPE for 60 minutes. Though the upper side of the resultant polymer (18) showed minute waviness and a discernible decline of smoothness, the accuracy of thickness of the part of the polymer which touched the rotary roll was 5±0.3 mm. Since the part of the polymer (18) which escaped touching the rotary roll was given no regulation of thickness, the opposite end parts of the polymer were cut each in a size of 10 mm. Thus, the yield of the product was 98.6%. Example 19 (Case of additionally using T die in the experiment of Example 18)

An HIPE (1) was produced by following the procedure of Example 1.

Figure 33:
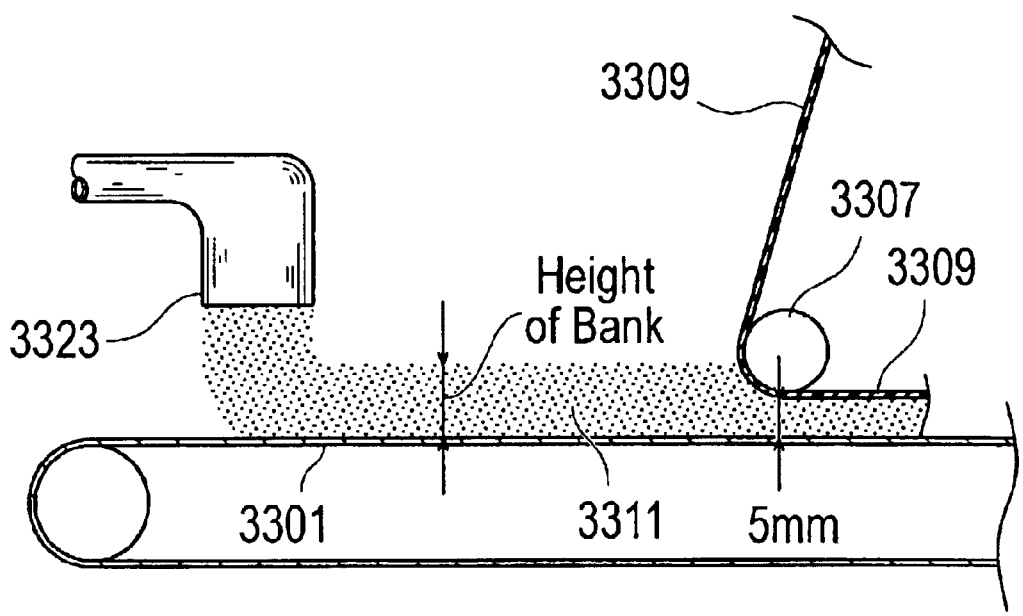
FIG. 33 is a schematic side view illustrating a polymerization apparatus used in Example 19, particularly the manner of performing operations from supply of an HIPE through regulation of thickness while covering the upper side of the HIPE with a sheet material by continuously effecting the regulation of thickness by means of rolls in motion in combination with a T die.

The HIPE (1) 3311 was continuously supplied at a feed rate of about 0.63 kg/min through a T die having a lip width of 500 mm and a lip interval of 1 mm and disposed at a right angle relative to the advance direction of a movable supporting member 3301 comprising a steel belt of SUS 316 having an effective width of 500 mm and a PET film onto the movable supporting member 3301 as illustrated in FIG. 33. Immediately thereafter, the supplied HIPE was subjected to the regulation of thickness by being passed under a rotary roll 3307 measuring 0.5 m in width and 100 mm in outer diameter and disposed at a right angle relative to the advance direction of a movable supporting member 3301 so as to retain a distance of 5 mm between the upper side of the movable supporting member 3301 and the lower end part of the roll while the rotary roll 3307 accompanied a PET film 3309 and the upper side of the HIPE was meanwhile covered wholly with the PET film 3309.

The HIPE was passed at a traveling speed of 0.25 m/min through a polymerizing furnace measuring 15 m in length and having a hot air circulation unit of 90° C. set for the sake of the upper PET film and a hot water shower unit of 90° C. set for the sake of the lower belt made of SUS 316 to polymerize the HIPE for 60 minutes. Though the upper side of the resultant polymer (19) showed minute waviness and a discernible decline of smoothness, the accuracy of thickness of the part of the polymer which touched the rotary roll was 5±0.3 mm. The polymer (19) had the width thereof increase so much as to equal the effective width, 500 mm, of the supporting member. Since the opposite end parts of the polymer (19) were each cut in a size of 5 mm, the yield of the product was 98.0%.

Example 20

(Case of Additionally Using a Knife Coater in the Experiment of Example 19)

An experiment was performed by following the procedure of Example 19 while placing in front of a rotary roll 3405 one knife coater 3403 measuring 0.5 m in width and 1 mm in thickness and disposed so as to retain a distance of 5 mm between the upper side of a movable supporting member 3401 and the lower end part of the coater as illustrated in FIG. 34. Though the upper side of the resultant polymer (20) showed minute waviness and a slight decline of smoothness, the accuracy of thickness was 5±0.2 mm in the part of the polymer which touched the coater and the rotary roll. Since the opposite end parts of the polymer (20) were each cut in a size of 3 mm, the yield of the product was 98.8%.

Example 21

(Regulation of Thickness after Covering with Film)

After the regulation of thickness with a rotary roll 3507 accompanying a PET film 3509 effected in the same manner as in Example 20, an experiment was performed by following the procedure of Example 20 while disposing parallelly to a movable supporting member 3501 a stationary parallel flat plate (thickness-regulating plate) 3510 measuring twice as large in length as the interval (distance) between the upper side of the movable supporting member 3501 and the lower end part of a rotary roll 3507 (the width equaling the effective width, 500 mm, of the supporting member) and laid so as to retain the same height as that mentioned above. Though the upper side of the resultant polymer (21) showed minute waviness and a slight decline of smoothness, the accuracy of thickness was improved by 0.1 mm over that of Example 20.

Example 22

(Case of Using Weir)

Figure 36A:
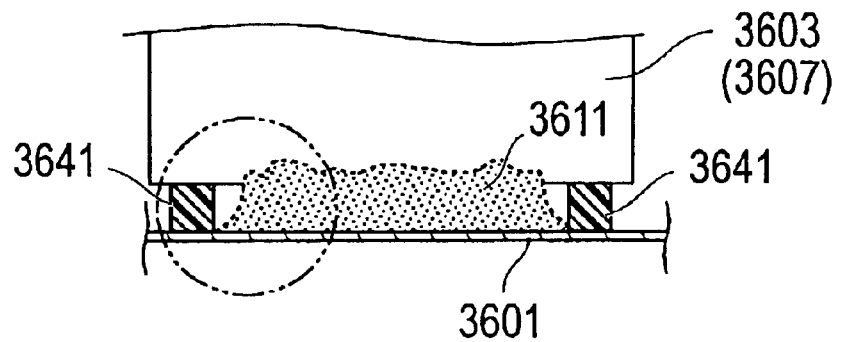
FIG. 36(A) is a cross section illustrating the regulation of thickness of the HIPE in process.
Figure 36B:
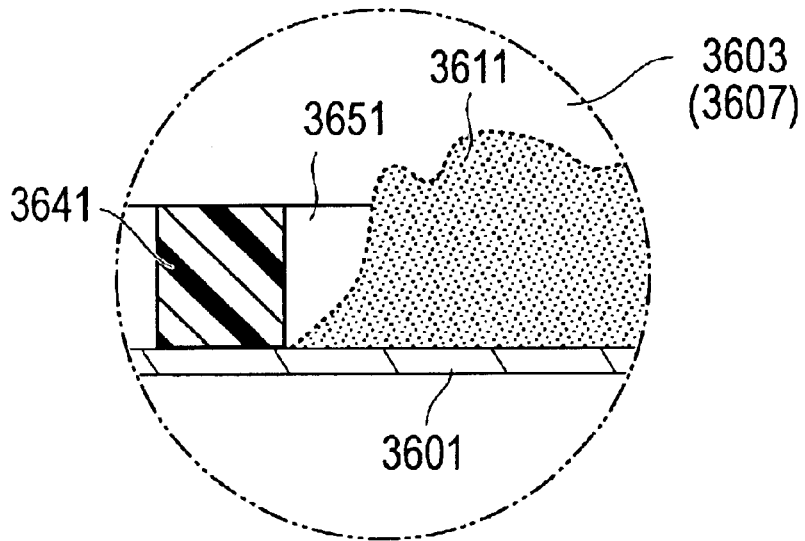
FIG. 36(B) is a cross section illustrating the proximity of the weirs of FIG. 36(A) in a magnified scale.
Figure 36C:
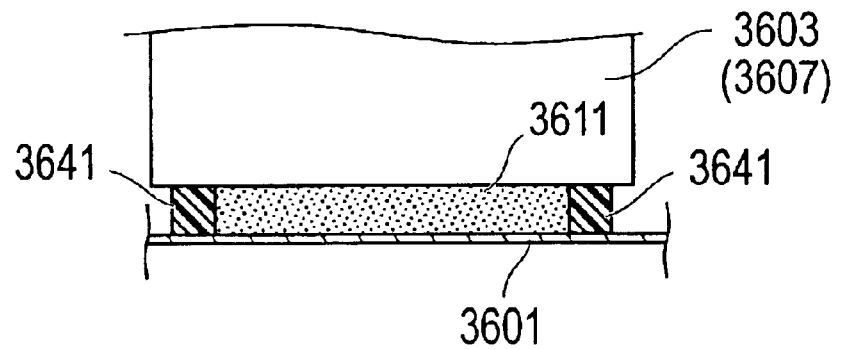
FIG. 36(C) is a cross section subsequently to the regulation of thickness of the HIPE and the spreading of the HIPE till contact with the weirs.

In Examples 12 to 21, only the parts of the relevant samples that touched the coater, the roll, or the cimbined use thereof in these experiments had their thickness regulated and the parts (opposite end parts) that did not touch such an implement did not had their thickness regulated. In the present Example 22, therefore, by disposing at the opposite end parts such weirs 3641 as having a height equal to the distance between the lower end part of a coater 3603 or a rotary roll (3607) and the upper side of a movable supporting member 3601 as illustrated in FIG. 36, the HIPE could be spread in the width direction till it filled a space formed by the movable supporting member and the weirs. On other words, an HIPE (1) 3611 flowed into and filled gaps 3651 between the weirs 3641 and the opposite end parts of the coater 3603 or the rotary roll (3607) as explained with reference to FIG. 36(B), with the result that the parts which possibly failed to touch the implement were eliminated (FIG. 36(C)). Since the opposite end parts which had touched the weirs were each cut in a size of 1 mm, the yield of the product of 0.5 m in width was 99.6% and that of the product of 1.5 m in width was 99.8%.

Example 23

(Case of Regulating Height of Bank)

In Examples 12 to 22, the regulation of thickness solely relied on a knife coater or a rotary roll. By continuously monitoring a height of an HIPE reservoir (otherwise referred to as "bank") formed in front of the knife coater or the rotary roll from the upper side of the movable supporting member by using a contact type (electrostatic capacity type, float type, and the like) or non-contact type (laser type, ultrasonic type, and the like) measuring device, controlling the amount of HIPE to be supplied so as to regulate the height of the bank at a fixed level, the inflow of the excess HIPE due to the HIPE head at a constant magnitude could be fixed and the regulating effects by the coater or rotary roll could be improved.

More specifically, in the apparatus of Example 19 (FIG. 33), for example, when the height of the HIPE bank formed in front of a rotary roll 3307 accompanying a PET film 3309 was continuously monitored with a laser displacement meter, the numerical value consequently obtained was injected into a PID controller, and the aperture of a control valve (not shown) placed directly in front of an HIPE supply part (T die) 3323 was controlled so as to fix the height constantly at 7 mm, the resultant polymer had the accuracy of thickness improve by ±0.1 mm over the polymer obtained in Example 19, though the upper side thereof showed minute waviness and a slight decline of smoothness.

Example 24

Figure 37:
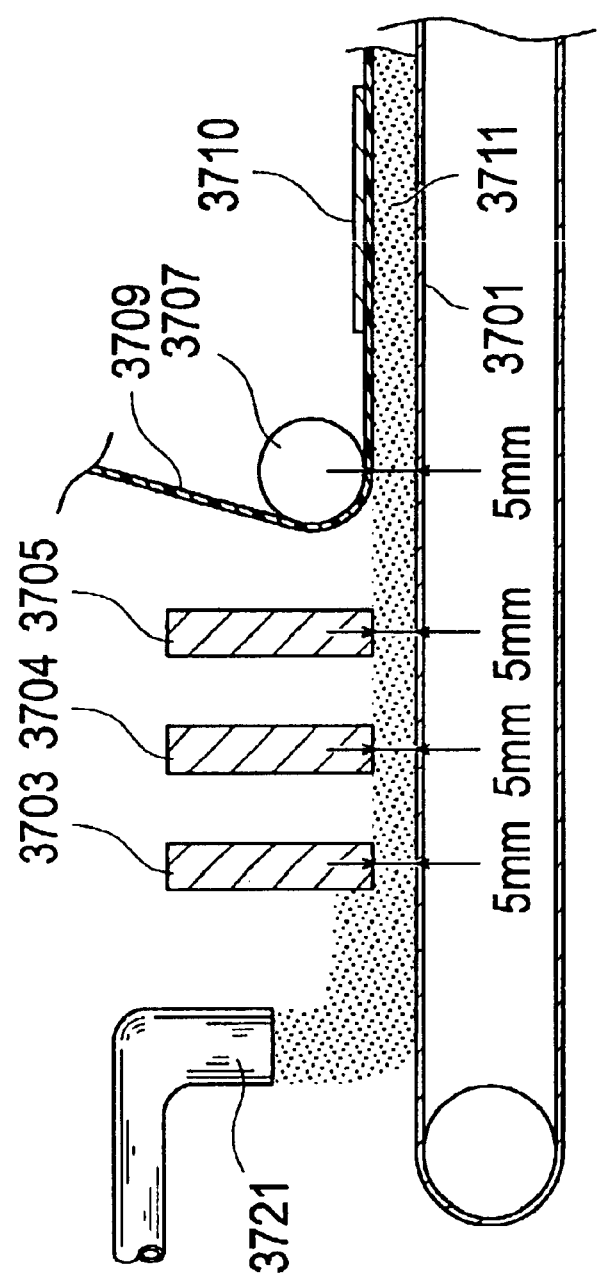
FIG. 37 is a schematic side view illustrating a polymerization apparatus used in Example 24, particularly the manner of performing operations from supply of an HIPE through regulation of thickness by the use of three knife coaters, then continuously effecting the regulation of thickness with rolls in motion and meantime covering the upper side of the HIPE with a sheet material (a film), and subsequently performing operations from supply of the HIPE through regulation of thickness by using a thickness regulating plate in combination.

An HIPE (1) 3711 to be produced in the same manner as in Example 1 was continuously supplied in the same manner as in Example 12 onto a movable supporting member 3701 through a pipe line 3721 laid above the central part of the movable supporting member 3701 as illustrated in FIG. 37. Immediately thereafter, the HIPE was subjected to the regulation of thickness by being passed successively across three knife coaters 3703, 3704, and 3705 each measuring 1.5 m in width and 1 mm in thickness and disposed at an interval of 5 cm between each the coaters and at a right angle relative to the advance direction of a movable supporting member 3701 so as to retain a distance of 5 mm between the upper side of the movable supporting member 3701 and the lower end part of each of the coaters. Subsequently, it was further subjected to the continued regulation of thickness by being passed under a rotary roll 3707 accompanying a PET film 3709 and disposed so as to retain a distance of 5 mm between the upper side of the movable supporting member 3701 and the lower end part of the roll and the upper side of the HIPE was meanwhile covered wholly with the PET film 3709. Then, a stationary parallel flat plate (thickness-regulating plate) 3710 measuring twice as large in length as the interval (distance) between the upper side of the movable supporting member 3701 and the lower end part of a rotary roll 3707 (the width equaling the effective width, 1.5 m, of the supporting member) and laid so as to retain the same height as that mentioned above, to polymerize the HIPE in the same manner as in Example 12. Though the upper side of the resultant polymer (24) showed waviness and a slight decline of smoothness, the accuracy of thickness was 5±0.1 mm, indicating further improvement by 0.1 mm over that of Example 13. Since the part of the polymer which did not touch the thickness-regulating plate was not given the regulation of thickness, the opposite end parts of the polymer were each cut in a size of 3 mm. Thus, the yield of the product was 98.8%.

Example 25

Figure 38A:
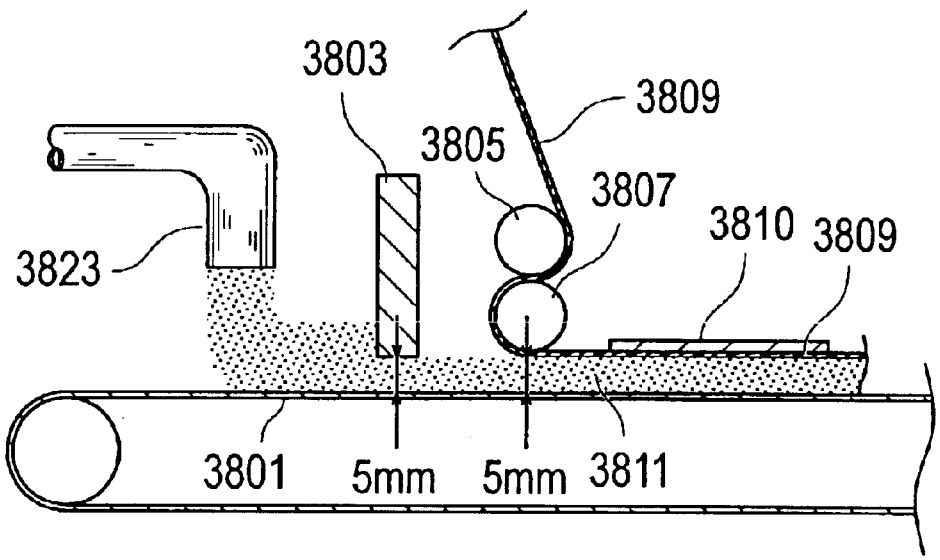
FIG. 38(A) is a schematic side view illustrating a polymerization apparatus used in Example 25, particularly the manner of performing operations from supply of an HIPE through regulation of thickness by using a T die and two knife coaters for effecting the operations from the supply of the HIPE through the regulation of thickness and then continuously covering the upper side of the HIPE with a sheet material (a film) and meantime continuously improving the smoothness of surface and the accuracy of thickness in the travel direction by the use of nip rolls and thereafter putting a thickness regulating plate to simultaneous use.
Figure 38C:
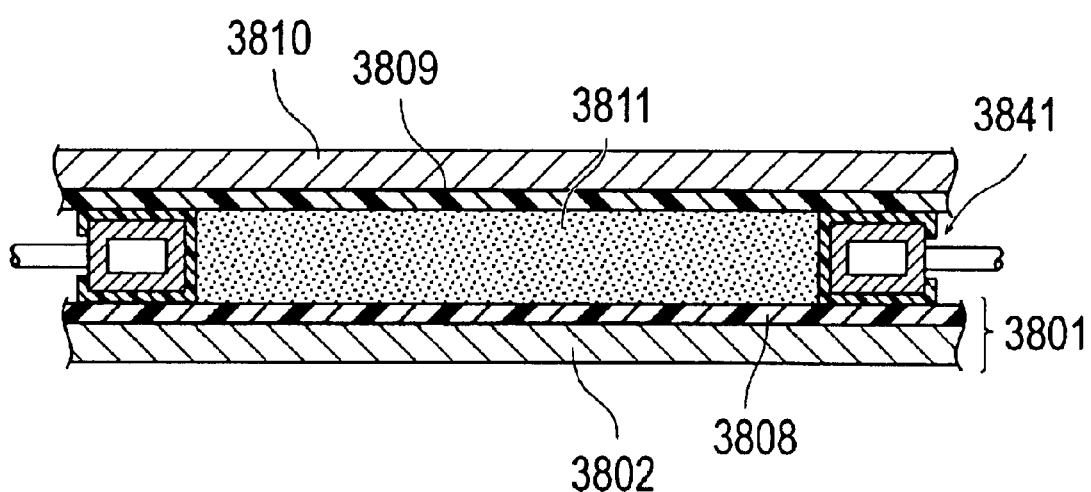
FIG. 38(C) is a schematic cross section of FIG. 38(A) perpendicular to the travel direction of the movable supporting member subsequently to the regulation of thickness of the HIPE and the spreading of the HIPE till contact with the weirs.
Figure 38B:
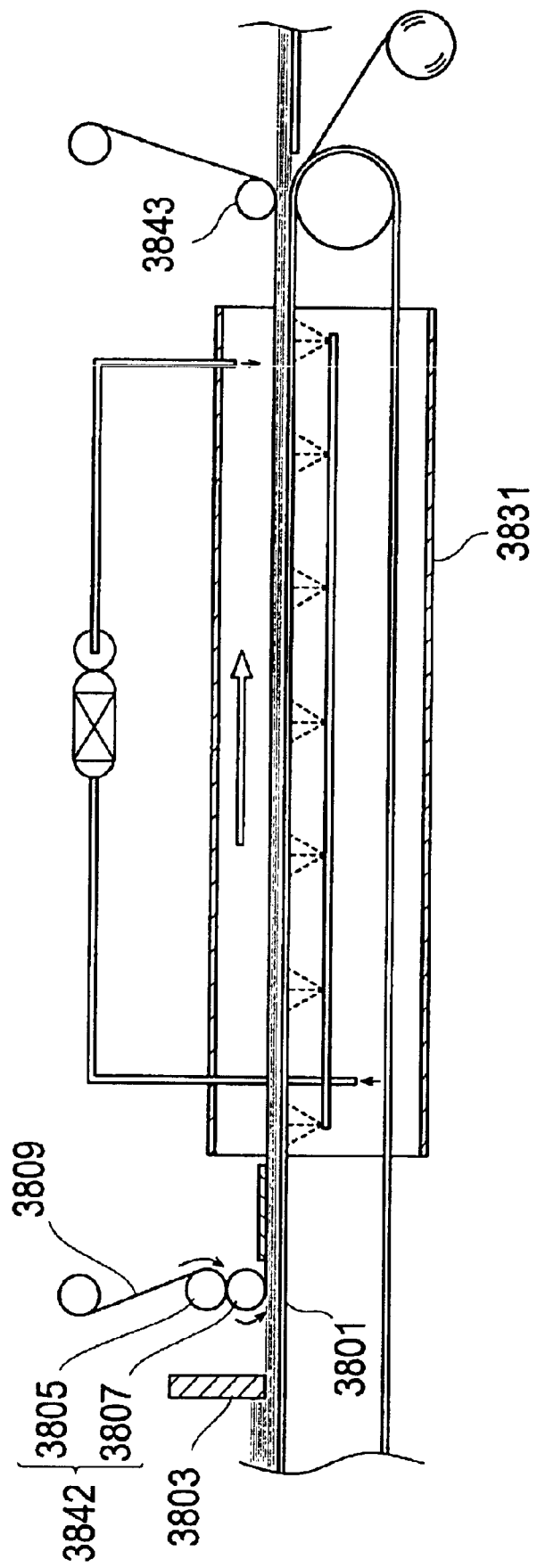
FIG. 38(B) is a schematic cross section parallel to the travel direction of a movable supporting member for conveying the HIPE, illustrating the manner of performing operations terminating in the polymerization of the HIPE while continuously improving the smoothness of surface and the accuracy of thickness in the travel direction by means of the nip rollers.

An HIPE (1) 3811 to be produced in the same manner as in Example 1 was continuously supplied through a T die having a lip width of 500 mm and a lip interval of 1 mm to a movable supporting member 3801 comprising an endless steel belt 3802 of SUS 316 having an effective width of 500 mm and a lower PET film 3808 as illustrated in FIGS. 38(A) and 38(C). Immediately thereafter, the HIPE was subjected to the regulation of thickness by being passed across one knife coater 3803 disposed at a right angle relative to the advance direction of the movable supporting member 3801 and was applied mean while to form a coat. Then, two rolls (upper 3805/lower 3807) were vertically opposed across a space to form a nip roll 3842. A PET film 3809 (upper side sheet material) was mounted on the path for the HIPE after the rotation rate of the nip roll 3842 had been adjusted and synchronized with the working speed of the movable supporting member, and a stationary parallel flat plate (thickness-regulating plate) 3810 was set on the PET film 3809. Further, a torque of a film reeling device 3843 and an output of a torque adjusting device (not shown) were properly selected so as to prevent the film from gathering wrinkles in the travel direction (the longer direction of the upper side PET film 3809), as illustrated in FIG. 38(B). Subsequently, tension rollers were disposed (not shown) in a diverging state as extended from the proximity of the entrance to a polymerization furnace through the interior of the polymerization furnace, with a stationary weir 3841 fitted with a supporting rod set in place, as illustrated in FIGS. 38(B) and (C). The HIPE kept under the influence of the tensile force exerted in the width direction by the tension rollers (the shorter direction of the upper PET film) was passed at a traveling speed of 0.25 m/min through a polymerization furnace 3831 measuring 15 m in length and having a hot air circulation unit set at 90° C. and a hot water shower unit set for the sake of a lower belt of SUS 316 to polymerize the HIPE for 60 minutes. The resultant polymer (25) had the upper side thereof show no sign of minute waviness and had a thickness of 5±0.1 mm. Since no fluctuation occurred in the width direction and the upper PET film exhibited a satisfactory retaining property, the opposite end parts in the width direction of the polymer (25) which touched the weirs 3841 were cut each in a size of 1 mm. Thus, the yield of the product was 99.8%.

INDUSTRIAL APPLICABILITY

In the method for the production of a porous cross-linked polymer by the horizontal continuous polymerization of an HIPE of this invention, a porous cross-linked polymer excelling in accuracy of thickness and/or smoothness of surface can be produced by using either singly or in combination a means for regulating, controlling, and retaining the accuracy of thickness of the HIPE from the step for supplying the HIPE and the step for imparting shape through the step for polymerization and a means for controlling the surface smoothness of the HIPE. The means for regulating, controlling, and retaining the accuracy of thickness of the HIPE resides in passing the HIPE, during the supply of the HIPE and the impartation of shape (forming) thereof, between the lower side supporting member and the object such as a coater and a rotary roll disposed at a prescribed distance from the supporting member and/or having the opposite end parts of the lower side supporting member provided each with a weir during the impartation of shape (forming) of the HIPE and the polymerization of the HIPE. The means for controlling the surface smoothness of the HIPE resides in exerting tensile force in the width direction and/or the travel direction of the upper side sheet material during the impartation of shape (forming) of the HIPE and the polymerization. The weirs provided one each at the opposite end parts in the width direction of the lower side supporting member by virtue of the non-Newtonian and thixotropic viscosity of the HIPE enable only to impart a necessary thickness to the opposite end parts and retain the imparted thickness but also to manifest such effects as preventing the HIPE from leaking, precluding the polymer from failing to cure owing to a decrease in an oxygen content, and enabling the sheet material such as an upper film to acquire an improved retaining property. By harnessing the characteristic non-Newtonian and thixotropic property of the HIPE and exerting tensile force in the width direction and/or the travel direction of the upper side sheet material during the impartation of shape (forming) and the polymerization of the HIPE, it is made possible to prevent highly effectively the upper side sheet material in a state of highly elevated temperature during the polymerization from inducing the phenomenon of sagging, the sheet material from inflicting longitudinal and lateral furrows upon the surface, and the polymer from suffering dispersion of thickness, further enhance the surface smoothness, and obtain a porous cross-linked polymer as a polymerized product having improved accuracy of thickness. Further, the exertion of the tensile force on the upper side film can produce a force of depressing the weirs downward and, therefore, can manifest a useful action and function of providing air interception for the end parts with added infallibility and rendering the obstruction of polymerization difficulty to occur. The combined use of the means mentioned above results in manifestation of synergistic effects. Thus, a porous cross-linked polymer of high quality and high performance can be produced stably in a large amount at a high yield without suffering the products in one lot from being appreciably dispersed in performance and quality.

In the method for the production of a porous cross-linked polymer of this invention, since the product in process has a stable quality and excels in productivity and efficiency of production, a porous cross-linked polymer of high grade and high performance can be obtained stably. The porous cross-linked polymer so obtained, therefore, can be used for wide applications including (1) as a liquid absorbent such as, for example, ① a core material for a disposable diaper as an absorbent for such excretions as water and urine and ② an agent for disposal of waste oil or waste solvent as an absorbent for oil and organic solvent, (2) an energy absorbent such as a sound insulating material and a heat insulating material used in automobiles and buildings as an absorbent for sound and heat, and (3) a chemical impregnating substrate such as a toiletry product impregnated with an aromatic agent, a detergent, a glossing agent, a surface protecting agent, and a flame retardant.

What is claimed is:

1. A method for the production of a porous cross-linked polymer by the horizontal continuous polymerization of a water-in-oil high internal phase emulsion, which comprises using a weir one each at the opposite end parts in the width direction of an emulsion supporting member for the use in said horizontal continuous polymerization of said emulsion.

2. A method according to claim 1, wherein the height of said weir is in the range of 0.5 to 100 mm.

3. A method according to claim 1, wherein a supporting member is used on the lower side of said emulsion and a sheet material on the upper side thereof for performing the horizontal continuous polymerization of said emulsion and a tensile force is exerted in the width direction and/or the travel direction of said sheet material.

4. A method according to claim 3, wherein said tensile force is exerted by a tension roller, a pin tenter, or a clip tenter in the width direction of said sheet material.

5. A method according to claim 3, wherein either a thickness imparting roll or a reeling device provided with a nip roll comprising a driven roll and a drive roll vertically opposed across a space and further provided with a torque control mechanism in the reeling part on the outlet side of a polymerization furnace is disposed in the part for injecting said emulsion on the inlet side of said polymerization furnace relative to the travel direction of said sheet material for the purpose of adjusting said tensile force in the travel direction.

6. A method according to claim 1, wherein the thickness of said emulsion is regulated by passing said emulsion between a movable supporting member and an object disposed so as to retain a prescribed distance from said movable supporting member.

7. A method according to claim 6, wherein a plurality of such objects as mentioned above are arranged in the travel direction of said movable supporting member.

8. A method according to claim 1, wherein a die is used in the supply part for said emulsion as a means for spreading said emulsion in the width direction of the movable supporting member.

9. A method according to claim 6, further comprising using a die in the supply part for said emulsion as a means for spreading said emulsion in the width direction of the movable supporting member.

10. A method for the production of a porous cross-linked polymer by the horizontal continuous polymerization of a water-in-oil high internal phase emulsion, which comprises using a supporting member on the lower side of said emulsion and a sheet material on the upper side thereof for performing the horizontal continuous polymerization of said emulsion and performing the polymerization by exerting a tensile force in the width direction and/or the travel direction of said sheet material.

11. A method according to claim 10, wherein said tensile force is exerted by a tension roller, a pin tenter, or a clip tenter in the width direction of said sheet material.

12. A method according to claim 10, wherein either a thickness imparting roll or a reeling device provided with a nip roll comprising a driven roll and a drive roll vertically opposed across a space and further provided with a torque control mechanism in the reeling part on the outlet side of a polymerization furnace is disposed in the part for injecting said emulsion on the inlet side of said polymerization furnace relative to the travel direction of said sheet material for the purpose of adjusting said tensile force in the travel direction.

13. A method according to claim 10, wherein the thickness of said emulsion is regulated by passing said emulsion between a movable supporting member and an object disposed so as to retain a prescribed distance from said movable supporting member.

14. A method according to claim 13, wherein a plurality of such objects as mentioned above are arranged in the travel direction of said movable supporting member.

15. A method according to claim 10, wherein a die is used in the supply part for said emulsion as a means for spreading said emulsion in the width direction of the movable supporting member.

16. A method according to claim 13, further comprising using a die in the supply part for said emulsion as a means for spreading said emulsion in the width direction of the movable supporting member.

17. A method for the production of a porous cross-linked polymer by the horizontal continuous polymerization of a water-in-oil high internal phase emulsion, which comprises effecting the regulation of thickness of said emulsion by passing said emulsion between a movable supporting member and an object disposed so as to retain a prescribed distance from said movable supporting member.

18. A method according to claim 17, wherein a plurality of such objects as mentioned above are arranged in the travel direction of said movable supporting member.

19. A method for the production of a porous cross-linked polymer by the horizontal continuous polymerization of a water-in-oil high internal phase emulsion, which comprises using a die in the supply part for said emulsion as a means for spreading said emulsion in the width direction of the movable supporting member.

20. A method according to claim 17, further comprising using a die in the supply part for said emulsion as a means for spreading said emulsion in the width direction of the movable supporting member.

21. A method according to claim 1, wherein said emulsion further contains a salt.

22. A method according to claim 10, wherein said emulsion further contains a salt.

23. A method according to claim 17, wherein said emulsion further contains a salt.

24. A method according to claim 19, wherein said emulsion further contains a salt.

25. A method according to claim 1, wherein said emulsion has a water/oil ratio of 10/1 to 100/1.

26. A method according to claim 10, wherein said emulsion has a water/oil ratio of 10/1 to 100/1.

27. A method according to claim 17, wherein said emulsion has a water/oil ratio of 10/1 to 100/1.

28. A method according to claim 19, wherein said emulsion has a water/oil ratio of 10/1 to 100/1.

29. A method according to claim 17, wherein said object is a coater or a rotary roll.

30. A method according to claim 1, wherein said porous cross-linked polymer is used in a liquid absorbent, an energy absorbent, or a chemical impregnating substrate.

31. A method according to claim 1, wherein said method comprises forming said emulsion at a temperature of 20 to 100° C., and said emulsion has a viscosity ratio ($\eta_1/\eta_{100}$) of not less than 5 at shear rates $1[s^{-1}]$ and $100[s^{-1}]$.

* * * * *